(12) United States Patent
Yamada et al.

(10) Patent No.: US 7,813,440 B2
(45) Date of Patent: Oct. 12, 2010

(54) MULTIPLE-OUTPUT MULTIPLE-INPUT (MIMO) COMMUNICATION SYSTEM, MIMO RECEIVER AND MIMO RECEIVING METHOD

(75) Inventors: Takefumi Yamada, Tokyo (JP);
Hirohito Suda, Yokosuka (JP); Shigeru Tomisato, Okayama (JP)

(73) Assignee: NTT DoCoMo, Inc., Tokyo (JP)

( * ) Notice: Subject to any disclaimer, the term of this patent is extended or adjusted under 35 U.S.C. 154(b) by 1296 days.

(21) Appl. No.: 10/767,282

(22) Filed: Jan. 30, 2004

(65) Prior Publication Data

US 2005/0129137 A1   Jun. 16, 2005

(30) Foreign Application Priority Data

Jan. 31, 2003 (JP) ............................. P2003-024555
Jun. 27, 2003 (JP) ............................. P2003-185971
Jul. 8, 2003 (JP) ............................. P2003-193832

(51) Int. Cl.
*H04B 7/02* (2006.01)
*H04L 1/02* (2006.01)

(52) U.S. Cl. ...................... 375/267; 375/299; 375/347; 375/349

(58) Field of Classification Search ................ 375/219, 375/221, 260, 267, 295, 299, 316, 337, 347, 375/349
See application file for complete search history.

(56) References Cited

U.S. PATENT DOCUMENTS 6,940,917 B2 * 9/2005 Menon et al. ............... 375/267

| | | | |
|---|---|---|---|
| 7,194,237 B2 * | 3/2007 | Sugar et al. | 455/39 |
| 2002/0101825 A1 * | 8/2002 | Beck et al. | 370/252 |
| 2003/0185309 A1 * | 10/2003 | Pautler et al. | 375/257 |
| 2004/0076224 A1 * | 4/2004 | Onggosanusi et al. | 375/144 |

FOREIGN PATENT DOCUMENTS

JP   2001-352283   12/2001

(Continued)

OTHER PUBLICATIONS

Toshihiko Nishimura, et al., "Evaluation of E-SDM Performance in the Presence of Channel Estimation Error", Technical Report of IEICE, The Institute of Electronics: Information and Communication Engineers, Jul. 10, 2002, 102(204) pp. 25-30.

*Primary Examiner*—Chieh M. Fan
*Assistant Examiner*—Freshteh N Aghdam
(74) *Attorney, Agent, or Firm*—Oblon, Spivak, McClelland, Maier & Neustadt, L.L.P.

(57) ABSTRACT

This invention provides an MIMO communication system and MIMO communication method. An MIMO receiver estimates state of each communication channel from the received signals received by #1 to #L antennas, generates feedback information according to the information of channel state, sends the feedback information to a transmitter through a feedback path, processes the feedback information in order to compensate feedback-delay of the feedback path, generate K*L proper reception weights by using the information of channel state and processed feedback information, multiplies the received #1 to #L substreams of respective #1 to #K signal streams by the proper #1 to #L reception weights, respectively, composes the #1 to #L weighted substreams to obtain respective composed #1 to #K signal streams and demodulate the composed #1 to #K signal streams, respectively, and combines the demodulated K signal streams to reproduce an original transmission signal.

16 Claims, 45 Drawing Sheets

FOREIGN PATENT DOCUMENTS

| | | |
|---|---|---|
| JP | 2002-519928 | 7/2002 |
| JP | 2002-271266 | 9/2002 |
| JP | 2003-143065 | 5/2003 |
| WO | WO 01/76110 A2 | 10/2001 |

* cited by examiner

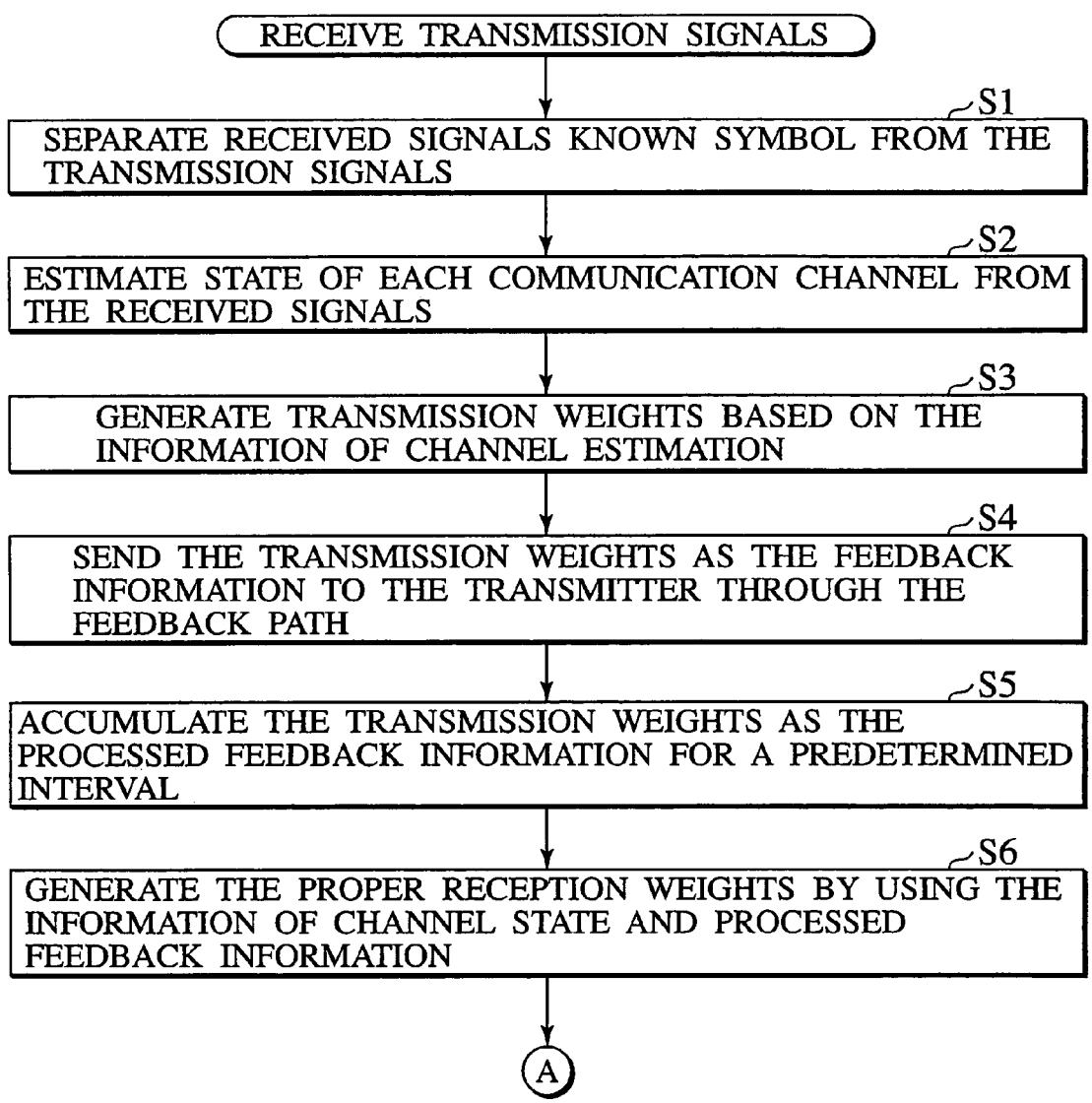

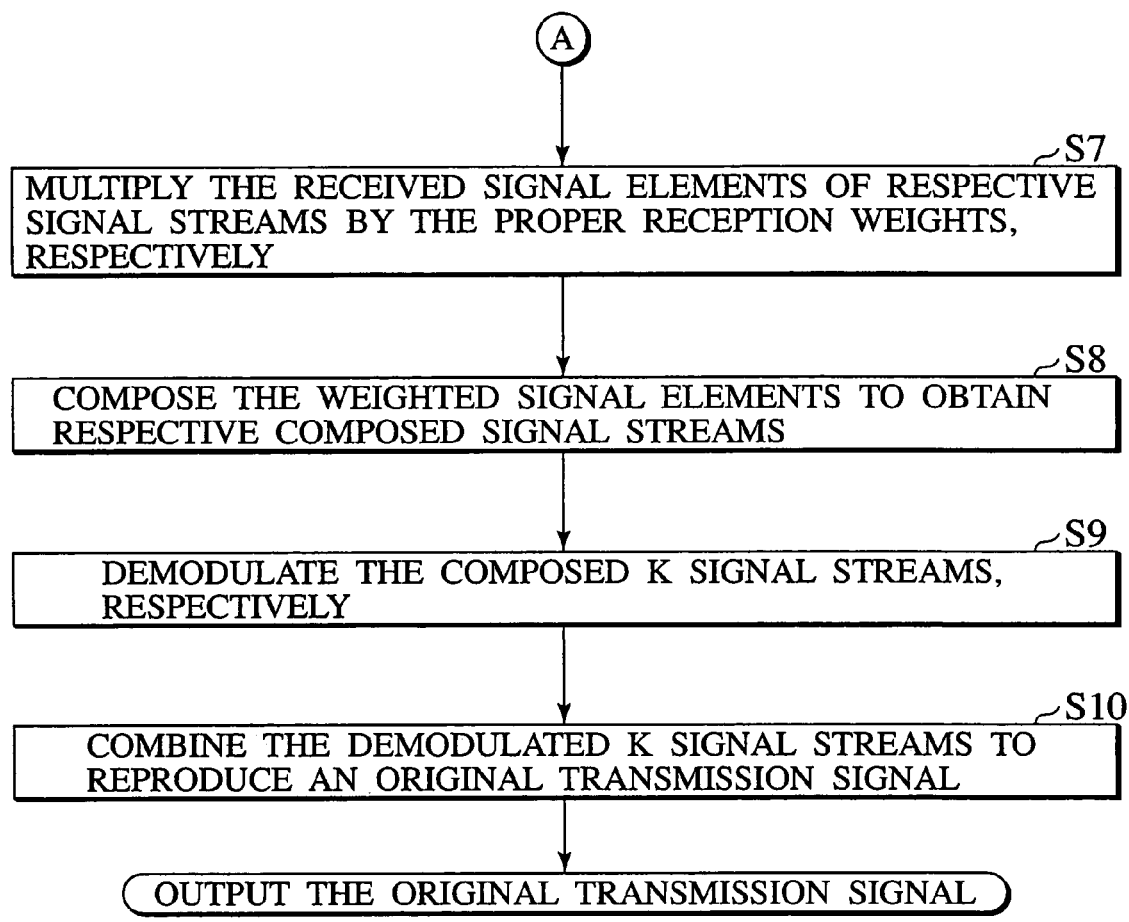

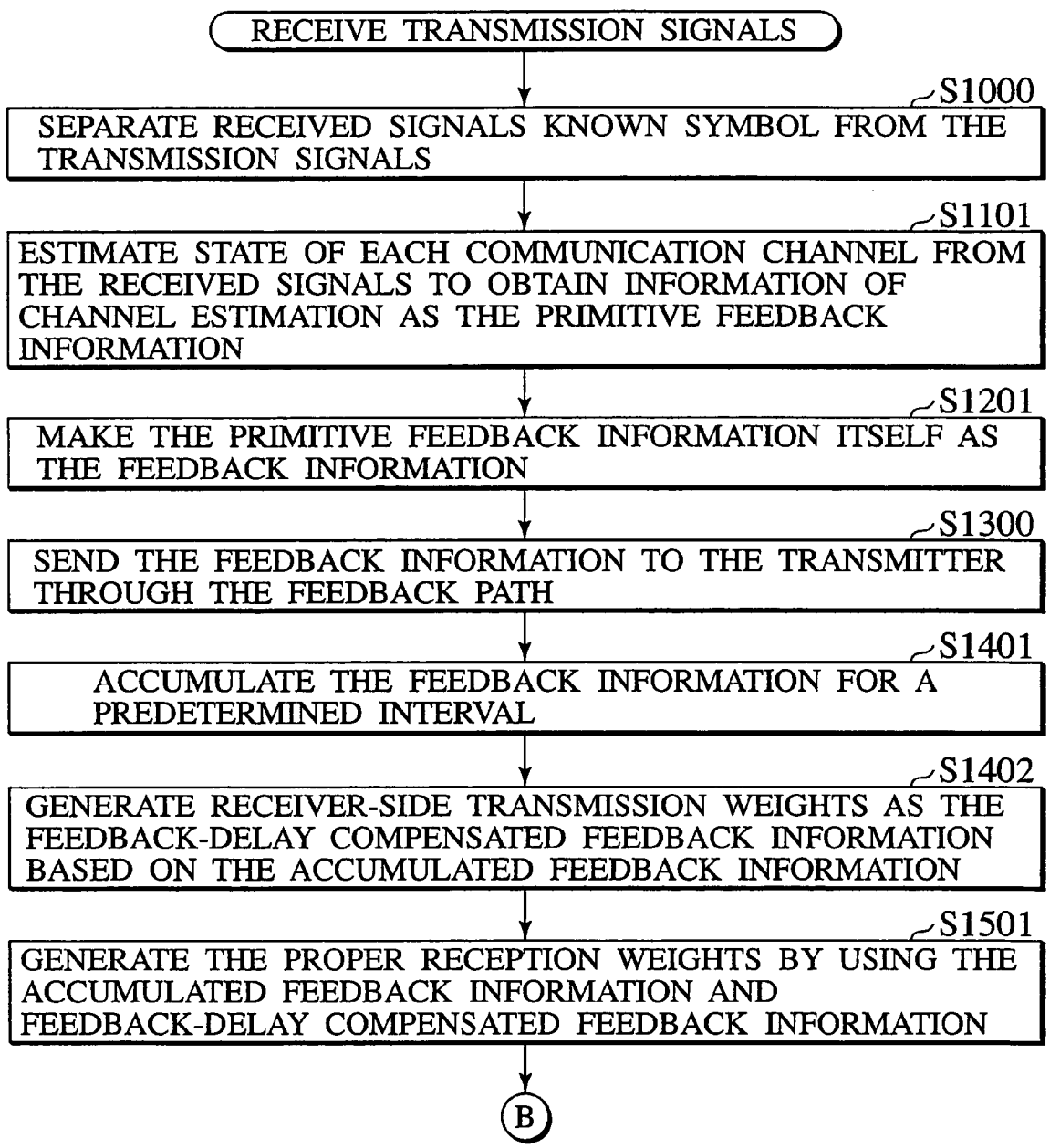

FIG.15 TX SIGNAL PROCESSOR

TABLE 1

| | TRANSMISSION WEIGHT INF. | COMMUNICATION CHANNEL INF. | RECEPTION WEIGHT INF. |
|---|---|---|---|
| 14TH EMBODIMENT | $\widetilde{W}_T$ | A | $W_R$ |
| 15TH EMBODIMENT | $\widetilde{W}_T$ | A | $\widetilde{W}_R$ |

W : GENERATED BY THE PROCESSED FEEDBACK INF.
$\widetilde{W}$ : GENERATED BY THE FEEDBACK INF.

FIG.42

TABLE 2

| ANGULAR WIDTH | TX : 5° , RX : 35° (EACH LAPLACE DISTRIBUTION) |
|---|---|
| ANTENNA PITCH | TX ANTENNA : 10 λ<br>RX ANTENNA : 0.5 λ |
| DIRECTIVITY | NON-DIRECTIVE | though
MULTIPLE-OUTPUT MULTIPLE-INPUT (MIMO) COMMUNICATION SYSTEM, MIMO RECEIVER AND MIMO RECEIVING METHOD

CROSS-REFERENCES TO RELATED APPLICAIONS

This application is based upon and claims the benefit of priority from the prior Japanese Patent Applications No. 2003-024555 which was filed on Jan. 31, 2003, No. 2003-185971 which was filed on Jun. 27, 2003, and No. 2003-193832 which was filed on Jul. 8, 2003.

BACKGROUD OF THE INVENTION

1. Field of the Invention

This invention relates to an MIMO (multiple-input multiple-output) communication system, an MIMO receiver which is used in the MIMO communication system, and a method of receiving MIMO transmission signal therein.

2. Description of the Related Art

The next-generation multimedia mobile communication system requires high transmission rate more than 100 Mbps. To meet this requirement, it is inevitable to use time-, frequency- and space-characteristics of propagation channels of radio wave to the utmost and improve the efficiency of frequency utilization. Since the MIMO communication system uses multiple antennas at both sender-side and receiver-side, it is expected to increase communication rate, transmission characteristics and channel capacity without expansion of band width of transmission wave. One of which is disclosed by Japanese Patent Application Publication No.2001-277751.

SUMMARY OF THE INVENTION

It is an object of this invention to provide an MIMO communication technology which can improve consistency between transmission weights and reception weights by using channel information of the feedback timing as well as the current channel information when generating the weights.

Another object of this invention is to provide an MIMO communication technology which can improve consistency between transmission weights and reception weights and restrain degradation of transmission characteristics by using processed transmission weights for generation of reception weights.

First aspect of this invention is an MIMO communication system comprising a transmitter with #1 to #N (N is an integer equal to or greater than 2) antennas and a receiver with #1 to #L (L is an integer equal to or greater than 2) antennas and an MIMO receiver used for this system, in which the transmitter comprises: a transmission signal generator for generating a transmission signal; a signal dividing unit for dividing the transmission signal into #1 to #K (K is an integer equal to or less than smaller one of N or L) signal streams according to K*N transmission weights derived from feedback information informed from the receiver through a feedback path; a signal modulator for modulating the #1 to #K signal streams, respectively; and a stream processor for dividing respective #1 to #K modulated signal streams into #1 to #N substreams and multiplying the #1 to #N substreams by the #1 to #N transmission weights, respectively; and the receiver comprising: a channel state estimating means for estimating state of each communication channels from received signals received by the #1 to #L antennas to output information of channel state; a feedback signal generating means for generating feedback information according to the information of channel state; a feedback-delay compensating means for processing the feedback information in order to compensate feedback-delay of the feedback path; a proper reception weight generating means for generating K*L proper reception weights by using the information of channel state and processed feedback information from the feedback-delay compensating means; a reception weight multiplier for multiplying the received #1 to #L substreams of respective #1 to #K signal streams by the proper #1 to #L reception weights, respectively; a demodulator for composing the #1 to #L weighted substreams to obtain respective composed #1 to #K signal streams and demodulating the composed #1 to #K signal streams, respectively; and a signal combining unit corresponding to the signal dividing unit of the transmitter for combining the demodulated K signal streams from the demodulator to reproduce an original transmission signal.

In this MIMO communication system and MIMO receiver of the first aspect of this invention, the transmitter generates a transmission signal, divides the transmission signal into #1 to #K signal streams according to K*N transmission weights derived from feedback information informed from the receiver through a feedback path, and modulates the #1 to #K signal streams, respectively. The transmitter further divides respective #1 to #K modulated signal streams into #1 to #N substreams, multiplies the #1 to #N substreams by the #1 to #N transmission weights, respectively, and sends out the weighted #1 to #N substreams of respective #1 to #K signal streams from the #1 to #N antennas provided therewith.

The receiver with the #1 to #L antennas receives the #1 to #N substreams transmitted from the transmitter by its #1 to #L antennas. The receiver estimates state of each communication channel from the received signals received by #1 to #L antennas to output information of channel state, generates feedback information according to the information of channel state, and sends the feedback information to the transmitter through a feedback path. The receiver further processes the feedback information in order to compensate feedback-delay of the feedback path, generates K*L proper reception weights by using the information of channel state and processed feedback information, and multiplies the received #1 to #L substreams of respective #1 to #K signal streams by the proper #1 to #L reception weights, respectively. The receiver further composes the #1 to #L weighted substreams to obtain respective composed #1 to #K signal streams, demodulates the composed #1 to #K signal streams, respectively, and combines the demodulated K signal streams to reproduce the original transmission signal.

Second aspect of this invention is an MIMO communication system comprising a transmitter with #1 to #N antennas and a receiver with #1 to #L antennas and an MIMO receiver used for this system, in which the transmitter comprises: a transmission signal generator for generating a transmission signal; a sender-side transmission weight generator for generating K*N sender-side transmission weights based on feedback information from the receiver through a feedback path; a signal dividing unit for dividing the transmission signal into #1 to #K (K is an integer equal to or less than smaller one of N or L) signal streams according to the sender-side transmission weights; a signal modulator for modulating the #1 to #K signal streams, respectively; and a stream processor for dividing respective #1 to #K modulated signal streams into #1 to #N substreams and multiplying the #1 to #N substreams by the sender-side #1 to #N transmission weights, respectively; and the receiver comprising: a feedback information generating means for generating primitive feedback information from received #1 to #L substreams received by the #1 to #L antennas of the receiver; a feedback-delay processing means for adjusting the primitive feedback information to obtain feedback information and sending the feedback information to the transmitter through the feedback path; a feedback-delay compensating means for compensating a feedback-delay for the feedback information from the feedback-delay processing means; a proper reception weight generating means for generating K*L proper reception weights by using the compensated feedback information from the feedback-delay compensating means; a reception weight multiplier for multiplying the received #1 to #L substreams of respective #1 to #K signal streams by the proper #1 to #L reception weights, respectively; a demodulator for composing the #1 to #L weighted substreams to obtain respective composed #1 to #K signal streams and demodulating the composed #1 to #K signal streams, respectively; and a signal combining unit corresponding to the signal dividing unit of the transmitter for combining the demodulated K signal streams from the demodulator to reproduce an original transmission signal.

In this MIMO communication system and MIMO receiver of the second aspect of this invention, the transmitter generates a transmission signal, generates K*N sender-side transmission weights based on the feedback information from the receiver through the feedback path, and divides the transmission signal into #1 to #K signal streams according to the sender-side transmission weights. The transmitter further modulates the #1 to #K signal streams, respectively, divides respective #1 to #K modulated signal streams into #1 to #N substreams, multiplies the #1 to #N substreams by the sender-side #1 to #N transmission weights, respectively, and sends out the weighted #1 to #N substreams of respective #1 to #K signal streams from the #1 to #N antennas provided therewith.

The receiver with the #1 to #L antennas receives the #1 to #N substreams transmitted from the transmitter by its #1 to #L antennas. The receiver generates primitive feedback information from the received #1 to #L substreams received by the #1 to #L antennas, adjusts the primitive feedback information to obtain feedback information and sends the feedback information to the transmitter through the feedback path. The receiver further compensates feedback-delay for the feedback information from the feedback-delay processing means, generates K*L proper reception weights by using the feedback-delay compensated feedback information from the feedback-delay compensating means, and multiplies the received #1 to #L substreams of respective #1 to #K signal streams by the proper #1 to #L reception weights, respectively. The receiver further composes the #1 to #L weighted substreams to obtain respective composed #1 to #K signal streams, demodulates the composed #1 to #K signal streams, respectively, and combines the demodulated K signal streams from the demodulator to reproduce the original transmission signal.

Third aspect of this invention is an MIMO communication system comprising a transmitter with #1 to #N antennas and a receiver with #1 to #L antennas and an MIMO receiver used for this system, in which the transmitter comprises: a transmission signal generator for generating a transmission signal; a sender-side transmission weight generator for generating K*N sender-side transmission weights based on feedback information from the receiver through a feedback path; a signal dividing unit for dividing the transmission signal into #1 to #K (K is an integer equal to or less than smaller one of N or L) signal streams according to the sender-side transmission weights; a signal modulator for modulating the #1 to #K signal streams, respectively; and a stream processor for dividing respective #1 to #K modulated signal streams into #1 to #N substreams and multiplying the #1 to #N substreams by the sender-side #1 to #N transmission weights, respectively; and the receiver comprises: a channel state estimation unit for estimating state of each communication channel from received signals received by the #1 to #L antennas to obtain information of channel estimation; a feedback information generator for generating feedback information according to the information of channel estimation from the channel state estimation unit; a feedback information processing unit for processing the feedback information according to a condition of the feedback path and generating the processed feedback information to be sent to a transmitter through a feedback path; a feedback information accumulation unit for accumulating the feedback information for a predetermined interval; a reception weight generator for generating K*L reception weights by using the information of channel estimation from the channel state estimation unit and accumulated feedback information in the feedback information accumulation unit; a reception weight multiplier for multiplying the received #1 to #L substreams of respective #1 to #K signal streams by the #1 to #L reception weights, respectively; a demodulator for composing the #1 to #L weighted substreams to obtain respective composed #1 to #K signal streams and demodulating the composed #1 to #K signal streams, respectively; and a signal combining unit for combining the demodulated K signal streams to reproduce an original transmission signal.

In this MIMO communication system and MIMO receiver of the third aspect of this invention, the transmitter generates a transmission signal, generates K*N sender-side transmission weights based on feedback information from the receiver through a feedback path, and divides the transmission signal into #1 to #K signal streams according to the sender-side transmission weights. The transmitter further modulates the #1 to #K signal streams, respectively, divides respective #1 to #K modulated signal streams into #1 to #N substreams, multiplies the #1 to #N substreams by the sender-side #1 to #N transmission weights, respectively, and sends out the weighted #1 to #N substreams of respective #1 to #K signal streams from the #1 to #N antennas provided therewith.

The receiver with the #1 to #L antennas receives the #1 to #N substreams transmitted from the transmitter by its #1 to #L antennas. The receiver estimates state of each communication channel from the received signals received by the #1 to #L antennas to obtain information of channel estimation, generates feedback information according to the information of channel estimation, processes the feedback information according to the condition of the feedback path, generates the processed feedback information and sends to the transmitter through a feedback path. The receiver further accumulates the feedback information for a predetermined interval, generates K*L reception weights by using the information of channel estimation and accumulated feedback information, multiplies the received #1 to #L substreams of respective #1 to #K signal streams by the #1 to #L reception weights, respectively, composes the #1 to #L weighted substreams to obtain respective composed #1 to #K signal streams, demodulates the composed #1 to #K signal streams, respectively, and combines the demodulated K signal streams to reproduce the original transmission signal.

Fourth aspect of this invention is a method of receiving and reproducing MIMO transmission signal comprising the steps of: (a) step of estimating state of each communication channel from the received signals received by #1 to #L antennas of an MIMO receiver to output information of channel state; (b) step of generating feedback information according to the information of channel state; (c) step of sending the feedback information to a transmitter through a feedback path; (d) step of processing the feedback information in order to compensate feedback-delay of a feedback path; (e) step of generating K*L proper reception weights by using the information of channel state and processed feedback information; (f) step of multiplying the received #1 to #L substreams of respective #1 to #K signal streams by the proper #1 to #L reception weights, respectively; (g) step of composing the #1 to #L weighted substreams to obtain respective composed #1 to #K signal streams; (h) step of demodulating the composed #1 to #K signal streams, respectively; and (i) step of combining the demodulated K signal streams to reproduce an original transmission signal.

Fifth aspect of this invention is a method of receiving and reproducing MIMO transmission signal comprising the steps of: (a) step of generating primitive feedback information from received #1 to #L substreams received by #1 to #L antennas of a receiver; (b) step of adjusting the primitive feedback information to obtain feedback information; (c) step of sending the feedback information to a transmitter through a feedback path; (d) step of compensating feedback-delay for the feedback information; (e) step of generating K*L proper reception weights by using the feedback-delay compensated feedback information; (f) step of multiplying the received #1 to #L substreams of respective #1 to #K signal streams by the proper #1 to #L reception weights, respectively; (g) step of composing the #1 to #L weighted substreams to obtain respective composed #1 to #K signal streams; (h) step of demodulating the composed #1 to #K signal streams, respectively; and (i) step of combining the demodulated K signal streams to reproduce an original transmission signal.

Sixth aspect of this invention is a method of receiving and reproducing MIMO transmission signal comprising the steps of: (a) step of estimating state of each communication channel from received signals received by #1 to #L antennas of an MIMO receiver to obtain information of channel estimation; (b) step of generating primitive feedback information according to the information of channel estimation; (c) step of processing the primitive feedback information according to a condition of a feedback path to obtain feedback information to be sent to a transmitter through the feedback path; (d) step of accumulating the primitive feedback information for a predetermined interval as feedback-delay compensated feedback information; (e) step of generating K*L reception weights by using the information of channel estimation and the feedback-delay compensated feedback information; (f) step of multiplying the received #1 to #L substreams of respective #1 to #K signal streams by the #1 to #L reception weights, respectively; (g) step of composing the #1 to #L weighted substreams to obtain respective composed #1 to #K signal streams; (h) step of demodulating the composed #1 to #K signal streams, respectively; and (i) step of combining the demodulated K signal streams to reproduce an original transmission signal.

According to these aspects of this invention, it can reduce drawbacks caused by feedback-delay of the transmission weights such as inconsistency between transmission weights and reception weights and degradation of transmission characteristics.

BRIEF DESCRPTION OF THE DRAWINGS

FIGS. 2A and 2B are a flowchart showing an MIMO receiving method carried out by the MIMO receiver of the first embodiment.

FIGS. 12A and 12B are a flowchart showing an MIMO receiving method carried out by the MIMO receiver of the fifth embodiment.

FIG. 17 is a schematic diagram showing an MIMO communication system of the eighth embodiment of this invention.

FIG. 33 is a table of information of transmission weights, communication channel information and information of reception weights, which are used by the communication systems of the fourteenth embodiment and fifteenth embodiment of this invention, respectively.

FIG. 42 is a table of correlation characteristics between a transmit branch and a receive branch, which are set for the example 1 of the first embodiment and second embodiment of this invention.

DETAILED DESCRIPTION OF PREFERRED EMBODIMENTS OF THE INVENTION

First Embodiment

Figure 1:
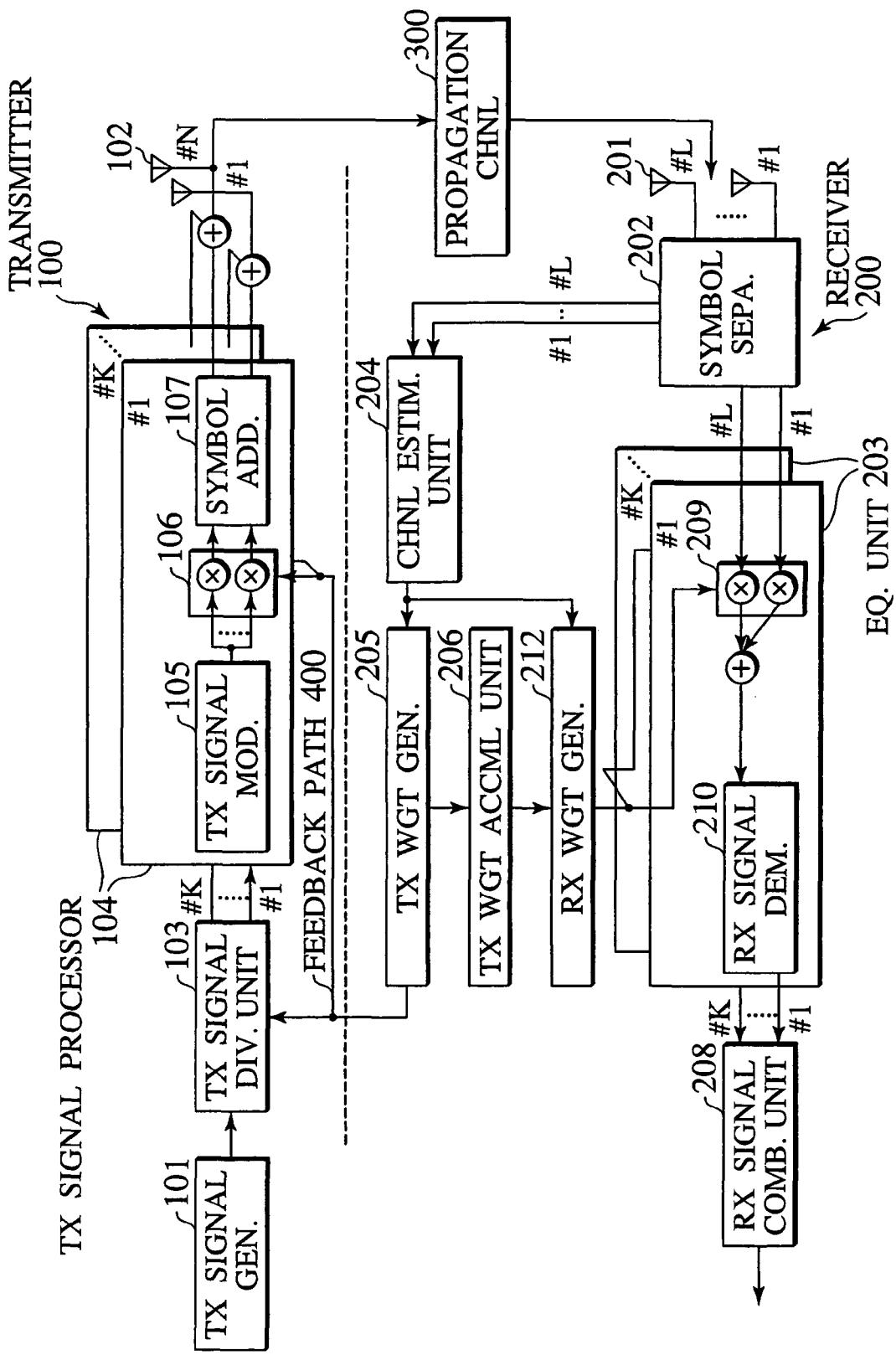
FIG. 1 is a schematic diagram showing an MIMO communication system of the first embodiment of this invention.

An MIMO communication system of the first embodiment of this invention shown in FIG. 1 is fundamental configuration. The MIMO communication system includes a transmitter 100 with #1 to #N (N is an integer equal to or greater than 2) antennas 102, a receiver 200 with #1 to #L (L is an integer equal to or greater than 2) antennas 201 and propagation channels 300 for transmission signal between the transmitter 100 and receiver 200.

The transmitter includes a transmission signal generator 100 for generating a transmission signal, the #1 to #N antennas 102, a signal dividing unit 103 for dividing the transmission signal into #1 to #K (K is an integer equal to or less than smaller one of N or L) signal streams according to transmission weights derived from feedback information informed from the receiver 200 through a feedback path 400, and #1 to #K transmission signal processors 104. Respective #1 to #K transmission signal processors 104 includes a signal modulator 105 for modulating the #1 to #K signal streams, respectively, a stream processor 106 for dividing respective #1 to #K modulated signal streams into #1 to #N substreams and multiplying the #1 to #N substreams by the #1 to #N transmission weights, respectively, and a known symbol adder 107 for adding a known symbol onto respective #1 to #N substreams.

The receiver 200 includes the #1 to #L antennas 201, known symbol separator 202, #1 to #K equalization processors 203, a channel state estimation unit 204 for estimating state of each communication channel from received signals received by the #1 to #L antennas 201 and outputting information of channel estimation, a transmission weight generator 205 for generating K*N transmission weights based on the information of channel estimation and sending the transmission weights to the transmitter 100 through the feedback path 400, a transmission weight accumulation unit 206 for accumulating the transmission weights for a predetermined interval, a reception weight generator 212 for generating K*L reception weights by using the information of channel estimation and accumulated transmission weights in the transmission weight accumulation unit 206 and a signal combining unit 208.

Each of #1 to #K equalization processor 203 includes a reception weight multiplier 209 for multiplying the received #1 to #L substreams of respective #1 to #K signal streams by the #1 to #L reception weights, respectively, and a demodulator 210 for composing the #1 to #L weighted substreams to obtain respective #1 to #K composed signal streams and demodulating the #1 to #K composed signal streams, respectively. The signal combining unit 208 is corresponding to the signal dividing unit 103 of the transmitter 100 for combining the demodulated K signal streams from respective demodulators 210 of #1 to #K equalization processors 203 to reproduce the original transmission signal sent out from the transmitter 100.

According to this MIMO communication system, the transmitter 100 receives the transmission weight information from the receiver 200 through the feedback path 400 before sending a transmission signal. The feedback information are of a group of #1 to #L information, wherein the number L is equal to the number of the receive antennas 201 of the receiver 200. This #1 to #L feedback information contains K*N pieces of transmission weight information, where the number N is equal to the number of the transmit antennas 102 of the transmitter 100. The transmission signal dividing unit 103 of the transmission 100 divides the transmission signal into #1 to #K signal streams based on the transmission weight information fed-back from the receiver 200, where the number K is equal to the number of groups which are not a group containing the transmission weight information of all zeros. The modulator 105 of respective transmission signal processors 104 modulates the signal stream. The stream processor 106 divides the modulated signal stream into #1 to #N substreams and multiplying the #1 to #N substreams by the #1 to #N transmission weights, respectively. The known symbol adder 107 adds the known symbol onto respective #1 to #N substreams. Respective #1 to #N weighted substreams are added up for respective #1 to #K signal streams and sent out from respective transmit antennas 102 to the propagation channels 300.

A multiplexed transmission signal vector X(t) is expressed as an expression (1), where $S_k(t)$ is the k-th signal stream of #1 to #K signal streams, N is the number of the transmit antennas 102, and $W_{Tk}$ is a transmission weight vector (N×1 matrix) to the k-th signal stream.

$$X(t) = \sum_{k=1}^{K} W_{Tk} S_k(t) \tag{1}$$

The receiver 200 receives the transmission signal distorted through the propagation channels 300. Characteristics of the distortion of the transmission signal streams depend on figure of the propagation channels 300 themselves and relationship between the transmit antennas 102 and receive antennas 201. In here, the propagation channels 300 are assumed that each channel thereof is a channel of uniformly fading that is free from influence of the delayed wave. Characteristics of the propagation channels 300 can be expressed by a channel matrix A of an expression (2) by estimating the characteristics of the propagation channels between the transmission- and reception-side on the channel estimation unit 204. In the expression (2), L is the number of the receiving antennas 201.

$$A = \begin{bmatrix} a_{11} & \cdots & a_{1,N} \\ \vdots & a_{ij} & \vdots \\ a_{L1} & \cdots & a_{LN} \end{bmatrix} \tag{2}$$

The received signal r(t) received by respective antennas 201 can be expressed by an expression (3), where n(t) is a noise vector.

$$r(t) = AX(t) + n(t) \tag{3}$$

The received signal received by respective antennas 201 is separated into the known symbol and transmission information symbol. The transmission information symbol is inputted to respective K equalization processors 203, wherein K is the number equal to the number of #1 to #K transmission signal streams. The known symbol is inputted to the channel estimation unit 204. The channel estimation unit 204 estimates characteristics of the propagation channel 300 between the transmit antennas 101 and receiving antennas 201 and outputs the information of channel estimation.

The transmission weight generator 205 of the receiver 200 generates the transmission weight information. The generator 205 uses eigenvalue operation or singular value operation for this generation of the transmission weight information. Practically, when K is described as K=min(N,L), eigenvector $e_k$ which can satisfy a relationship expressed by an expression (4) can be derived from an eigenvalue decomposition of a channel correlation matrix $A^H A$.

$$\left. \begin{array}{l} e_i^H (A^H A) e_i = \lambda_i \quad (i = 0, \ldots, K) \\ e_i^H (A^H A) e_j = 0 \quad (i \neq j) \end{array} \right\} \tag{4}$$

In the expression (4), $\lambda_i$ is an eigenvalue of the i-th eigenvector.

A transmission weight vector $W_{Tk}$ corresponding to the k-th signal stream can be generated by using the $e_k$ as expressed above.

$$W_{Tk} = e_k \tag{5}$$

The transmission weights obtained at this time are sent out to the transmitter 100 through the feedback path 400 and they are used at the next signal transmission.

The transmission weights generated by the transmission weight generator 205 are held by the transmission weight accumulation unit 206 for a while until the generated transmission weights are fed-back to the transmitter 100, the transmitter 100 uses them for the next signal transmission and the receiver 200 receives them. After this reception of the feedback transmission weights, accumulated transmission weights are inputted to the reception weight generator 212. The reception weight generator 212 calculates the reception weights by using the accumulated transmission weights and the information of channel estimation from the channel estimation unit 204. The reception weight vector $W_{Rk}$ of 1×N matrix is generated by an expression (6).

$$W_{Rk} = (A e_k)^H \tag{6}$$

In each equalization processor 203, the multiplier 209 multiplies the received substreams by the reception weights from the reception weight generator 212, and the demodulator composes the weighted substreams and demodulates the composed signal to obtain respective received signal stream. The k-th demodulated signal stream $y_k(t)$ is expressed by an expression (7).

$$\begin{aligned} y_k(t) &= W_{Rk} A X(t) \\ &= W_{Tk}^H A^H A \sum_{m=1}^{K} W_{Tm} S_m(t) + W_{Tk}^H A^H n(t) \\ &= \lambda_k S_k(t) + W_{Tk}^H A^H n(t) \end{aligned} \tag{7}$$

1 to #K demodulated signal streams from the #1 to #K equalization processors 203 are combined by the signal combining unit 208 to reproduce the original transmission signal which was transmitted from the transmitter 100. This signal combining unit 208 combines the signal streams by a manner corresponding to the manner of division carried out by the signal dividing unit 103 of the transmitter 100.

FIG. 2A and FIG. 2B are a flowchart which illustrates this receiving method carried out in the MIMO receiver 200.

At step S1, the receiver 200 separates the received signals into the known symbol and transmission substreams.

At step S2, the receiver 200 estimates state of each communication channel from the received signals received by the #1 to #L antennas 201 and outputs the information of channel estimation as the information of channel state.

At step S3, the receiver 200 generates K*N transmission weights based on the information of channel estimation.

At step S4, the receiver 200 sends the transmission weights as the feedback information to the transmitter 100 through the feedback path 400.

At step S5, the receiver 200 accumulates the transmission weights as the processed feedback information for a predetermined interval.

At step S6, the receiver 200 generates the proper K*L reception weights by using the information of channel state and processed feedback information.

At steps S7 to S9, the receiver 200 multiplies the received #1 to #L substreams of respective #1 to #K signal streams by the proper #1 to #L reception weights, respectively, composes the #1 to #L weighted substreams to obtain respective composed #1 to #K signal streams, and demodulates the composed #1 to #K signal streams, respectively.

Finally, at step S10, the receiver 200 combines the demodulated K signal streams to reproduce the original transmission signal.

According to the MIMO communication system and the MIMO receiver employed therein of the first embodiment, it is possible to extract target signal streams without any interference from other multiplexed signal streams by means of generating and using the transmission weights and reception weights and, as a result, to highly improve frequency efficiency.

Second Embodiment

In the MIMO communication system and MIMO receiver of the first embodiment of this invention, feedback-delay caused on the feedback path from the receiver to the transmitter is inevitable. This feedback-delay tends to cause variation of communication channels. This variation will cause inconsistency between the transmission weights and reception weights and degrade communication performance. This phenomenon will be described more precisely hereinafter. Let C put for a channel matrix for the transmission weight vector when it is generated, and C' for a channel matrix for the real communication, then the transmission weight vector is generated based on the channel matrix C, but the reception weight vector $W_{Rk}$ is generated based on the channel matrix C' as described by $W_{Rk}=(C'e_k)^H$. Accordingly, the composed signal stream $y_k(t)$ in the receiver is expressed by an expression (8).

$$y_k(t) = W_{Rk} C' X(t) \tag{8}$$

$$= W_{Tk}^H C'^H C' \sum_{m=1}^{K} W_{Tm} S_m(t) + W_{Tk}^H C'^H n(t)$$

In this expression, since $W_{Tk}$ is not an eigenvector of $C'^H C'$ but an eigenvector of $C^H C$, it is impossible to delete interference from other substreams. Consequently, the degradation of communication performance can not be avoided.

Furthermore, in the MIMO communication system of the first embodiment, as expressed by the expressions (5) and (6), the eigenvalue calculation based on the information of channel estimation is carried out and then, the transmission weights and reception weights are calculated so as to conform to the current communication path and used for communication. However, since the feedback information is sent through the feedback path, the information is received by the transmitter 100 after feedback-delay due to signal speed of the feedback path. The feedback-delay causes to disturb consistency between the reception weights which are free from the feedback-delay and transmission weights, and degrade communication performance.

In order to reduce the inconsistency between transmission weights and reception weights and between communication channels caused by the feedback-delay, it is possible to use a technique of transmission weight adjustment. This adjustment technique is to adjust the transmission weights by using such as a linear extrapolation process based on delay time information and accumulated transmission weights accumulated in the transmission weight accumulating means for a predetermined interval. The delay time information can be obtained by measuring the time consumed for generation and adjustment process of the transmission weights in both transmitter- and receiver-side and the time taken from reception of the transmission weights fed-back from the receiver to real use thereof in the transmitter. However, there still exists possibility of inconsistency between the transmission weights and reception weights and between the communication channels due to accuracy of the delay time information and error of the transmission weight adjustment.

An MIMO communication system and an MIMO receiver of the second embodiment is a technique that can resolve these presumable drawbacks in the first embodiment. The second embodiment of this invention will be described hereinafter with reference to FIG. 3.

This MIMO communication system includes a transmitter 100 with #1 to #N antennas 102, a receiver 200 with #1 to #L antennas 201 and propagation channels 300 between the transmitter 100 and receiver 200. The transmitter 100 includes a transmission signal generator 101 for generating a transmission signal, L transmit antennas 102, a signal dividing unit 103 for dividing the transmission signal into #1 to #K signal streams according to information derived from transmission weights informed from the receiver 200 through a feedback path 400, and K transmission signal processors 104. Each transmission signal processor 104 includes a signal modulator 105 for modulating #1 to #K signal streams, respectively, a stream processor 106 for dividing respective #1 to #K modulated signal streams into #1 to #N substreams and multiplying the #1 to #N substreams by #1 to #N transmission weights derived from fed-back transmission weighs from the receiver 200, respectively, and a known symbol adder 107.

The receiver 200 includes #1 to #L receive antennas 201, a known symbol separator 202, #1 to #K equalization processors 203, a channel state estimation unit 204 for estimating state of each communication channel from received signals received by the #1 to #L antennas 201 and outputting information of channel estimation, a channel information accumulation unit 211 for accumulating the information of channel estimation for a predetermined interval, a transmission weight generator 205 for generating K*N transmission weights based on the information of channel estimation from the channel state estimation unit 204 and sending the transmission weights to the transmitter 100 through the feedback path 400, a transmission weight accumulation unit 206 for accumulating the transmission weights for a predetermined interval, a reception weight generator 212 for generating K*L reception weights by using the accumulated information of channel estimation in the channel information accumulation unit 211 and accumulated transmission weights in the transmission weight accumulation unit 206, and a signal combining unit 208 corresponding to the signal dividing unit 103 of the transmitter 100 for combining the demodulated K signal streams from K equalization processors 203 to reproduce the original transmission signal sent from the transmitter 100.

Each equalization processor 203 includes a reception weight multiplier 209 for multiplying the received #1 to #L substreams of respective #1 to #K signal streams by the #1 to #L reception weights, respectively, and a demodulator 210 for composing the #1 to #L weighted substreams to obtain respective #1 to #K composed signal streams and demodulating the #1 to #K composed signal streams, respectively.

According to the signal process carried out in the MIMO communication system of the first embodiment shown in FIG. 1, the information of channel estimation of the real time is used when the transmission weights and reception weights are generated. In contrast to the first embodiment, in this MIMO communication system of the second embodiment, the channel information accumulation unit 211 is provided for accumulating the information of channel estimation for the predetermined interval, whereby the accumulated information of channel estimation accumulated therein is used for weight generation. In other words, in the signal process carried out in the first embodiment as expressed by the expressions (5) and (6), the eigenvalue calculation is carried out based on the information of channel estimation in order to obtain the transmission weights and reception weights that are conformed to the current communication paths and used for signal transmission. However, since the transmission weights are fed-back through the feedback path, there exists time lag before the fed-back transmission weights are reflected on the transmission signal. This time lag causes disturbance of consistency with the propagation channels and degrades transmission capacity.

To solve this obstacle, this MIMO system of the second embodiment includes the channel information accumulation unit 211 as its featuring element. For the second embodiment, it becomes possible to reduce inconsistency between the transmission weights and reception weights due to feedback-delay of the transmission weights. The second embodiment will be described precisely with reference to mathematical expressions.

According to the signal process of the second embodiment, the reception weights are generated as $W_{Rk}=(Ce_k)^H$, instead of $W_{Rk}=(C'e_k)^H$ of the first embodiment. Then, the composed signal stream $y_k(t)$ is obtained as an expression (9).

$$y_k(t) = W_{Rk} C' X(t) \\ = W_{Tk}^H C^H C' \sum_{m=1}^{K} W_{Tm} S_m(t) + W_{Tk}^H C'^H n(t)$$
(9)

Figure 4:
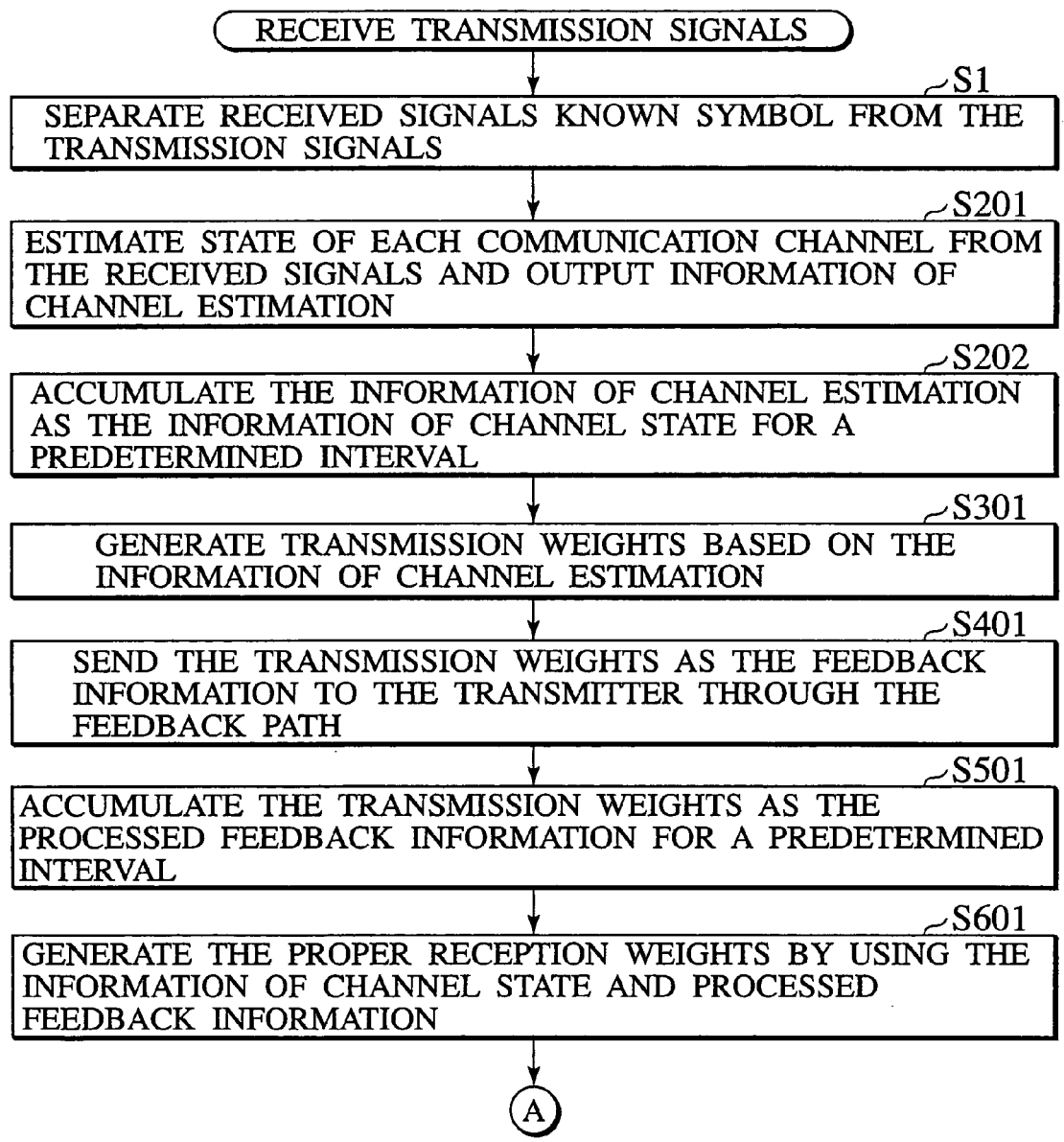
FIG. 4 is a flowchart showing an MIMO receiving method carried out by the MIMO receiver of the second embodiment.

FIG. 4 and FIG. 2B are a flowchart which illustrates this receiving method carried out in the MIMO receiver 200 of the second embodiment.

At step S1, the receiver 200 separates the received signals into the known symbol and transmission substreams.

At steps S201 and S202, the receiver 200 estimates state of each communication channel from the received signals received by the #1 to #L antennas 201 and outputs information of channel estimation and accumulates the information of channel estimation as the information of channel state for a predetermined interval.

At step S301, the receiver 200 generates K*N transmission weights based on the information of channel estimation.

At step S401, the receiver 200 sends the transmission weights as the feedback information to the transmitter 100 through the feedback path 400.

At step S501, the receiver 200 accumulates the transmission weights as the processed feedback information for a predetermined interval.

At step S601, the receiver 200 generates K*L proper reception weights by using the information of channel state and processed feedback information.

Following steps S7 through S10 are identical with those of the first embodiment as illustrated in FIG. 2B.

According to this process, it becomes possible for the second embodiment to reduce influence due to the feedback-delay and improve degradation of the communication performance.

Third Embodiment

Figure 5:
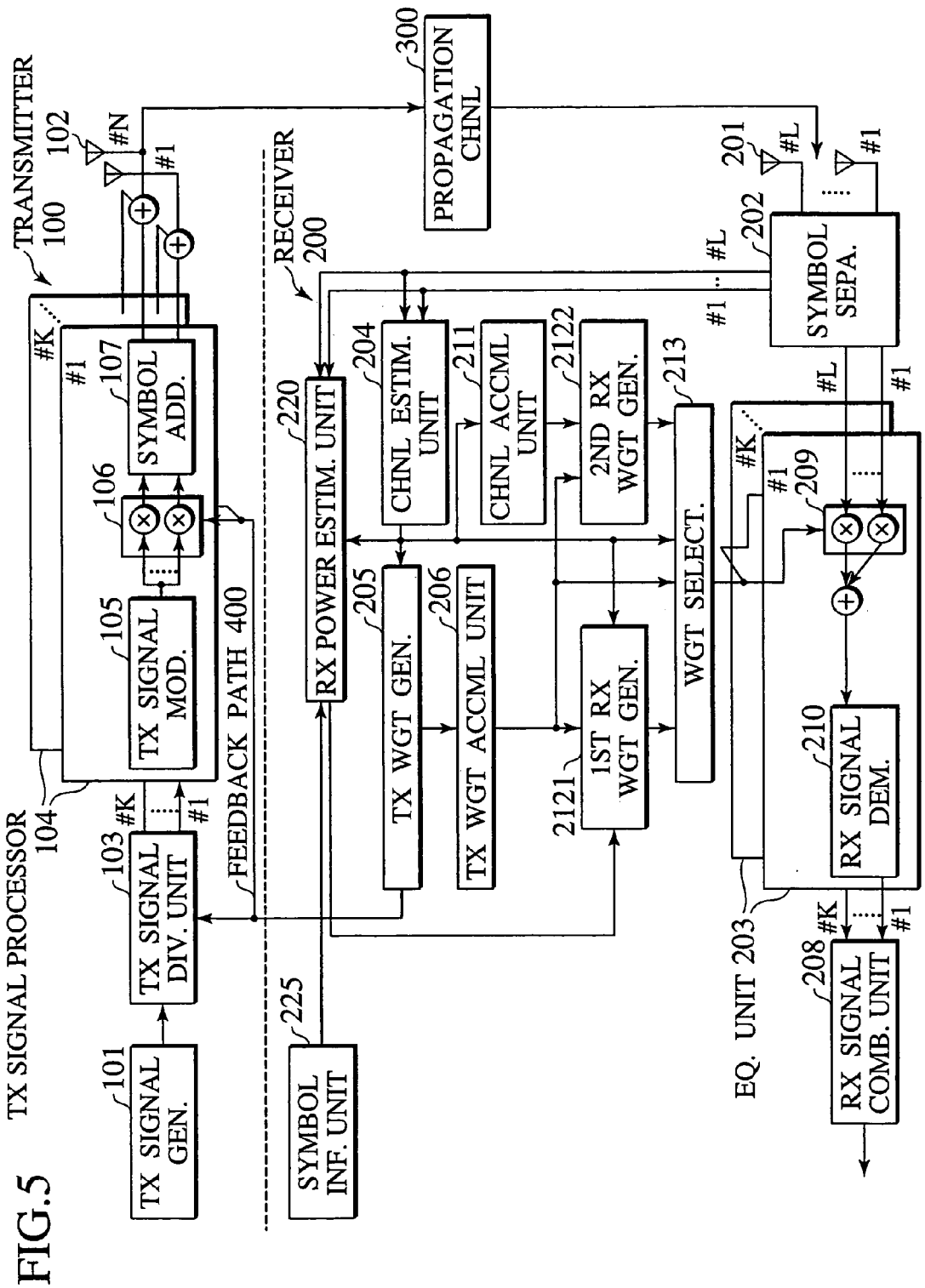
FIG. 5 is a schematic diagram showing an MIMO communication system of the third embodiment of this invention.

FIG. 5 illustrates an MIMO communication system and an MIMO receiver used therein of the third embodiment of this invention. In this MIMO communication system of the third embodiment, the functional configuration of a transmitter 100 is the same with the transmitter 100 of the MIMO communication system of the second embodiment illustrated in FIG. 3, but the functional configuration of a receiver 200 is deformed as the following. In FIG. 5, the same numbers are used for identical elements in FIG. 3.

Figure 3:
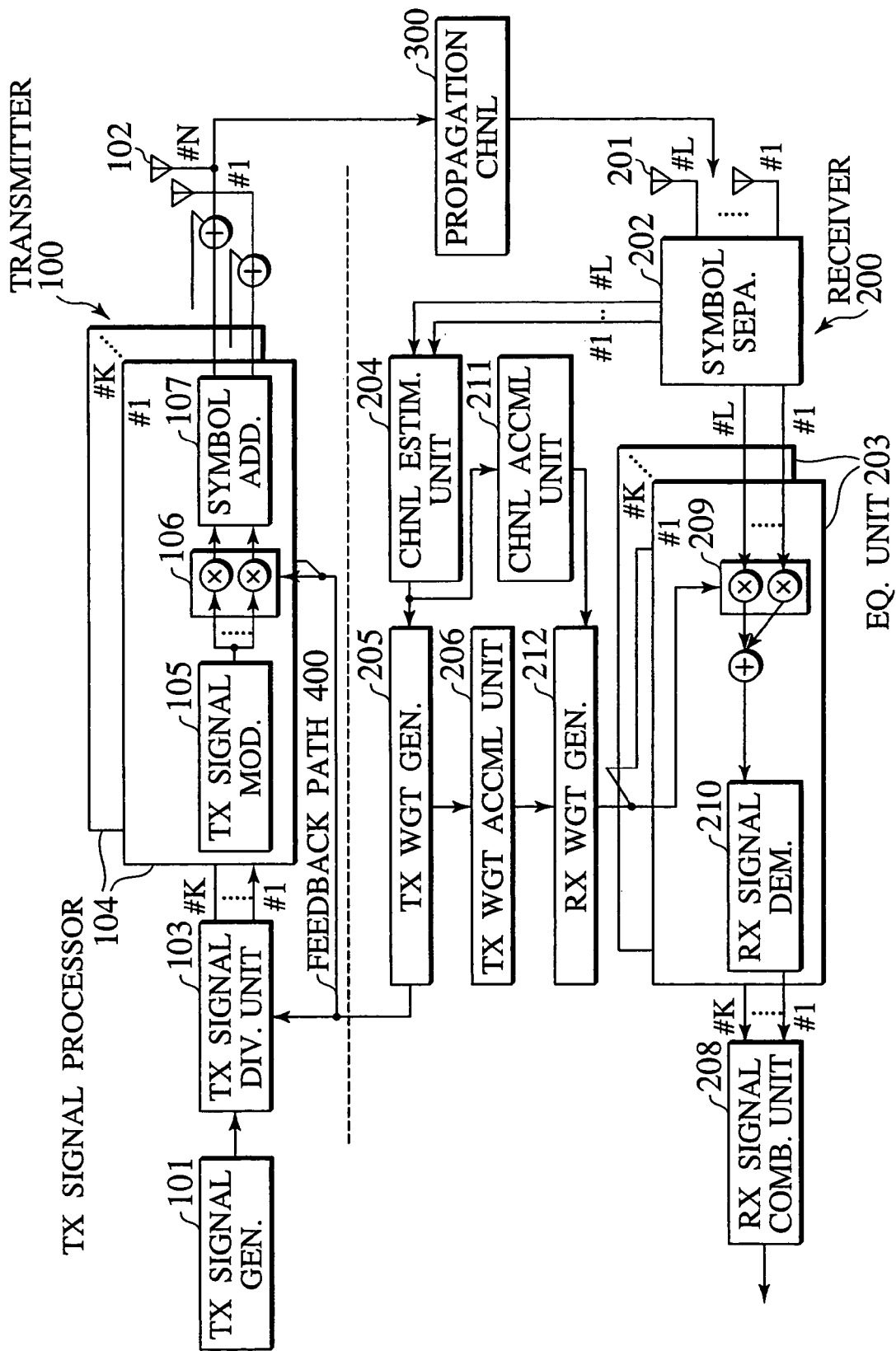
FIG. 3 is a schematic diagram showing an MIMO communication system of the second embodiment of this invention.

As illustrated in FIG. 5, the receiver 200 includes L receive antennas 201, a known symbol separator 202, K equalization processors 203, a channel state estimation unit 204, a channel information accumulation unit 211, a transmission weight generator 205, a transmission weight accumulation unit 206 and a signal combining unit 208. These elements are the same with that are comprised in the receiver 200 of the second embodiment as shown in FIG. 3.

This MIMO receiver 200 of the third embodiment further includes a first reception weight generator 2121 for generating first #1 to #L reception weights by using the information of channel estimation from the channel state estimation unit 204 and accumulated #1 to #N transmission weights in the transmission weight accumulation unit 206, and a second reception weight generator 2122 for generating second #1 to #L reception weights by using the accumulated information of channel estimation in the channel information accumulation unit 204 and accumulated #1 to #N transmission weights in the transmission weight accumulation unit 206. The first reception weight generator 2121 is identical with the reception weight generator 212 of the first embodiment, and the second reception weight generator 2122 is identical with the reception weight generator 212 of the second embodiment.

The receiver 200 further includes a received power estimation unit 220 for estimating a condition of received power by using the information of channel estimation from the channel state estimation unit 204, the received signals received by #1 to #L antennas 201 and known symbol and outputting the condition of received power to the weight selector 213, and a known symbol information unit 225.

Furthermore, the receiver 200 of the third embodiment includes a weight selector 213 for estimating a transmission quality according to the first #1 to #L reception weights from the first reception weight generator 2121, second #1 to #L reception weights from the second reception weight generator 2122, accumulated #1 to #N transmission weights, information of channel estimation and condition of received power from the received power estimation unit 220 and selecting proper #1 to #L reception weights to be used for respective #1 to #K equalization processors 203.

As for the signal process carried out in the MIMO communication system of the second embodiment, the consistency between the transmission weights and reception weights can be maintained, but consistency between the propagation channels and reception weights can be disturbed and, as a result, the communication performance can be degraded. In contrast, in the MIMO communication system of the third embodiment, generation of transmission- and reception-weights based on the current information of channel estimations as in the first embodiment in FIG. 1 and generation of transmission- and reception-weights based on the accumulated channel information as in the second embodiment in FIG. 3 are both carried out, and the weight selector 213 estimates the transmission quality according to the condition of received power in order to select the proper weights. As a result, this MIMO communication system of the third embodiment can maintain good transmission quality.

Figure 6:
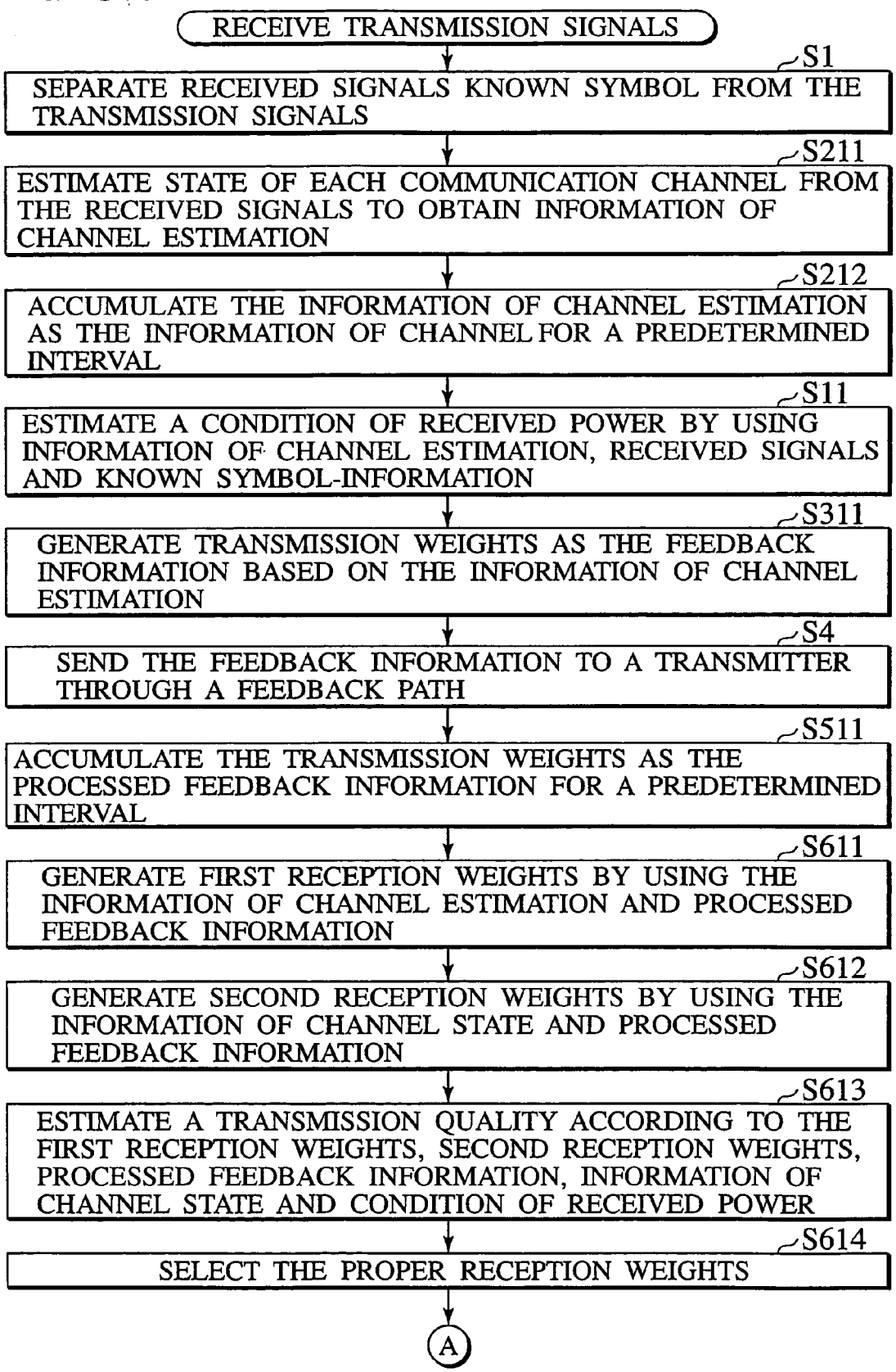
FIG. 6 is a flowchart showing an MIMO receiving method carried out by the MIMO receiver of the third embodiment.

FIG. 6 and FIG. 2B are a flowchart which illustrates this receiving method carried out in the MIMO receiver 200 of the third embodiment.

At step S1, the receiver 200 separates the received signals into the known symbol and transmission substreams.

At steps S211 and S212, the receiver 200 estimates state of each communication channel from the received signals received by the #1 to #L antennas to obtain information of channel estimation and accumulates the information of channel estimation as the information of channel state for a predetermined interval.

At step S11, the receiver 200 estimates condition of received power by using information of channel estimation, received signals received by #1 to #L antennas and information of the known symbol.

At step S311, the receiver 200 generates #1 to #N transmission weights as the feedback information based on the information of channel estimation.

At step S4, the receiver 200 sends the #1 to #N transmission weights as the feedback information to the transmitter 100 through the feedback path 400.

At step S511, the receiver 200 accumulates the #1 to #N transmission weights as the processed feedback information for a predetermined interval.

At steps S611 through S613, the receiver 200 generates first #1 to #L reception weights by using the information of channel estimation and processed feedback information, generates second #1 to #L reception weights by using the information of channel state and processed feedback information, estimates a transmission quality according to the first #1 to #L reception weights, second #1 to #L reception weights, processed feedback information, information of channel state and condition of received power, and selects the proper #1 to #L reception weights.

Following steps S7 through S10 are identical with those of the first embodiment as illustrated in FIG. 2B.

The known symbol stored in the known symbol information unit 225 is added on transmission of the transmission signal. The received power estimation unit 220 estimates the condition of the received power, or respective powers of received signals and a power of noise, by using #1 to #L channel substreams from the known symbol separator 202 as the following.

It is put $r_1$ for known symbol streams received by a first branch, $S_{training\,k}$, and $h_k$ for known symbol stream and channel estimation value of the k-th stream, respectively. Then power of received signal $P_{Sk}$ of the k-th stream and noise power $P_N$ are expressed by an expression (10).

$$P_{Sk} = (h_k S_{training\,k})^2 \qquad (10)$$

$$P_N = \left[ \frac{1}{L} \left( \sum_{l=1}^{L} r_l - \sum_{i=1}^{K} h_i S_{training\,i} \right)^2 \right]$$

The transmission quality "Capacity" is calculated by the following expression (11).

$$\text{Capacity} = \sum_{k=1}^{K} \log_2(1 + S_k/(I_k + N_k)) \qquad (11)$$

$$S_k(t) = (W_{R_k}^H A W_{T_k})^2 P_{S_k}$$

$$I_k = \sum_{\substack{m=1 \\ m \neq k}}^{K} (W_{R_k}^H A W_{T_m})^2 P_{S_m}$$

$$N_k = (W_{R_k}^H)^2 P_N$$

The first reception weights and second reception weights are respectively substituted into $W_{Rk}$ of the expression (11) as reception weights and the transmission qualities "Capacity" of respective streams are estimated, respectively. Then, one of the first reception weights and second reception weights that can produce better result is selected as the proper weights. In this procedure, it is possible to employ a process that selects the best combination which can result the best transmission quality among all combinations of reception weights used for respective streams ($2^K$ combinations for K streams) though complication of the configuration of the system increases.

According to this MIMO communication system and receiver of the third embodiment, the proper reception weights can be determined in consideration of inconsistency between the transmission weights and reception weights and inconsistency between the communication path and reception weights and therefore, it can guarantee a good communication performance independent of conditions of the communication path and feedback-delay.

Fourth Embodiment

Figure 7:
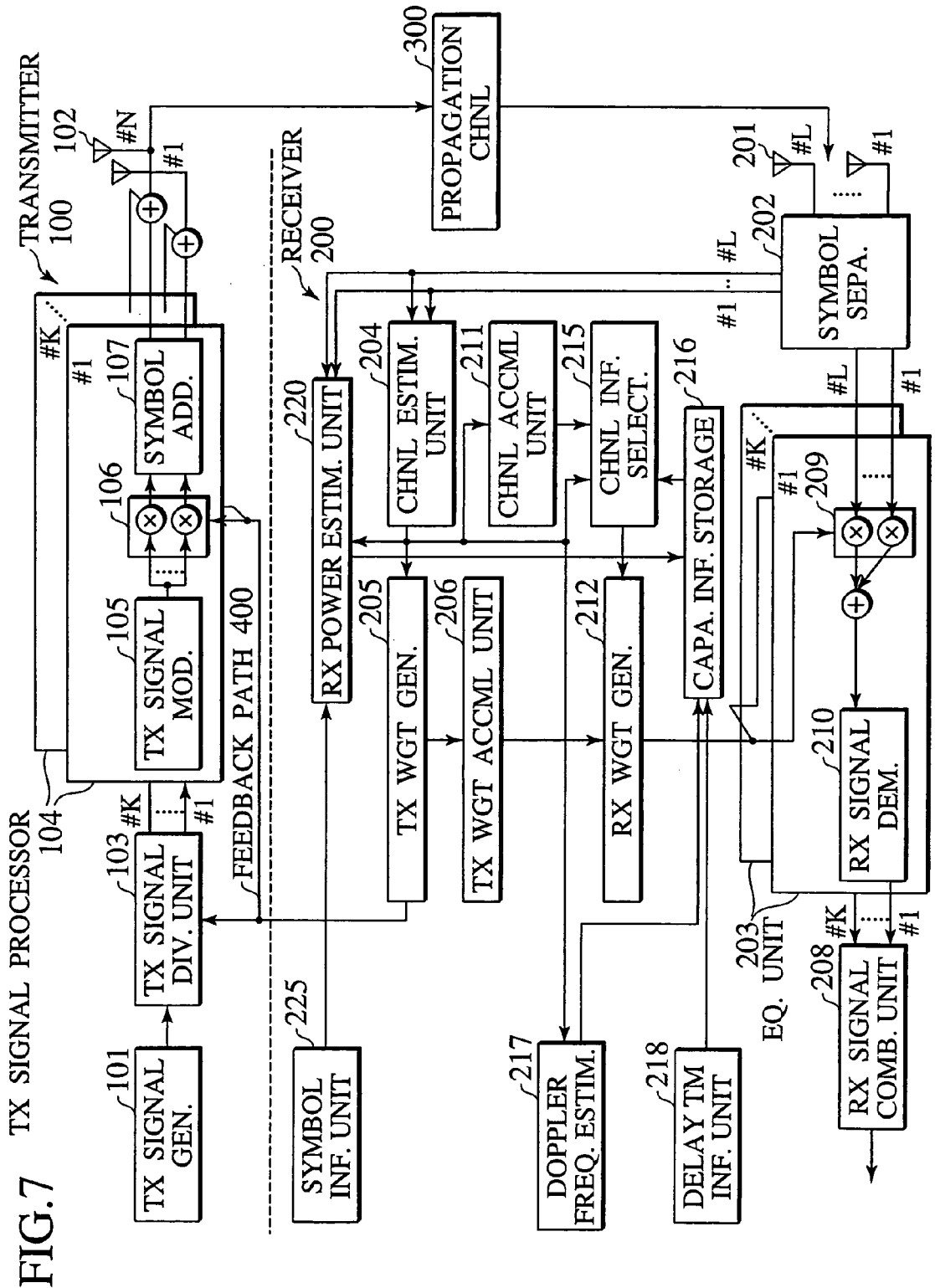
FIG. 7 is a schematic diagram showing an MIMO communication system of the fourth embodiment of this invention.

An MIMO communication system and an MIMO receiver used therein of the fourth embodiment of this invention will be described with reference to FIG. 7 hereinafter. In this MIMO communication system of the fourth embodiment, functional configuration of the transmitter 100 is identical with those of the first to third embodiments. Functional configuration of a receiver 200 of this embodiment is as the following. In FIG. 7, identical elements with those of the second embodiment shown in FIG. 3 are indicated by identical numbers.

The receiver 200 includes #1 to #L receive antennas 201, a known symbol separator 202, a channel state estimation unit 204 for estimating state of each communication channel from received signals received by the #1 to #L antennas 201 and outputting information of channel estimation, a channel information accumulation unit 211 for accumulating the information of channel estimation for a predetermined interval, a transmission weight generator 205 for generating K*N transmission weights based on the information of channel estimation from the channel state estimation unit 204 and sending the transmission weights to the transmitter 200 through a feedback path 400, and a transmission weight accumulation unit 206 for accumulating the transmission weights for a predetermined interval. This MIMO receiver 200 further includes a received power estimation unit 220 and a known symbol information unit 225, which are identical with those of the third embodiment.

This receiver 200 further includes a communication capacity information storage 216 for storing communication capacity characteristics for respective manners of weight generation, a channel information selector 215 for selecting channel information to be used for generation of K*L reception weights according to the information of channel estimation, accumulated information of channel estimation in the channel information accumulation unit 204 and condition of received power as well as the information of communication capacity stored in the communication capacity information storage 216, information of delay time and information of Doppler frequency. Furthermore, the receiver 200 includes a reception weight generator 212 for generating the reception weights by using the selected channel information from the channel information selector 215 and accumulated transmission weights in the transmission weight accumulation unit 206, K equalization processors 203, and a signal combining unit 208 for combining the demodulated K signal streams from respective equalization processors 203 to reproduce an original transmission signal that was transmitted from the transmitter 100. The received power estimation unit 220 estimates the condition of received power by using the information of channel estimation, received signals received by #1 to #L antennas 201 and known symbol from the known symbol information unit 225.

Each equalization processor 203 is identical with those of the first to third embodiments and includes a reception weight multiplier 209 for multiplying the received #1 to #L substreams of respective #1 to #K signal streams by the #1 to #L reception weights, respectively, and a demodulator 210 for composing the #1 to #L weighted substreams to obtain respective composed #1 to #K signal streams and demodulating the composed #1 to #K signal streams, respectively.

Figure 8:
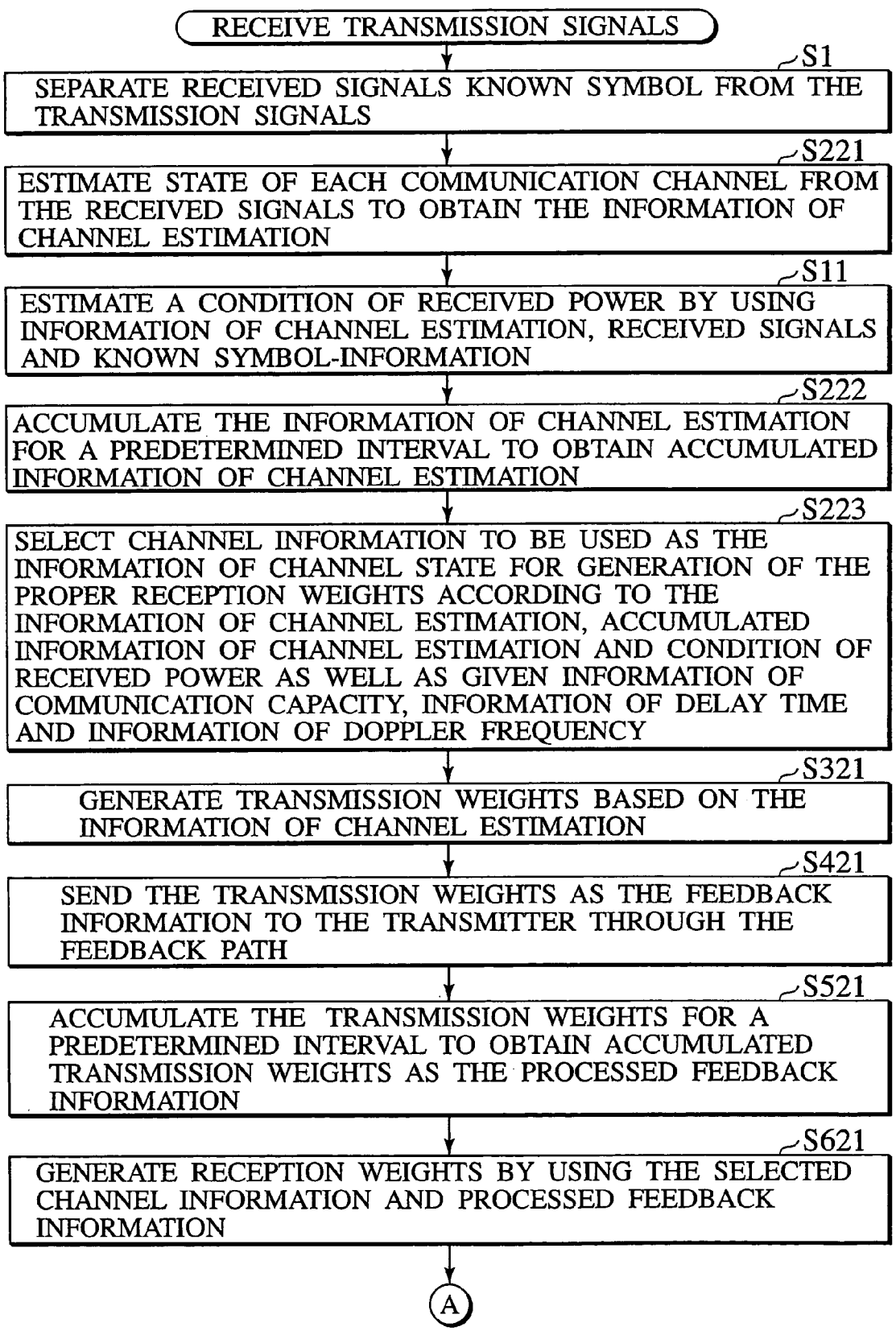
FIG. 8 is a flowchart showing an MIMO receiving method carried out by the MIMO receiver of the fourth embodiment.

FIG. 8 and FIG. 2B are a flowchart which illustrates this receiving method carried out in the MIMO receiver 200 of the fourth embodiment.

At step S1, the receiver 200 separates the received signals into the known symbol and transmission substreams.

At step S221, the receiver estimates state of each communication channel from the received signals received by the #1 to #L antennas to obtain the information of channel estimation.

At step S11, the receiver 200 estimates a condition of received power by using information of channel estimation, received signals received by #1 to #L antennas and information of the known symbol.

At steps S222 and S223, the receiver 200 accumulates the information of channel estimation for a predetermined interval to obtain accumulated information of channel estimation and selects channel information to be used as the information of channel state for generation of K*L proper reception weights according to the information of channel estimation, accumulated information of channel estimation and condition of received power as well as given information of communication capacity, information of delay time and information of Doppler frequency.

At step S321, the receiver 200 generates K*N transmission weights based on the information of channel estimation.

At step S421, the receiver 200 sends the transmission weights as the feedback information to the transmitter 100 through the feedback path 400.

At step S521, the receiver 200 accumulates the transmission weights for a predetermined interval to obtain accumulated transmission weights as the processed feedback information.

At step S621, the receiver 200 generates reception weights by using the selected channel information and processed feedback information.

Following steps S7 through S10 are identical with those of the first embodiment as illustrated in FIG. 2B.

The delay time information 218 to be input is obtained from a protocol of the system when it was designed. Doppler frequency information is estimated by Doppler frequency estimation unit 217 as follows. Doppler frequency $f_D$ is obtained from an expression (12), when $h_1$ is put as a channel response estimated at time $t_1$ and $h_2$ as a channel response estimated at time $t_2$.

$$f_D = \frac{\tan^{-1}(\text{Im}(h_2)/\text{Re}(h_2)) - \tan^{-1}(\text{Im}(h_1)/\text{Re}(h_1))}{2\pi(t_2 - t_1)} \quad (12)$$

In this expression (12), Re(x) and Im(x) express operations of taking the real part and imaginary part, respectively.

Figure 9:
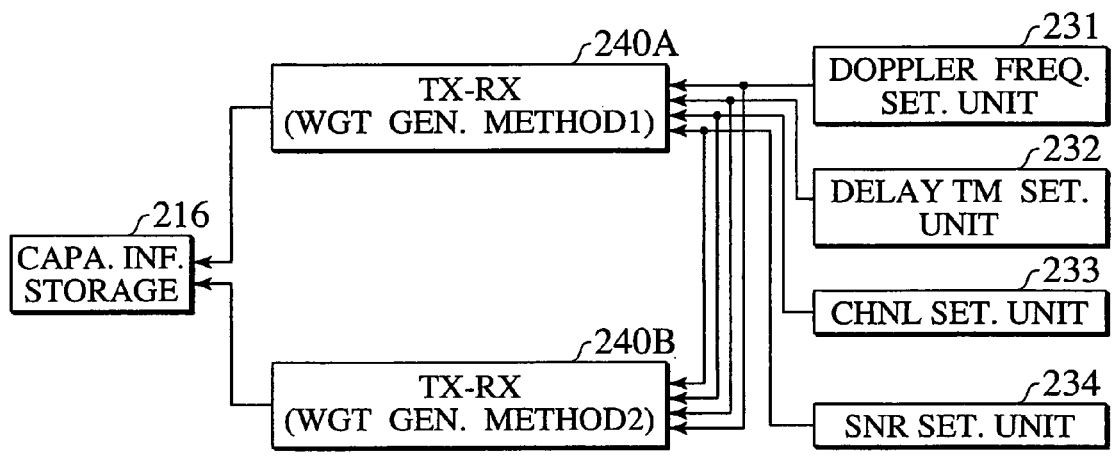
FIG. 9 is a schematic diagram showing functional configuration of storage of communication capacity related information comprised in an MIMO receiver of the MIMO communication system of the fourth embodiment of this invention.
Figure 10:
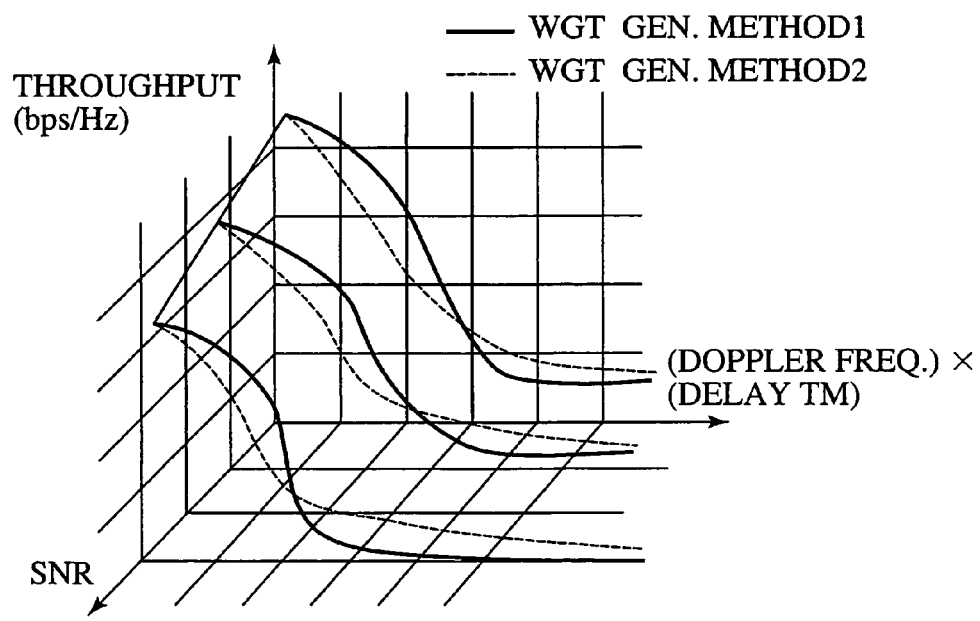
FIG. 10 is a graph showing characteristics of communication capacity stored in the storage of communication capacity related information.

An acquisition method of communication capacity characteristics for acquiring the communication capacity characteristics to be stored in communication capacity information storage 216 is as follows. Computer simulators 240A and 240B of the communication system as shown in FIG. 9 are used. Various parameters such as a range of Doppler frequency, information of time delay, characteristics of channel fluctuation, an SNR of reception to be used are set to these simulators 240A and 240B by Doppler frequency setter 231, a time delay setter 232, a channel characteristics setter 233 and an SNR setter 234, and the communication capacity characteristics applicable to respective generation methods of the weights are calculated out to store in the communication capacity information storage 216 before the real communication. An example of the communication capacity characteristics to be stored in the storage 216 is shown in FIG. 10. In FIG. 10, the solid line shows the communication capacity characteristics by the generation method 1 carried out in the simulator 240A and the dotted line shows the communication capacity characteristics by the method 2 carried out in the simulator 240B.

The channel information selector 215 uses these communication capacity characteristics for selecting the proper channel information corresponding to a set of weights which can give better characteristics for the current channel state and outputs the selected information to the reception weight generator 212.

The fourth embodiment can result identical effects as those of the third embodiment though their configurations are different. The merit of the fourth embodiment is that it can reduce the number of weigh generators and lowers complexity of configuration of the receiver by means of the usage of characteristics data obtained beforehand. Furthermore, it becomes possible to obtain more accurate channel information in the channel information selector by employing a method of proper weighting and composition as well as the method of selection between two sets of channel information.

Fifth Embodiment

Figure 11:
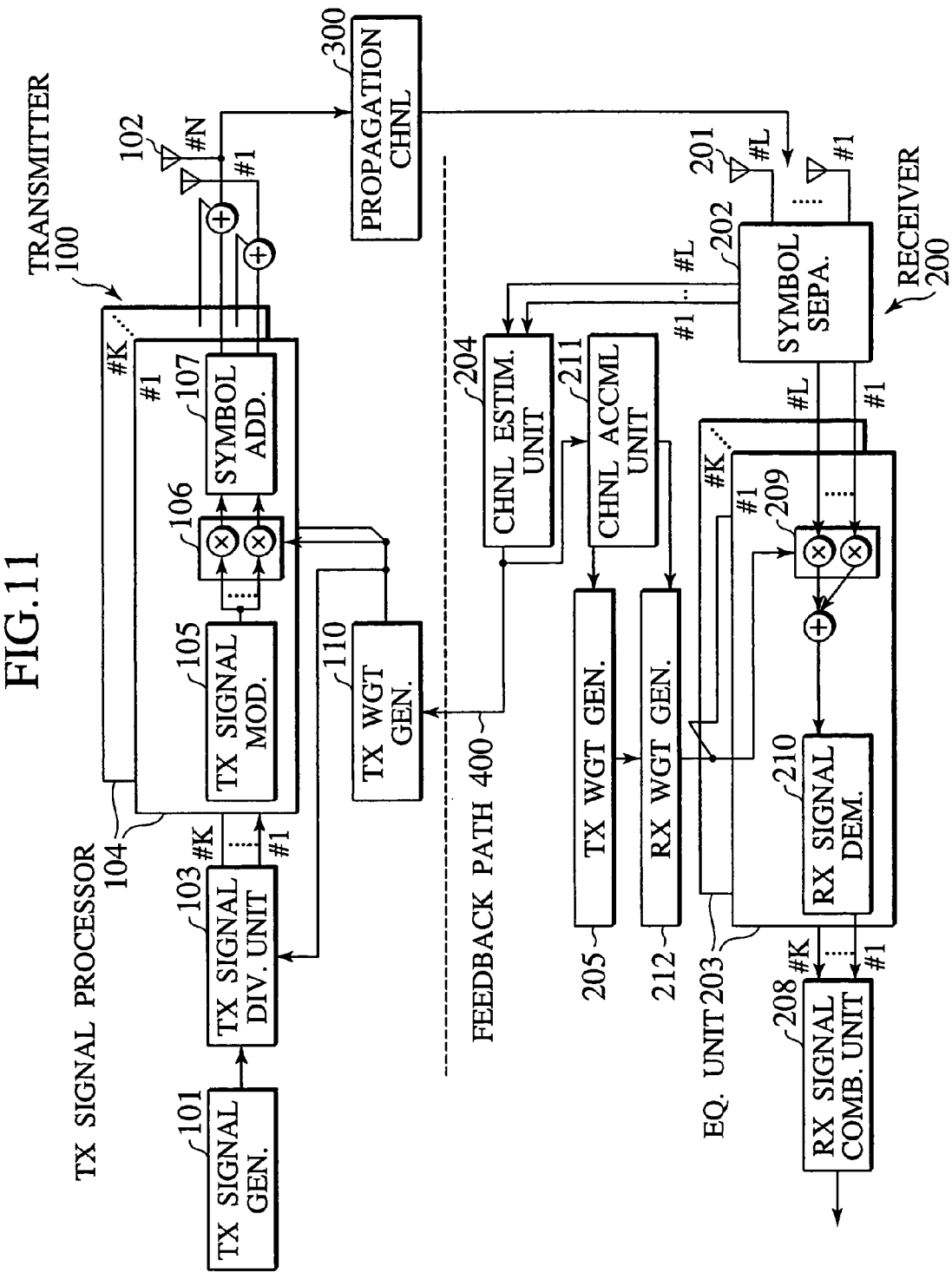
FIG. 11 is a schematic diagram showing an MIMO communication system of the fifth embodiment of this invention.

An MIMO communication system and an MIMO receiver used therein will be described hereinafter with reference to FIG. 11. In this MIMO communication system of the fifth embodiment, communication channel information is used as feedback information in contrast to the second embodiment shown in FIG. 3. As described afterward, it is possible to use some kinds of processed information as the channel information to be fed-back. For instance, a quantized value of estimated value of channel information can be used instead of the estimated value of channel information itself.

In this MIMO communication system, a transmitter 100 includes a transmission signal generator 101 for generating a transmission signal, #1 to #L transmit antennas 102, a signal dividing unit 103 for dividing the transmission signal into #1 to #K signal streams according to the sender-side transmission weights, #1 to #K transmission signal processors 104 for processing the divided #1 to #K signal streams and outputting to the #1 to #N antennas 102. Additionally, the transmitter 100 further includes a sender-side transmission weight generator 110 for generating sender-side K*N transmission weights by using information of channel estimation informed from a receiver 200 through a feedback path 400. Each of #1 to #K respective transmission signal processors 104 includes a signal modulator 105 for modulating the #1 to #K signal streams, respectively, a stream processor 106 for dividing respective #1 to #K modulated signal streams into #1 to #N substreams and multiplying the #1 to #N substreams by the sender-side #1 to #N transmission weights, respectively, and a known symbol adder 107 for adding known symbol to respective weighted substreams.

The receiver 200 of this MIMO communication system includes L receive antennas 201, a known symbol separator 202, K equalization processors 203, a channel state estimation unit 204, a channel information accumulation unit 211, a receiver-side transmission weight generator 205, a reception weight generator 212 and a signal combining unit 208.

In this receiver 200, the channel state estimation unit 204 estimates state of each communication channel from received signals received by the #1 to #L antennas to obtain the information of channel estimation and sends the information of channel estimation to the transmitter 100 through the feedback path 400. The channel information accumulation unit 211 accumulates the information of channel estimation for a predetermined interval. The receiver-side transmission weight generator 205 generates receiver-side K*N transmission weights based on the accumulated information of channel estimation in the channel information accumulation unit 211. The reception weight generator 212 generates K*N reception weights by using the accumulated information of channel estimation in the channel information accumulation unit 211 and receiver-side transmission weights from the receiver-side transmission weight generator 205.

Each of #1 to #K equalization processors 203 includes a reception weight multiplier 209 for multiplying the received #1 to #L substreams of respective #1 to #K signal streams by the #1 to #L reception weights, respectively, and a demodulator 210 for composing the #1 to #L weighted substreams to obtain respective composed #1 to #K signal streams and demodulating the composed #1 to #K signal streams, respectively. The signal combining unit 208 corresponds to the signal dividing unit 103 of the transmitter 100 and combines the demodulated composed K signal streams from the demodulator 210 to reproduce an original transmission signal.

Figure 12B:
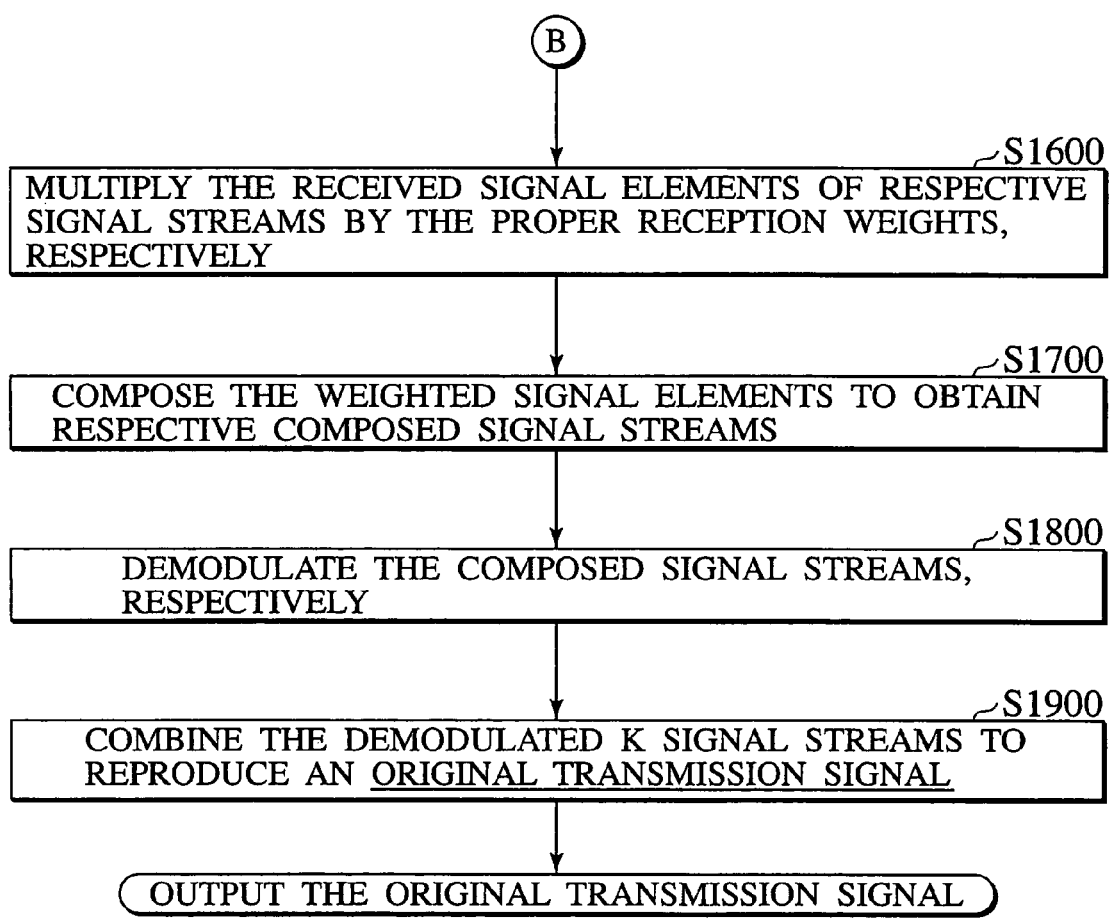

A signal process carried out by the MIMO communication system of the fifth embodiment will be described hereinafter. FIG. 12A and FIG. 12B are a flowchart which illustrates this receiving method carried out in the MIMO receiver 200 of the fifth embodiment.

At step S1000, the receiver 200 separates the received signals into the known symbol and transmission substreams.

At step S1101, the receiver 200 estimates state of each communication channel from the received signals received by the #1 to #L antennas 201 to obtain information of channel estimation as the primitive feedback information.

At step S1201, the receiver 200 makes the primitive feedback information itself as the feedback information.

At step S1300, the receiver 200 sends the feedback information to the transmitter 100 through the feedback path 400.

At steps S1401 and S1402, the receiver 200 accumulates the feedback information for a predetermined interval and generates receiver-side K*N transmission weights as the feedback-delay compensated feedback information based on the accumulated feedback information on the step S1401.

At step S1501, the receiver 200 generates K*L proper reception weights by using the accumulated feedback information and feedback-delay compensated feedback information.

At step S1600, the receiver 200 multiplies the received #1 to #L substreams of respective #1 to #K signal streams by the proper #1 to #L reception weights, respectively.

At step S1700, the receiver 200 composes the #1 to #L weighted substreams to obtain respective composed #1 to #K signal streams.

At step S1800, the receiver 200 demodulates the composed #1 to #K signal streams, respectively.

At step S1900, the receiver 200 combines the demodulated K signal streams to reproduce the original transmission signal.

In a case that there exists P paths in propagation channels and OFDM (Orthogonal Frequency Division Multiplexing) transmission system using M subcarriers (P<M) is used, by changing feedback information from weight information to channel information, it is possible to reduce total quantity of transmission information through the feedback path to N*L*P for the channel information from N*L*M for the weight information. By this reason set forth above, in this fifth embodiment, the feedback information is changed from the weight information that is used in the second embodiment to the channel information. Furthermore, the transmitter-side transmission weight generator 110 is newly employed in the transmitter 100 in accordance with the change of feedback information. The transmitter-side transmission weight generator 110 carries out the eigenvalue operation of the expression (4) or singular value operation to obtain an eigenvector, and sets the eigenvector as the expression (5).

According to this fifth embodiment, though the feedback information and functional configurations of the transmitter 100 and receiver 200 are slightly different from those of the second embodiment, the effectiveness of reduction of inconsistency between the transmission weights and reception weights is identical with that of the second embodiment. Consequently, it is possible to lower influence of feedback-delay and improve the degradation of transmission characteristics.

The MIMO communication system of the fifth embodiment features the change of feedback information to the channel estimation information from the weight information that is used in the second embodiment. This change is also applicable to the third and fourth embodiments. Hereinafter, those embodiments will be described as the sixth and seventh embodiments.

Sixth Embodiment

Figure 13:
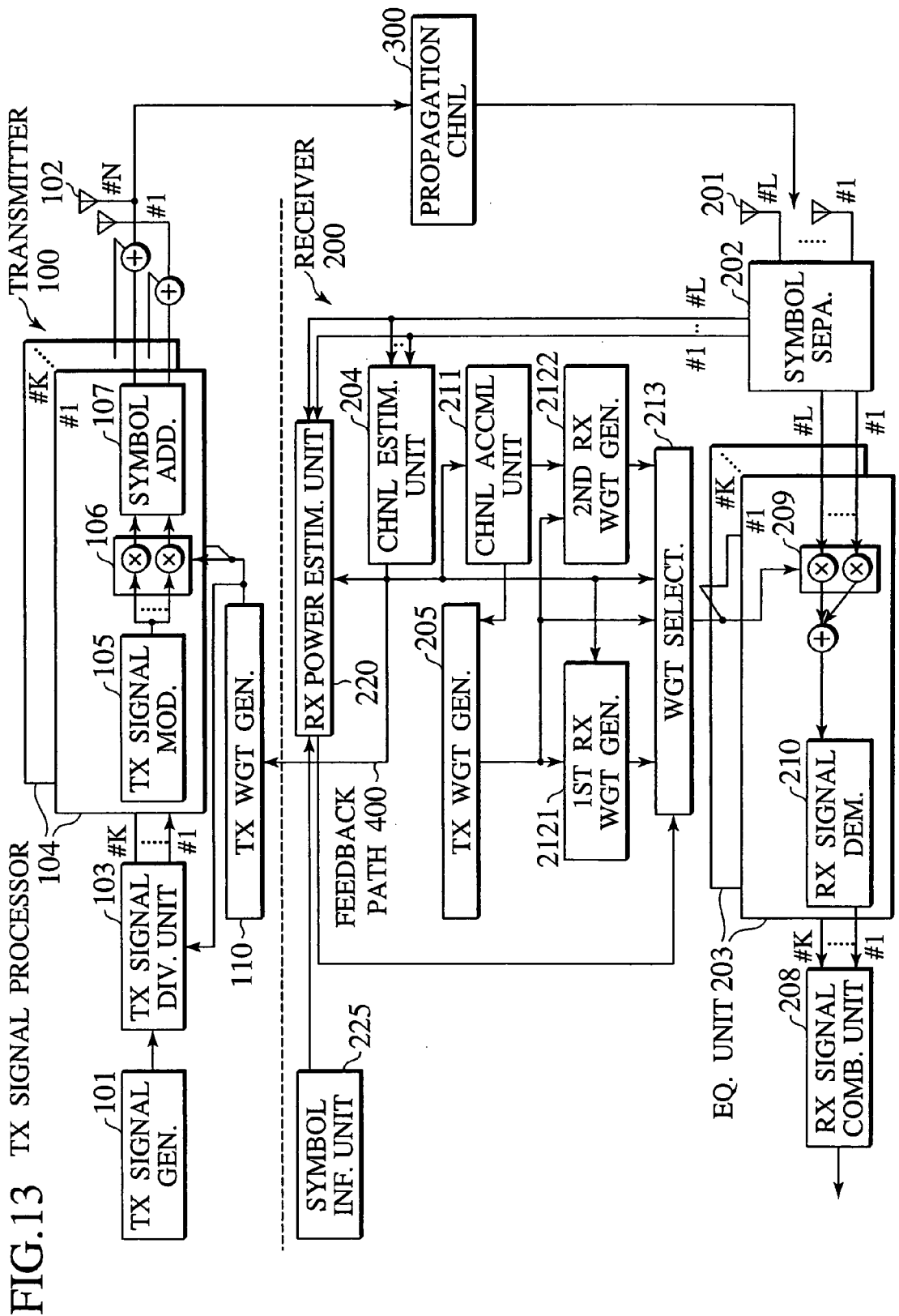
FIG. 13 is a schematic diagram showing an MIMO communication system of the sixth embodiment of this invention.

An MIMO communication system and an MIMO receiver used therein of the sixth embodiment will be described hereinafter with reference to FIG. 13. Functional configuration of a transmission 100 of the sixth embodiment is identical with that of the transmission of the fifth embodiment shown in FIG. 11.

A receiver 200 of this embodiment includes #1 to #L transmit antennas 201, a known symbol separator 202, #1 to #K equalization processors 203, and a channel state estimation unit 204 for estimating state of each communication channel from received signals received by the #1 to #L antennas 201 to obtain information of channel estimation and sending the information of channel estimation to the transmitter 100 through a feedback path 400.

The receiver 200 further includes a received power estimation unit 220 for estimating a condition of received power by using the information of channel estimation, received signals received by #1 to #L antennas 201 and known symbol, a channel information accumulation unit 211 for accumulating the information of channel estimation for a predetermined interval, a receiver-side transmission weight generator 205 for generating K*N receiver-side transmission weights based on the accumulated information of channel estimation, a first reception weight generator 2121 for generating K*L first reception weights by using the information of channel estimation from the channel state estimation unit 204 and receiver-side transmission weights from the receiver-side transmission weight generator 205, a second reception weight generator 2122 for generating K*L second reception weights by using the accumulated information of channel estimation in the channel information accumulation unit 211 and receiver-side transmission weights from the receiver-side transmission weight generator 205, and a weight selector 213 for estimating a transmission quality according to the first reception weights, second reception weights, receiver-side transmission weights, information of channel estimation and condition of received power, and selecting K*L proper reception weights to be used in respective equalization processors 203, and a signal combining unit 208 corresponding to the signal dividing unit 103 of the transmitter 100.

Each equalization processor 203 includes a reception weight multiplier 209 for multiplying the received #1 to #L substreams of respective #1 to #K signal streams by selected #1 to #L reception weights from the weight selector, and a demodulator 210 for composing the #1 to #L weighted substreams to obtain respective composed #1 to #K signal streams and demodulating the composed #1 to #K signal streams, respectively. The signal combining unit 208 combines the demodulated K signal streams from the demodulator 210 to reproduce an original transmission signal.

According to this MIMO communication system of the sixth embodiment, in the transmitter 100, the sender-side transmission weight generator 110 generates the sender-side transmission weights by using the information of channel estimation fed-back from the receiver 200 before signal transmission. The transmission signal generator 101 generates a transmission signal and the transmission signal dividing unit 103 divides the transmission signal into #1 to #K signal streams by using the sender-side transmission weights generated by the sender-side transmission weight generator 110. In #1 to K respective transmission signal processors 104, the signal modulator 105 demodulates respective signal streams. Also, in the respective signal processors 104, the stream processor 106 divides respective modulated signal streams into #1 to #N transmission substreams and multiplies respective substreams by the #1 to #N transmission signal weights, respectively, and known symbol adder 107 adds known symbol to respective #1 to #N substreams. #1 substreams outputted from respective #1 to #K signal processors 104 are composed and transmitted from #1 transmit antenna 102, #2 substreams from respective signal processors 104 are also composed by the same manner and transmitted from #2 antenna, and other substreams are also composed by the same manner and transmitted from respective transmit antennas to the communication channels 300.

In the receiver 200, the channel state estimation unit 204 estimates the state of each communication channel from the received signals received by the #1 to #L antennas 201 to obtain the information of channel estimation and sends the information of channel estimation to the transmitter 100 through the feedback path 400. The received power estimation unit 220 estimates condition of received power by using the information of channel estimation, received signals received by #1 to #L antennas 201 and known symbol from the known symbol information unit 225. The channel information accumulation unit 211 accumulates the information of channel estimation for a predetermined interval. The receiver-side transmission weight generator 205 generates K*N receiver-side transmission weights based on the accumulated information of channel estimation in the channel information accumulation unit 211. The first reception weight generator 2121 generates K*L first reception weights by using the information of channel estimation from the channel state estimation unit 204 and receiver-side transmission weights from the receiver-side transmission weight generator 205. The second reception weight generator 2122 generates K*L second reception weights by using the accumulated information of channel estimation in the channel information accumulation unit 211 and receiver-side transmission weights from the receiver-side transmission weight generator 205. The weight selector 213 estimates a transmission quality according to the first reception weights, second reception weights, receiver-side transmission weights, information of channel estimation and condition of received power, and selects proper #1 to #L reception weights to be used in each equalization processor 203.

In each equalization processor 203, the reception weight multiplier 209 multiplies the received #1 to #L substreams of respective #1 to #K signal streams by selected #1 to #L reception weights from the weight selector 213. The demodulator 210 composes the #1 to #L weighted substreams to obtain composed signal stream of one of #1 to #K signal streams and demodulates the composed signal stream. The signal combining unit 208 combines the demodulated K signal streams from #1 to #K respective demodulators to reproduce the original transmission signal.

Figure 14:
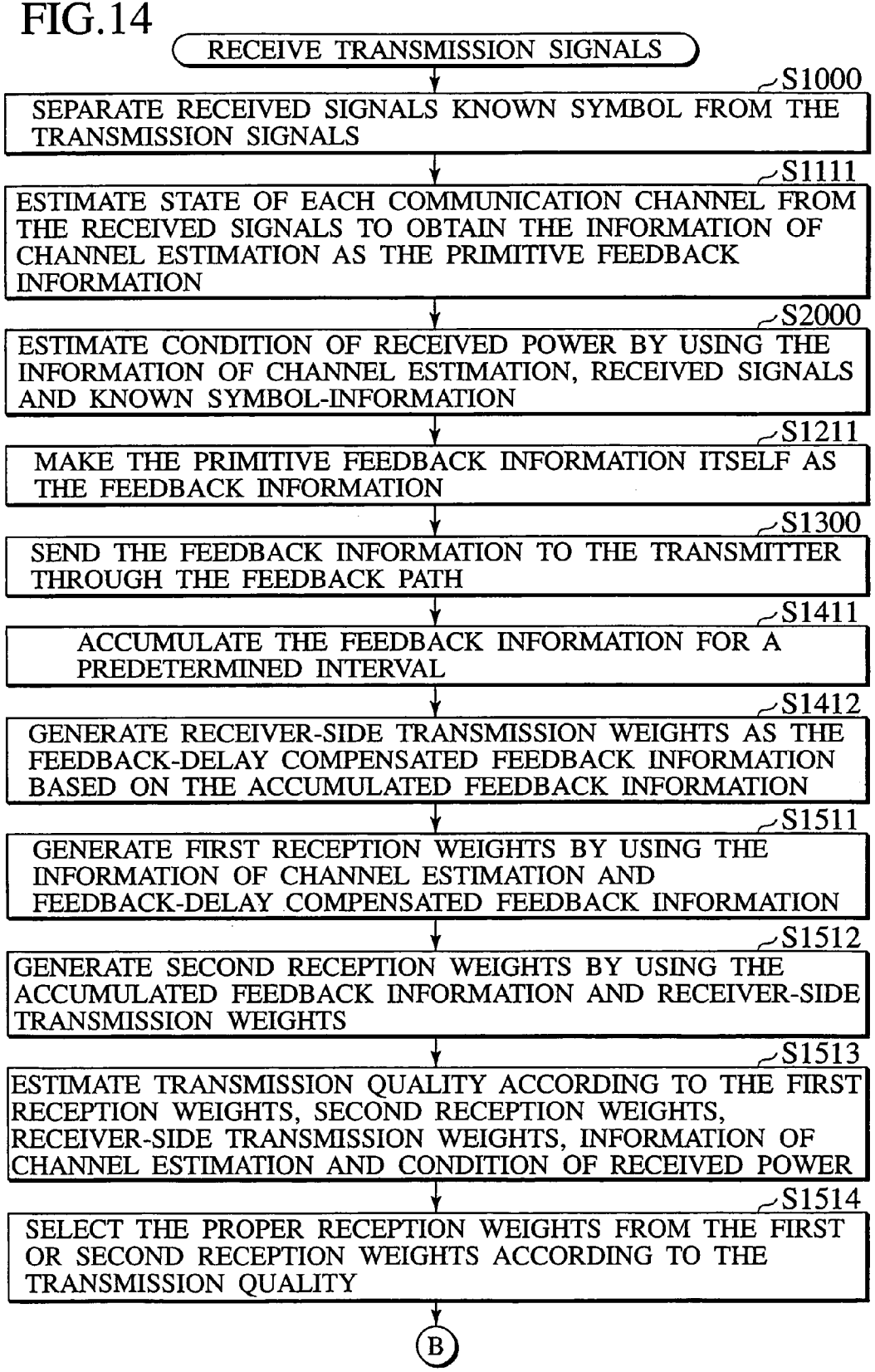
FIG. 14 is a flowchart showing an MIMO receiving method carried out by the MIMO receiver of the sixth embodiment.

FIG. 14 and FIG. 12B are a flowchart which illustrates this receiving method carried out in the MIMO receiver 200 of the sixth embodiment.

At step S1000, the receiver 200 separates the received signals into the known symbol and transmission substreams.

At step S1111, the receiver 200 estimates state of each communication channel from the received signals received by the #1 to #L antennas 201 to obtain the information of channel estimation as the primitive feedback information.

At step S2000, the receiver 200 estimates condition of received power by using information of channel estimation, received signals received by the #1 to #L antennas 201 and information of the known symbol.

At step S1211, the receiver 200 makes the primitive feedback information itself as the feedback information.

At step S1300, the receiver 200 sends the feedback information to the transmitter 100 through the feedback path 400.

At steps S1411 and S1412, the receiver accumulates the feedback information for a predetermined interval and generates K*N receiver-side transmission weights as the feedback-delay compensated feedback information based on the accumulated feedback information on the step S1411.

At steps S1511 through S1514, the receiver 200 generates K*L first reception weights by using the information of channel estimation and feedback-delay compensated feedback information, generates K*L second reception weights by using the accumulated feedback information on the step S1411 and receiver-side transmission weights obtained on the step S1511, estimates transmission quality according to the first #1 to #L reception weights, second #1 to #L reception weights, receiver-side #1 to #N transmission weights, information of channel estimation and condition of received power, and selects K*L proper reception weights from the first or second reception weights according to the transmission quality.

Following steps S1600 through S1900 are identical with those of the sixth embodiment as illustrated in FIG. 12B.

This MIMO communication system and MIMO receiver 200 used therein of the sixth embodiment have operation/effects identical with that of the fifth embodiment on top of that of the third embodiment. Namely, it can reduce total quantity of transmission information through the feedback path by using the channel information as the feedback information fed-back to the transmitter 100 from the receiver.

Seventh Embodiment

Figure 15:
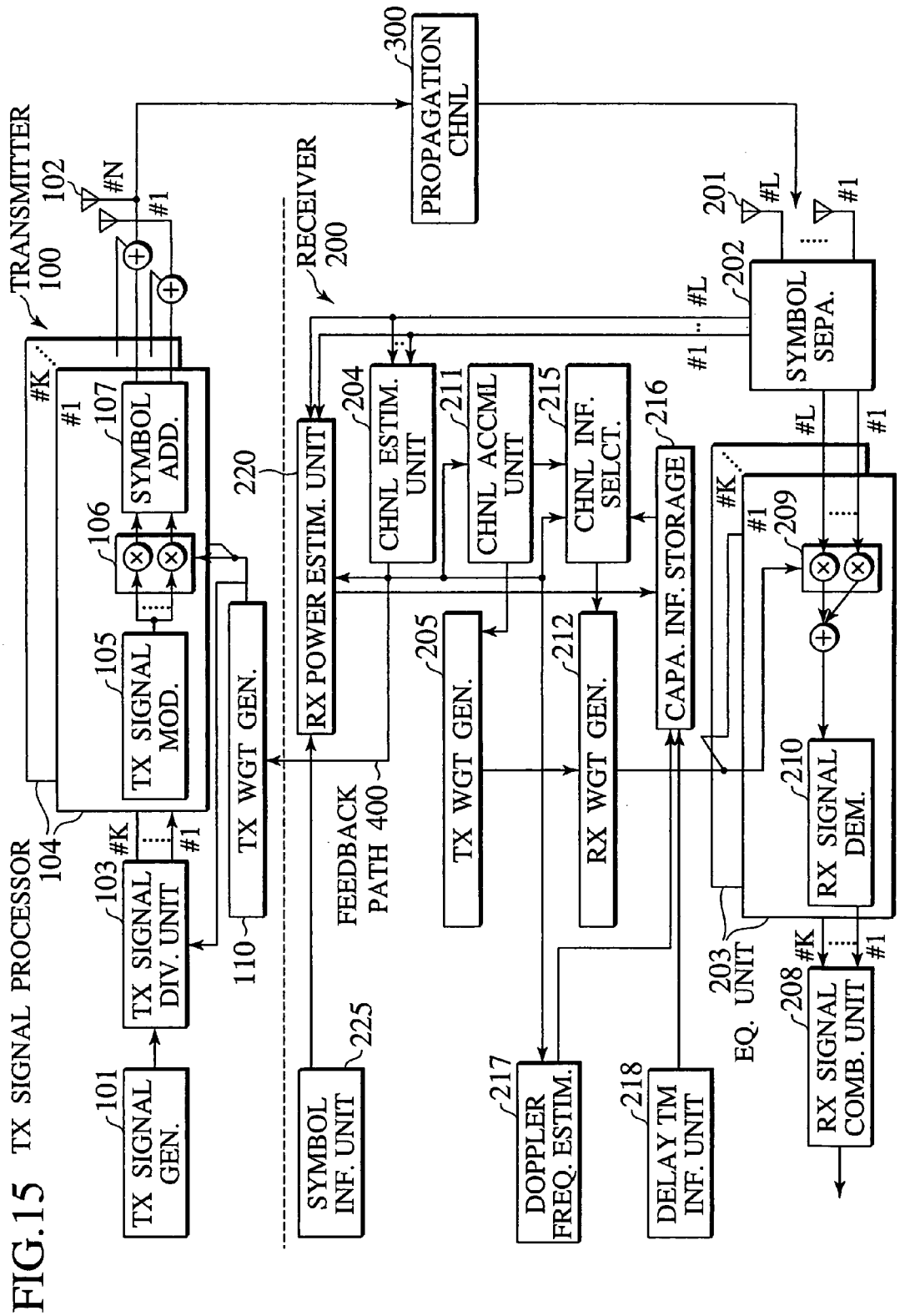
FIG. 15 is a schematic diagram showing an MIMO communication system of the seventh embodiment of this invention.

An MIMO communication system and an MIMO receiver used therein of the seventh embodiment of this invention will be described hereinafter with reference to FIG. 15.

A transmitter 100 of this MIMO communication system of the seventh embodiment has identical configuration with that of the sixth embodiment.

A receiver 200 of this embodiment includes #1 to #L receive antennas 201, a known symbol adder 202, #1 to #K equalization processors 203 and a channel state estimation unit 204 for estimating state of each communication channel from received signals received by the #1 to #L antennas 201 to obtain information of channel estimation and sending the information of channel estimation to the transmitter 100 through a feedback path 400. These elements are identical with those of the sixth embodiments.

The receiver 200 further includes a received power estimation unit 220 for estimating a condition of received power by using the information of channel estimation, received signals received by #1 to #L antennas 201 and known symbol, a channel information accumulation unit 211 for accumulating the information of channel estimation for a predetermined interval, and a receiver-side transmission weight generator 205 for generating K*N receiver-side transmission weights based on the accumulated information of channel estimation in the channel information accumulation unit 211.

The receiver 200 further includes a communication capacity information storage 216 for storing communication capacity characteristics for respective manners of weight generation, a channel information selector 215 for selecting channel information to be used for generation of K*L reception weights according to the information of channel estimation, accumulated information of channel estimation in the channel information accumulation unit 204 and condition of received power as well as the information of communication capacity stored in the communication capacity information storage 216, information of delay time and information of Doppler frequency. Furthermore, the receiver 200 includes a reception weight generator 212 for generating K*L reception weights by using the selected channel information from the channel information selector 215 and accumulated transmission weights in the transmission weight accumulation unit 206, K equalization processors 203, and a signal combining unit 208 for combining the demodulated K signal streams from respective equalization processors 203 to reproduce an original transmission signal that was transmitted from the transmitter 100.

Each of #1 to #K equalization processors 203 includes a reception weight multiplier 209 for multiplying the received #1 to #L substreams of respective #1 to #K signal streams by the #1 to #L reception weights, respectively, and a demodulator 210 for composing the #1 to #L weighted substreams to obtain respective #1 to #K composed signal streams and demodulating the #1 to #K composed signal streams, respectively.

A delay time information unit 218 and Doppler frequency estimation unit 217 are identical with those of the fourth embodiment. An acquisition method for acquiring the communication capacity characteristics to be stored in the communication capacity information storage 216 is also identical with that of the fourth embodiment. The channel information selector 215 uses these communication capacity characteristics to select the proper channel information corresponding to a set of weights which can give better characteristics for the current channel state and outputs the selected information to the reception weight generator 212.

According to this MIMO communication system, in the transmitter 100, the sender-side transmission weight generator 110 generates K*N sender-side transmission weights by using the information of channel estimation fed-back from the receiver 200. The transmission signal generator 101 generates a transmission signal and the transmission signal dividing unit 103 divides the transmission signal into #1 to #K signal streams according to the sender-side transmission weights generated by the sender-side transmission weight generator 110. In #1 to K respective transmission signal processors 104, the signal modulator 105 demodulates respective signal streams. Also, in the respective signal processors 104, the stream processor 106 divides respective modulated signal streams into #1 to #N transmission substreams and multiplies respective substreams by the #1 to #N transmission signal weights, respectively, and known symbol adder 107 adds a known symbol to respective #1 to #N substreams. #1 substreams outputted from respective #1 to #K signal processors 104 are composed and transmitted from #1 transmit antenna 102, #2 substreams from respective signal processors 104 are also composed by the same manner and transmitted from #2 antenna, and other substreams are also composed by the same manner and transmitted from respective transmit antennas to the communication channels 300, respectively.

In the receiver 200, the channel state estimation unit 204 estimates state of each communication channel from the received signals received by the #1 to #L antennas 201 to obtain information of channel estimation and sends the information of channel estimation to the transmitter 100 through the feedback path 400. The received power estimation unit 220 estimates a condition of received power by using the information of channel estimation, received signals received by #1 to #L antennas 201 and known symbol from the known symbol information unit 225. The channel information accumulation unit 211 accumulates the information of channel estimation for a predetermined interval. The receiver-side transmission weight generator 205 generates K*N receiver-side transmission weights based on the accumulated information of channel estimation in the channel information accumulation unit 211. The channel information selector 215 selects proper channel information to be used for generation of K*L reception weights according to the information of channel estimation, accumulated information of channel estimation in the channel information accumulation unit 211 and condition of received power as well as given information of communication capacity, information of delay time and information of Doppler frequency. The reception weight generator 212 generates the reception weights by using the selected channel information from the channel information selector 215 and receiver-side transmission weights from the receiver-side transmission weight generator 205. In each equalization processor 203, the reception weight multiplier 209 multiplies the received #1 to #L substreams of respective #1 to #K signal streams by the #1 to #L reception weights, and the demodulator 210 composes the #1 to #L weighted substreams to obtain respective composed #1 to #K signal streams and demodulates the composed #1 to #K signal streams. The signal combining unit 208 combines the demodulated K signal streams from respective equalization processors 203 by a manner corresponding to that of the signal dividing unit 103 of the transmitter 100 and reproduces the original transmission signal.

Figure 16:
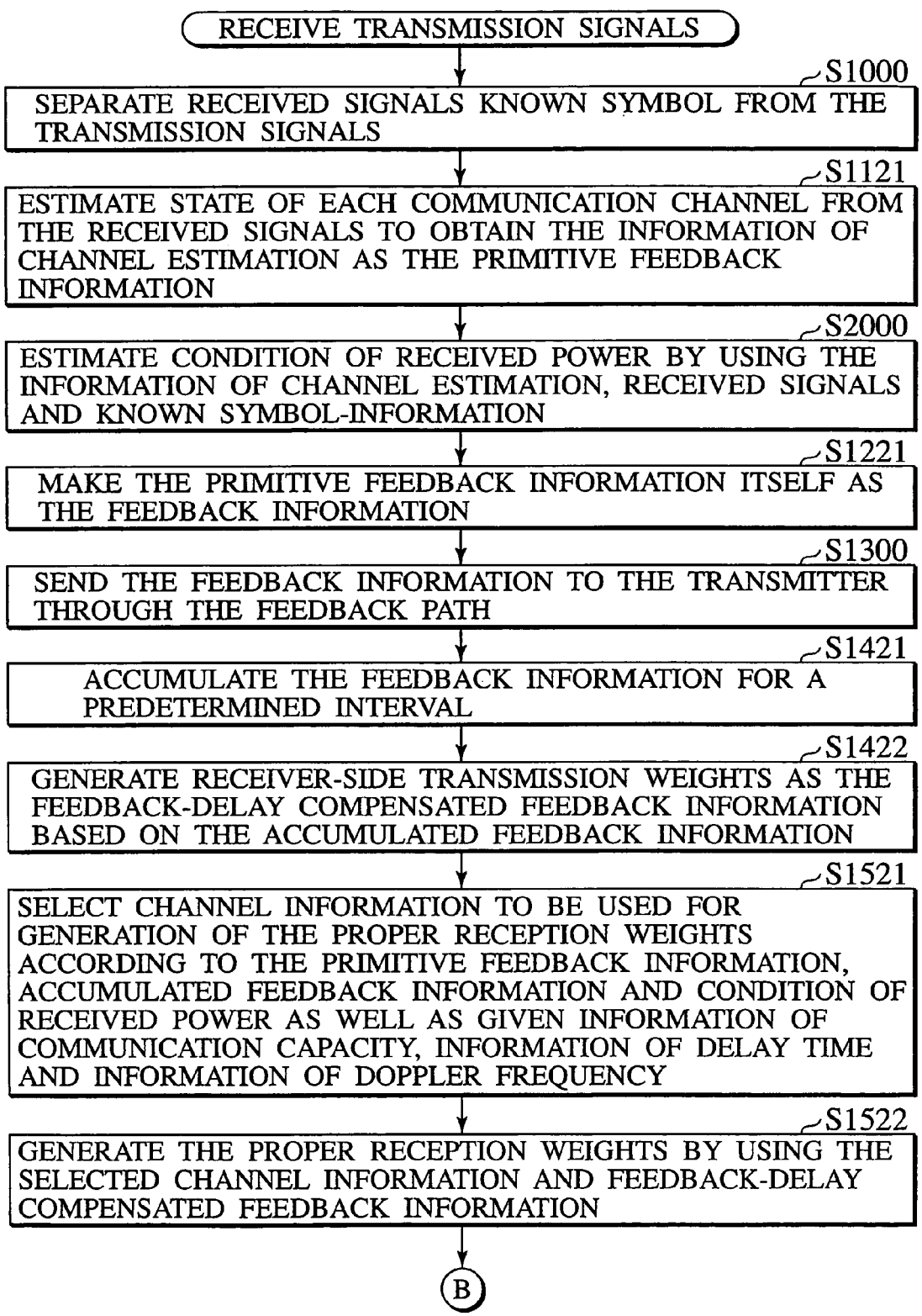
FIG. 16 is a flowchart showing an MIMO receiving method carried out by the MIMO receiver of the seventh embodiment.

FIG. 16 and FIG. 12B are a flowchart which illustrates this receiving method carried out in the MIMO receiver 200 of the seventh embodiment.

At step S1000, the receiver 200 separates the received signals into the known symbol and transmission substreams.

At step S1121, the receiver 200 estimates state of each communication channel from the received signals received by the #1 to #L antennas 201 to obtain the information of channel estimation as the primitive feedback information.

At step S2000, the receiver 200 estimates condition of received power by using information of channel estimation, received signals received by the #1 to #L antennas and information of the known symbol.

At step S1221, the receiver 200 makes the primitive feedback information itself as the feedback information.

At step S1300, the receiver 200 sends the feedback information to the transmitter 100 through the feedback path 400.

At steps S1421 and S1422, the receiver 200 accumulates the feedback information for a predetermined interval and generates K*N receiver-side transmission weights as the feedback-delay compensated feedback information based on the accumulated feedback information.

At steps S1521 and S1522, the receiver 200 selects channel information to be used for generation of the proper reception weights according to the primitive feedback information, accumulated feedback information and condition of received power as well as given information of communication capacity, information of delay time and information of Doppler frequency and generates K*L proper reception weights by using the selected channel information selected at the step S1521 and the feedback-delay compensated feedback information.

Following steps S1600 through S1900 are identical with those of the sixth embodiment as illustrated in FIG. 12B.

This MIMO communication system and MIMO receiver 200 used therein of the seventh embodiment have operation/effects identical wit that of the fifth and sixth embodiments on top of that of the fourth embodiment. Namely, it can reduce total quantity of transmission information through the feedback path by using the channel information as the feedback information fed-back to the transmitter 100 from the receiver.

Eighth Embodiment

An MIMO communication system and an MIMO receiver used therein of the eighth embodiment of this invention will be described with reference to FIG. 17. In the first embodiment shown in FIG. 1, the communication channel information without any adjustment is used for generation of the reception weights. In contrast, this embodiment features a channel information adjusting unit for use of adjusted communication channel information for generating transmission weights and reception weights.

A transmitter 100 of this embodiment is identical with that of the second embodiment shown in FIG. 3, and includes a transmission signal generator 101 for generating a transmission signal, L transmit antennas 102, a signal dividing unit 103 for dividing the transmission signal into #1 to #K signal streams according to information derived from transmission weights informed from a receiver 200 through a feedback path 400, and K transmission signal processors 104. Each transmission signal processor 104 includes a signal modulator 105 for modulating #1 to #K signal streams, respectively, a stream processor 106 for dividing respective #1 to #K modulated signal streams into #1 to #N substreams and multiplying the #1 to #N substreams by #1 to #N transmission weights fed-back from the receiver 200, respectively, and a known symbol adder 107.

The receiver 200 of this embodiment includes #1 to #L antennas 201, a known symbol separator 202, #1 to #K equalization processors 203, a channel state estimation unit 204, a transmission weight generator 205 for generating K*N transmission weights and sending the transmission weights to the transmitter 100 through the feedback path 400, a transmission weight accumulation unit 206 for accumulating the transmission weights for a predetermined interval, a channel information accumulation unit 211, a reception weight generator 212 and a signal combining unit 208. These elements are identical with those of the second embodiment. Furthermore, each of #1 to #K equalization processors 203 is identical with that of the first embodiment shown in FIG. 1, and it includes a reception weight multiplier 209 for multiplying the received #1 to #L substreams of respective #1 to #K signal streams by the #1 to #L reception weights, and a demodulator 210 for composing the #1 to #L weighted substreams to obtain respective composed #1 to #K signal streams and demodulating each of the composed #1 to #K signal streams.

In this embodiment, the receiver 200 further includes a channel information storage 222 for storing past information of channel estimation which has been outputted from the channel state estimation unit 204 and a channel information adjusting unit 221 for adjusting the information of channel estimation according to given information of time delay from a time delay information unit 218 and the past information of channel estimation stored in the channel information storage 222 and outputting the adjusted information of channel estimation to the transmission weight generator 205 and channel information accumulation unit 211 for accumulating the adjusted channel information for a predetermined interval.

Signal transmission and reception process carried out by this MIMO communication system will be described hereinafter. For the purpose of maintaining consistency between the transmission weights and reception weights, the channel information adjusting unit 221 adjusts the information of channel estimation from the channel state estimation unit 204 according to the given information of time delay from the time delay information unit 218 and past information of channel estimation stored in the channel information storage 222, and outputs the adjusted information of channel estimation to the transmission weight generator 205 and channel information accumulation unit 211 to accumulate for a predetermined interval.

The transmission weight generator 205 generates K*N transmission weights based on the adjusted information of channel estimation from the channel information adjusting unit 221 and sends the transmission weights to the transmitter 100 through the feedback path 400. The transmission weight accumulation unit accumulates the transmission weights for a predetermined interval. The reception weight generator 212 generates reception weights by using the adjusted information of channel estimation which is accumulated in the channel information accumulation unit 211 and accumulated #1 to #N transmission weights in the transmission weight accumulation unit 206 and outputs to each equalization processor 203. In each of #1 to #K equalization processors 203, the reception weight multiplier 209 multiplies the received #1 to #L substreams of respective #1 to #K signal streams by the #1 to #L reception weights. The demodulator 210 composes the #1 to #L weighted substreams to obtain respective composed #1 to #K signal streams and demodulates each of the composed #1 to #K signal streams. The signal combining unit 208 combines K composed signal streams from K equalization processors 203 to reproduce an original transmission signal sent out from the transmitter 100.

Figure 18:
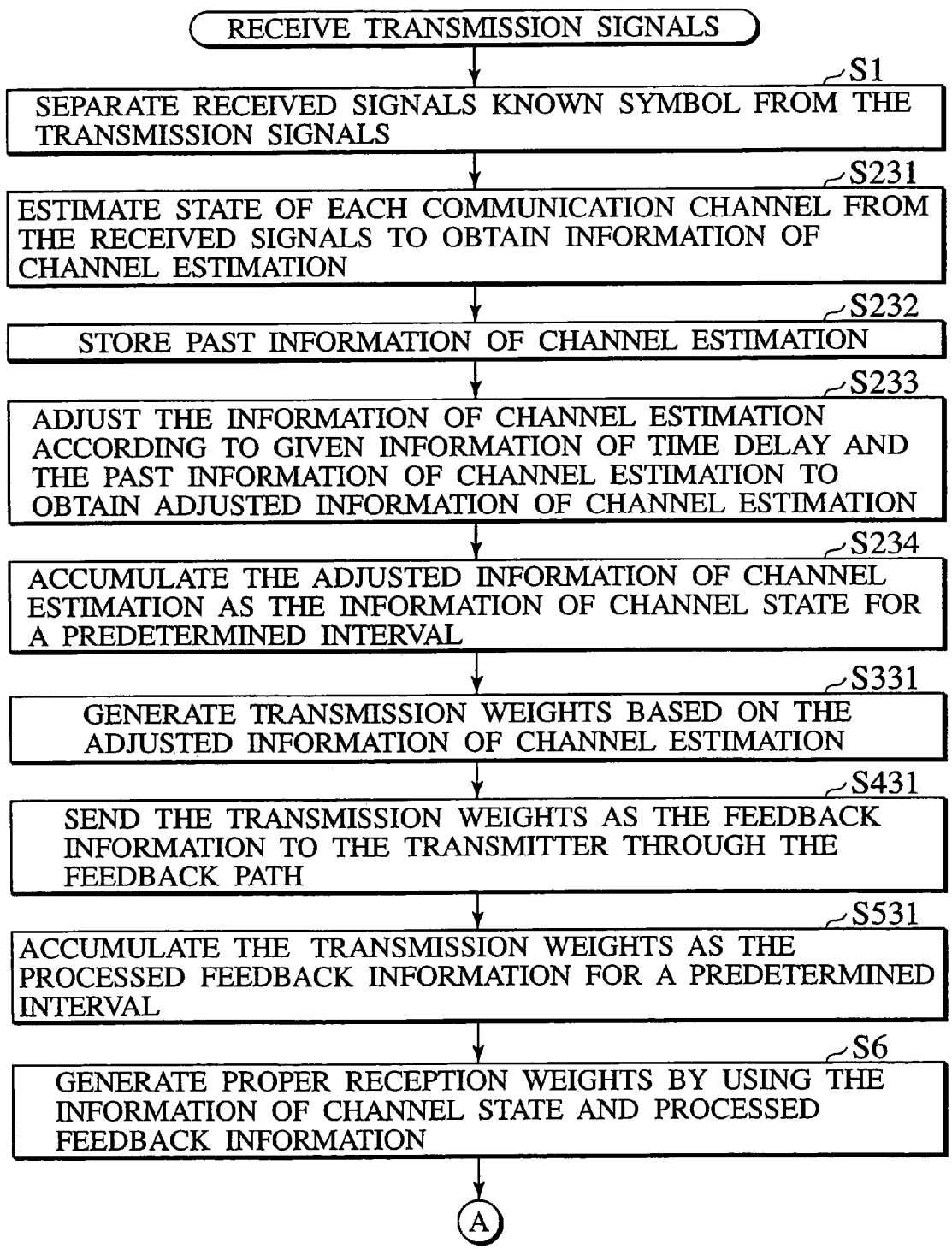
FIG. 18 is a flowchart showing an MIMO receiving method carried out by the MIMO receiver of the eighth embodiment.

FIG. 18 and FIG. 2B are a flowchart which illustrates this receiving method carried out in the MIMO receiver 200 of the eighth embodiment.

At step S1, the receiver 200 separates the received signals into the known symbol and transmission substreams.

At steps S231 through S234, the receiver 200 estimates state of each communication channel from the received signals received by the #1 to #L antennas to obtain information of channel estimation, stores past information of channel estimation which has been obtained on the step S231, adjusts the information of channel estimation according to given information of time delay and the past information of channel estimation to obtain adjusted information of channel estimation and accumulates the adjusted information of channel estimation as the information of channel state for a predetermined interval.

At step S331, the receiver 200 generates K*N transmission weights based on the adjusted information of channel estimation.

At step S431, the receiver 200 sends the transmission weights as the feedback information to the transmitter 100 through the feedback path 400.

At step S531, the receiver 200 accumulates the transmission weights as the processed feedback information for a predetermined interval.

At step S6, the receiver 200 generates K*L proper reception weights by using the information of channel state and processed feedback information.

Following steps S7 through S10 are identical with those of the first embodiment as illustrated in FIG. 2B.

Operations carried out by the transmission weight generator 205 and reception weight generator 212 are identical with those of the second embodiment. Namely, the MIMO communication system of this embodiment calculates the adjusted communication channel information that of elapsed by feedback-delay interval by using the channel information A before adjustment. If the adjusted channel information is set as Â', the transmission weights $$\hat{W}_{Tk}$$

can be expressed by an expression (13).

$$\hat{W}_{Tk} = \hat{e}_k \quad (13)$$

In this expression (13), $$\hat{e}_k$$

is an eigenvector obtained by a singular value decomposition or an eigenvalue decomposition of the following expression.

$$\hat{A}'^H \hat{A}'$$

In the first embodiment, the reception weights are obtained by the following expression.

$$W_{Rk} = (\hat{A}' \hat{W}_{Tk})^H$$

In this case of the first embodiment, the composed signal $y_k(t)$ obtained as an expression (14).

$$y_k(t) = W_{Rk} A X(t) \quad (14)$$

$$= \hat{W}_{Tk}^H \hat{A}'^H A' \sum_{m=1}^{K} \hat{W}_{Tm} S_m(t) + \hat{W}_{Tk}^H \hat{A}'^H n(t)$$

To the contrary, in this eighth embodiment, the reception weights are obtained as the following expression.

$$W_{Tk} = (\hat{A}' \hat{W}_{Tk})^H$$

Then, $y_k(t)$ can be obtained as an expression (15).

$$y_k(t) = W_{Rk} A X(t) \quad (15)$$

$$= \hat{W}_{Tk}^H \hat{A}'^H A' \sum_{m=1}^{K} \hat{W}_{Tm} S_m(t) + \hat{W}_{Tk}^H \hat{A}'^H n(t)$$

In this expression, $$\hat{W}_{Tk}$$

is an eigenvector of $$\hat{A}'^H \hat{A}'$$

Therefore, the influence to the composed signal $y_k(t)$ due to error of adjustment of this embodiment becomes smaller than that of the first embodiment.

For this reason, this eighth embodiment can reduce consistency between the transmission weights and reception weights due to errors caused from the feedback and restrain degradation of transmission characteristics.

Ninth Embodiment

Figure 19:
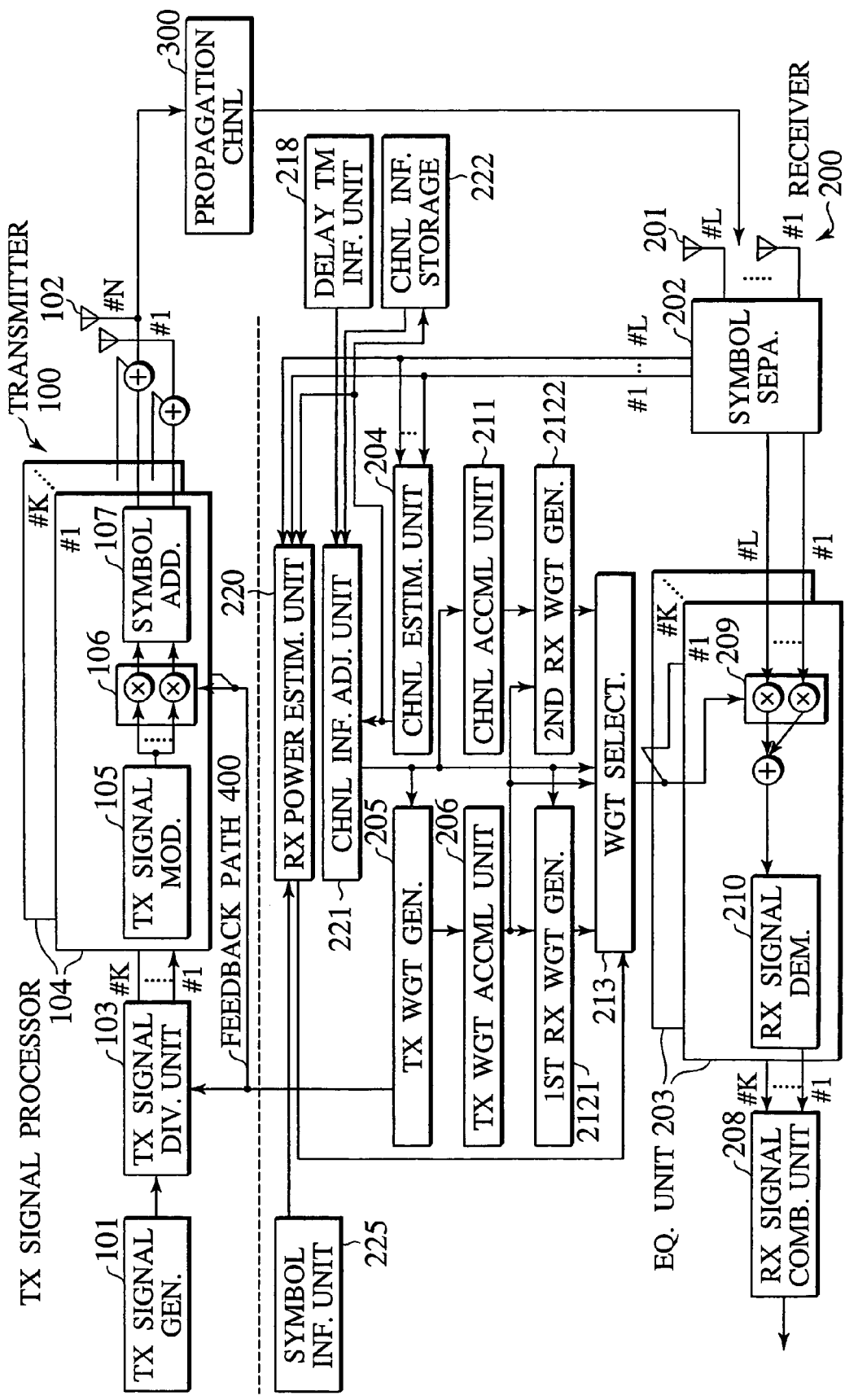
FIG. 19 is a schematic diagram showing an MIMO communication system of the ninth embodiment of this invention.

An MIMO communication system and an MIMO receiver used therein of the ninth embodiment of this invention will be described with reference to FIG. 19. This embodiment features a channel information adjusting unit for adjusting information of channel estimation according to given information of time delay and past information of channel estimation stored in a channel information storage and outputting adjusted information of channel estimation for generation of transmission weights and reception weights, which is added to the configuration of the third embodiment shown in FIG. 5.

Figure 17:
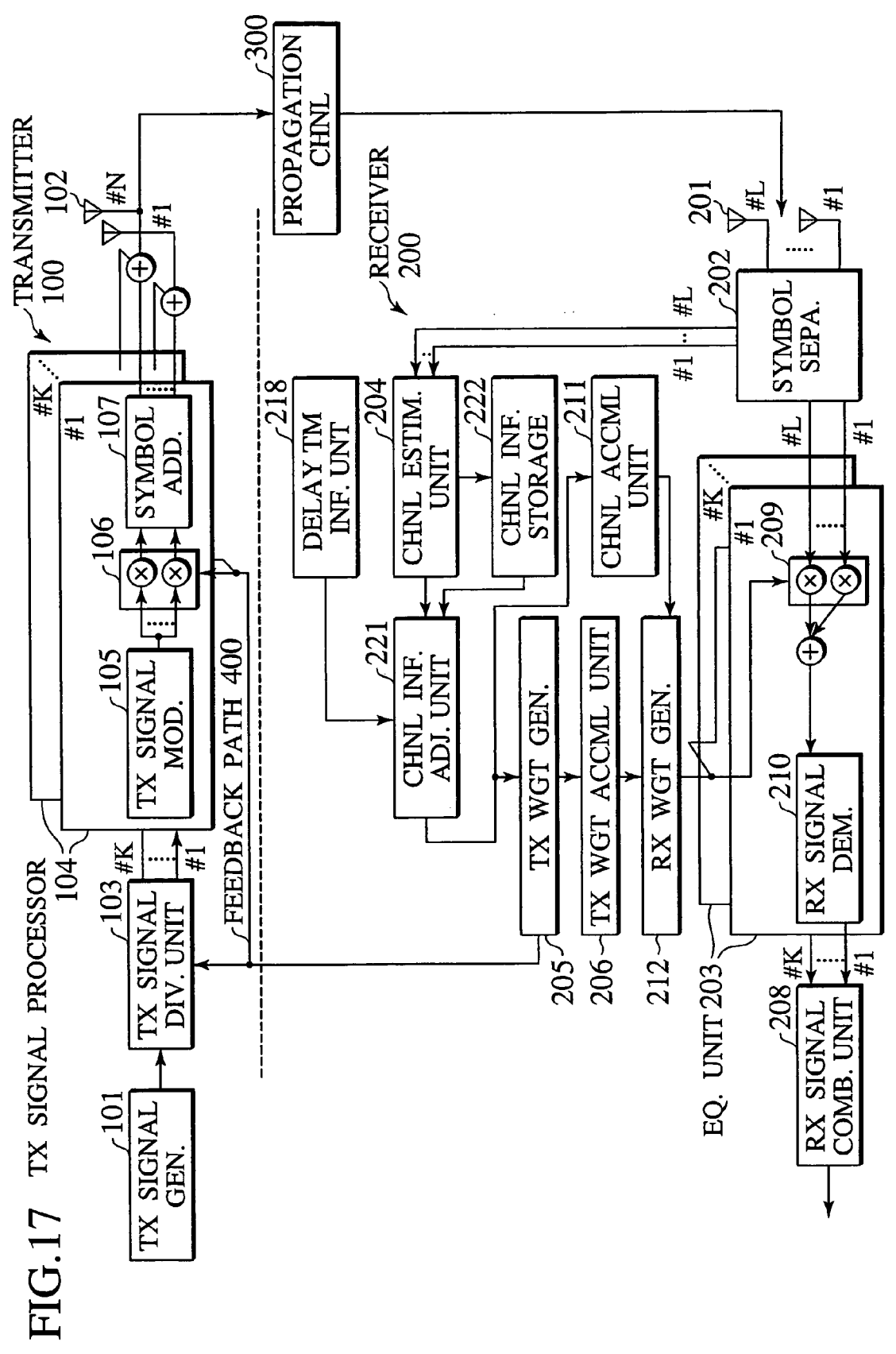

A transmitter 100 is identical with that of the third embodiment shown in FIG. 5 or the eighth embodiment shown in FIG. 17, and it includes a transmission signal generator 101 for generating a transmission signal, L transmit antennas 102, a signal dividing unit 103 for dividing the transmission signal into #1 to #K signal streams according to K*N transmission weights informed from a receiver 200 through a feedback path 400, and K transmission signal processors 104. Each transmission signal processor 104 includes a signal modulator 105 for modulating #1 to #K signal streams, respectively, a stream processor 106 for dividing respective #1 to #K modulated signal streams into #1 to #N substreams and multiplying #1 to #N substreams by the #1 to #N transmission weights fed-back from the receiver 200, respectively, and a known symbol adder 107.

The receiver 200 of this embodiment includes #1 to #L antennas 201, a known symbol separator 202, #1 to #K equalization processors 203, and a channel state estimation unit 204. These elements are identical with those of the third embodiment.

The receiver 200 further includes a received power estimation unit 220 for estimating a condition of received power by using the information of channel estimation, received signals received by #1 to #L antennas 201 and known symbol, a channel information storage 222 for storing past information of channel estimation which has been outputted from the channel state estimation unit 204, a channel information adjusting unit 221 for adjusting the information of channel estimation according to given information of time delay from a delay time information unit 218 and the past information of channel estimation stored in the channel information storage 222 and outputting adjusted information of channel estimation, a channel information accumulation unit 211 for accumulating the adjusted information of channel estimation for a predetermined interval, a transmission weight generator 205 for generating K*N transmission weights based on the adjusted information of channel estimation from the channel information adjusting unit 221 and sending the transmission weights to the transmitter 100 through the feedback path 400, and a transmission weight accumulation unit 206 for accumulating the transmission weights for a predetermined interval.

The receiver 200 further includes a first reception weight generator 2121 for generating K*L first reception weights by using the adjusted information of channel estimation from the channel information adjusting unit 221 and accumulated transmission weights in the transmission weight accumulation unit 206, a second reception weight generator 2122 for generating K*L second reception weights by using the adjusted information of channel estimation which is accumulated in the channel information accumulation unit 211 and accumulated transmission weights in the transmission weight accumulation unit 206, a weight selector 213 for estimating a transmission quality according to the first #1 to #L reception weights, second #1 to #L reception weights, accumulated transmission weights, adjusted information of channel estimation and condition of received power, and selecting #1 to #L reception weights to be used, and a signal combining unit 208 corresponding to the signal dividing unit 103 of the transmitter 100 for combining demodulated K signal streams from K equalization processors 203 to reproduce an original transmission signal.

Each of #1 to #K equalization processors 203 is identical with that of the first embodiment shown in FIG. 1, and it includes a reception weight multiplier 209 for multiplying the received #1 to #L substreams of respective #1 to #K signal streams by selected #1 to #L reception weights from the weight selector 213 and a demodulator 210 for composing the #1 to #L weighted substreams to obtain respective composed #1 to #K signal streams and demodulating the composed #1 to #K signal streams, respectively.

According to this MIMO communication system of the ninth embodiment, for the purpose of maintaining consistency between the transmission weights and the reception weights, the channel information adjusting unit 221 in the receiver 200, as in the eighth embodiment, adjusts the information of channel estimation from the channel state estimation unit 204 according to the given information of time delay from the time delay information unit 218 and the past information of channel estimation stored in the channel information storage 222, and outputs the adjusted information of channel estimation to the transmission weight generator 205 and channel information accumulation unit 211 to accumulate for a predetermined interval.

The transmission weight generator 205 generates the K*N transmission weights based on the adjusted information of channel estimation from the channel information adjusting unit 221 and sends the transmission weights to the transmitter 100 through the feedback path 400 as well as to the transmission weight accumulation unit 206. The transmission weight accumulation unit accumulates the transmission weights for a predetermined interval. The received power estimation unit 220 estimates the condition of received power by using the information of channel estimations and known symbol from the known symbol information unit 225.

The first reception weight generator 212 generates K*L first reception weights by using the adjusted information of channel estimation and accumulated transmission weights in the transmission weight accumulation unit 206. The second reception weight generator 2122 generates K*L second reception weights by using the accumulated information of channel estimations and accumulated transmission weights. The weight selector 213 estimates a transmission quality according to the first reception weights, second reception weights, accumulated transmission weights, adjusted information of channel estimation and condition of received power, and selects the first or second reception weights as proper reception weights to be used to give to each equalization processor 203. In each of #1 to #K equalization processors 203, the reception weight multiplier 209 multiplies the received #1 to #L substreams of respective #1 to #K signal streams by the selected #1 to #L reception weights. The demodulator 210 composes the #1 to #L weighted substreams to obtain respective composed #1 to #K signal streams and demodulates each of the composed #1 to #K signal streams. The signal combining unit 208 combines K composed signal streams from K equalization processors 203 to reproduce an original transmission signal sent out from the transmitter 100.

Figure 20:
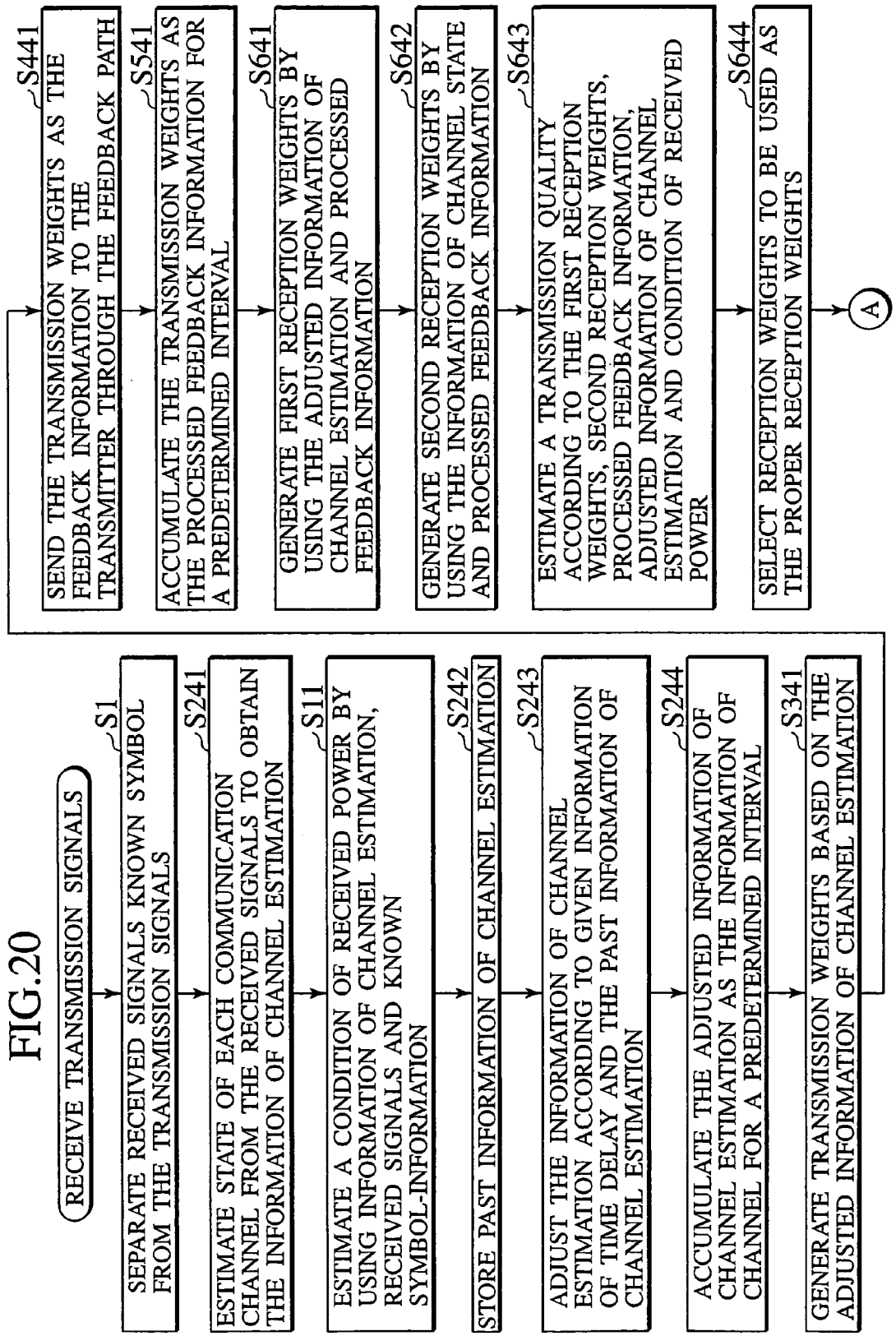
FIG. 20 is a flowchart showing an MIMO receiving method carried out by the MIMO receiver of the ninth embodiment.

FIG. 20 and FIG. 2B are a flowchart which illustrates this receiving method carried out in the MIMO receiver 200 of the ninth embodiment.

At step S1, the receiver 200 separates the received signals into the known symbol and transmission substreams.

At step S241, the receiver 200 estimates state of each communication channel from the received signals received by the #1 to #L antennas to obtain the information of channel estimation.

At step S11, the receiver 200 estimates condition of received power by using information of channel estimation, received signals received by #1 to #L antennas and information of the known symbol.

At steps S242 through S244, the receiver 200 stores past information of channel estimation which has been obtained on the step S241, adjusts the information of channel estimation according to given information of time delay and the past information of channel estimation stored on the step S242 and accumulates the adjusted information of channel estimation as the information of channel state for a predetermined interval.

At step S341, the receiver 200 generates K*N transmission weights based on the adjusted information of channel estimation.

At step S441, the receiver 200 sends the transmission weights as the feedback information to the transmitter 100 through the feedback path 400.

At step S541, the receiver 200 accumulates the transmission weights as the processed feedback information for a predetermined interval.

At steps S641 through S644, the receiver 200 generates K*L first reception weights by using the adjusted information of channel estimation and processed feedback information, generates K*L second reception weights by using the information of channel state and processed feedback information, estimates a transmission quality according to the first reception weights, second reception weights, processed feedback information, adjusted information of channel estimation and condition of received power and selects the first or second reception weights to be used as the proper reception weights.

Following steps S7 through S10 are identical with those of the first embodiment as illustrated in FIG. 2B.

According to this ninth embodiment, it has identical operation/effects with that of the eighth embodiment on top of that of third embodiment. Namely, generation of transmission and reception weights based on the current channel information and generation of those weights based on the accumulated channel information are simultaneously carried out. Then, estimation of communication quality is carried out by using both kinds of weight information, corresponding channel information thereof and condition of received power. Finally, the proper transmission weights and reception weights are determined. By this process, this embodiment can improve consistency between the transmission weights and reception weights and restrain degradation of communication characteristics. Additionally, this ninth embodiment can more highly improve the consistency between the transmission weights and reception weights and more effectively restrain the degradation of transmission characteristics by using the channel information that of the feedback timing as well as the current channel information that of the weight generation timing.

Tenth Embodiment

Figure 21:
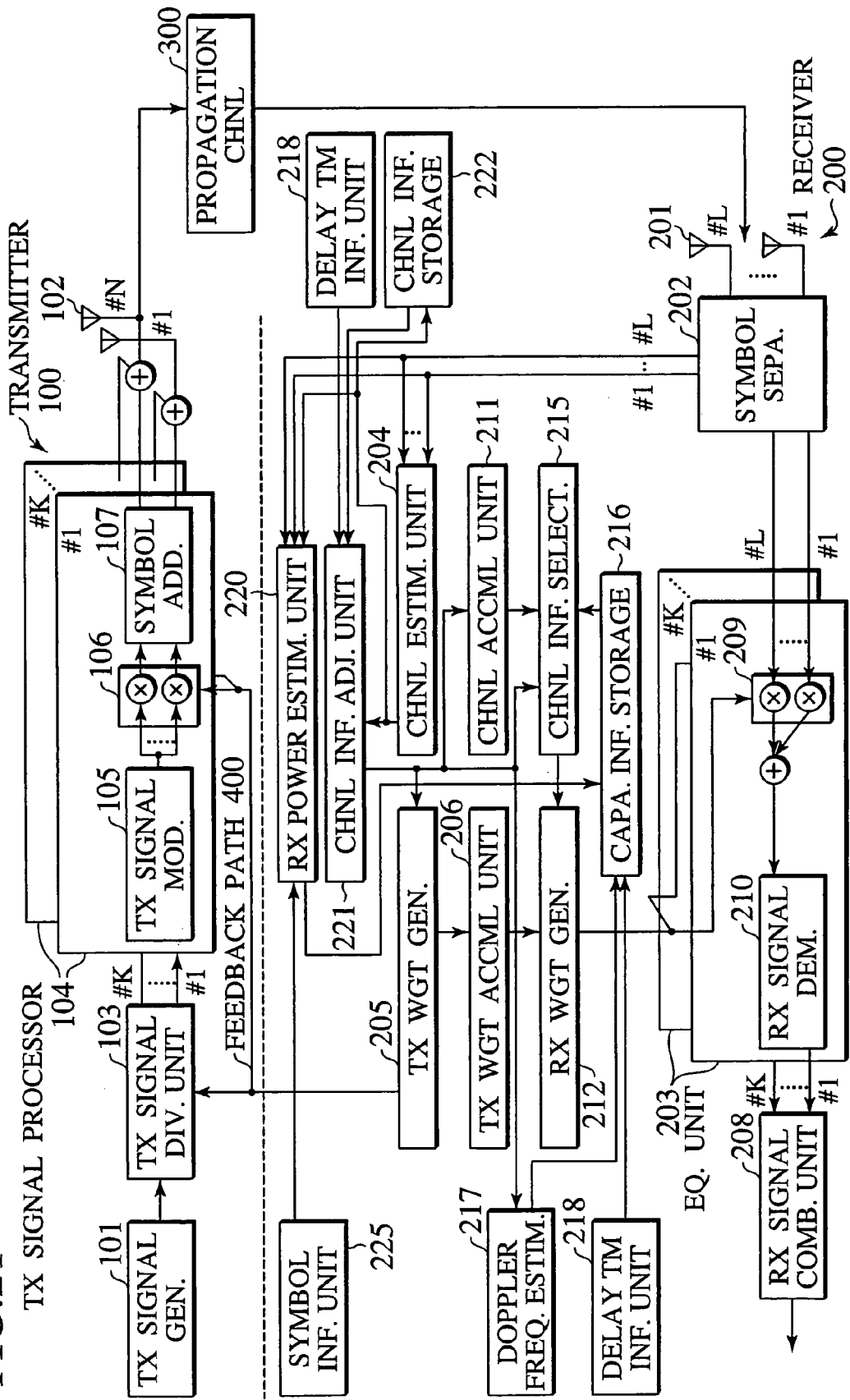
FIG. 21 is a schematic diagram showing an MIMO communication system of the tenth embodiment of this invention.

An MIMO communication system and an MIMO receiver used therein of the tenth embodiment of this invention will be described hereinafter with reference to FIG. 21. The MIMO communication system of this embodiment includes a transmitter 100 with #1 to #N antennas 102 and a receiver 200 with #1 to #L antennas 201. The transmitter 100 and receiver 200 are to be linked by communication channels 300 and a feedback path 400.

Configuration of the transmitter 100 is identical with those of the fourth, seventh and ninth embodiments.

The receiver 200 of this embodiment includes #1 to #L antennas 201, a known symbol separator 202, #1 to #K equalization processors 203 and a channel state estimation unit 204. These elements are identical with those of the fourth embodiment. The receiver 200 further includes a channel information storage 222 for storing past information of channel estimation which has been outputted from the channel state estimation unit 204, a received power estimation unit 220 for estimating a condition of received power by using the information of channel estimation, received signals received by #1 to #L antennas and known symbol, a channel information adjusting unit 221 for adjusting the information of channel estimation according to given information of time delay from a delay time information unit 218 and the past information of channel estimation stored in the channel information storage 222 and outputting adjusted information of channel estimation, a channel information accumulation unit 211 for accumulating the adjusted information of channel estimation for a predetermined interval, a transmission weight generator 205 for generating K*N transmission weights based on the adjusted information of channel estimation from the channel information adjusting unit 221 and sending the transmission weights to the transmitter 100 through a feedback path 400, and a transmission weight accumulation unit 206 for accumulating the transmission weights for a predetermined interval.

Furthermore, the receiver 200 includes a channel information selector 215 for selecting channel information to be used for generation of K*L reception weights according to the adjusted information of channel estimation, adjusted and accumulated information of channel estimation in the channel information accumulation unit 211 and condition of received power as well as given information of communication capacity, information of delay time and information of Doppler frequency, a reception weight generator 212 for generating K*L reception weights by using the selected channel information from the channel information selector 215 and accumulated transmission weights in the transmission weight accumulation unit 206, and a signal combining unit 208 corresponding to the signal dividing unit 103 of the transmitter 100 for combining the demodulated K signal streams from respective equalization processors 203 to reproduce an original transmission signal.

As identical with other embodiments, each equalization processor 203 of the receiver 200 includes a reception weight multiplier 209 for multiplying the received #1 to #L substreams of respective #1 to #K signal streams by the #1 to #L reception weights, respectively, and a demodulator 210 for composing the #1 to #L weighted substreams to obtain respective composed #1 to #K signal streams and demodulating the composed #1 to #K signal streams, respectively.

In this receiver 200, a delay time information unit 218 and Doppler frequency estimation unit 217 are identical with those of the fourth embodiment, and an acquisition method of communication capacity characteristics is also identical with that of the fourth embodiment.

Operation/effects according to this tenth embodiment are identical with those of the fourth embodiment as well as those of the seventh and ninth embodiments. In the receiver 200, the channel state estimation unit 204 estimates channel state from the received signals received by #1 to #L receive antennas 201 and outputs information of channel estimation. The received power estimation unit 220 estimates condition of received power by using the information of channel estimation, received signals received by the #1 to #L antennas 201 and known symbol from the known symbol information unit 225. The channel information storage 222 stores the past information of channel estimation which has been outputted from the channel state estimation unit 204. The channel information adjusting unit 221 adjusts the information of channel estimation according to given information of time delay from a delay time information unit 218 and the past information of channel estimation stored in the channel information storage 222 and outputs the adjusted information of channel estimation. The channel information accumulation unit 211 accumulates the adjusted information of channel estimation for a predetermined interval. The transmission weight generator 205 generates K*N transmission weights based on the adjusted information of channel estimation from the channel information adjusting unit 221 and sends the transmission weights to the transmitter 100 through the feedback path 400. The transmission weight accumulation unit 206 accumulates the transmission weights for a predetermined interval.

The channel information selector 215 selects channel information to be used for generation of K*L reception weights according to the adjusted information of channel estimation, adjusted and accumulated information of channel estimation in the channel information accumulation unit 211 and condition of received power as well as the given information of communication capacity, information of delay time and information of Doppler frequency. The reception weight generator 212 generates K*L reception weights by using the selected channel information from the channel information selector 215 and accumulated transmission weights in the transmission weight accumulation unit 206.

In each equalization processor 203, the reception weight multiplier 209 multiplies received #1 to #L substreams of respective #1 to #K signal streams by the #1 to #L reception weights, respectively, and the demodulator 210 composes the #1 to #L weighted substreams to obtain respective composed #1 to #K signal streams and demodulates the composed #1 to #K signal streams, respectively. The signal combining unit 208 combines the demodulated K signal streams from respective equalization processors 203 to reproduce the original transmission signal.

Figure 22:
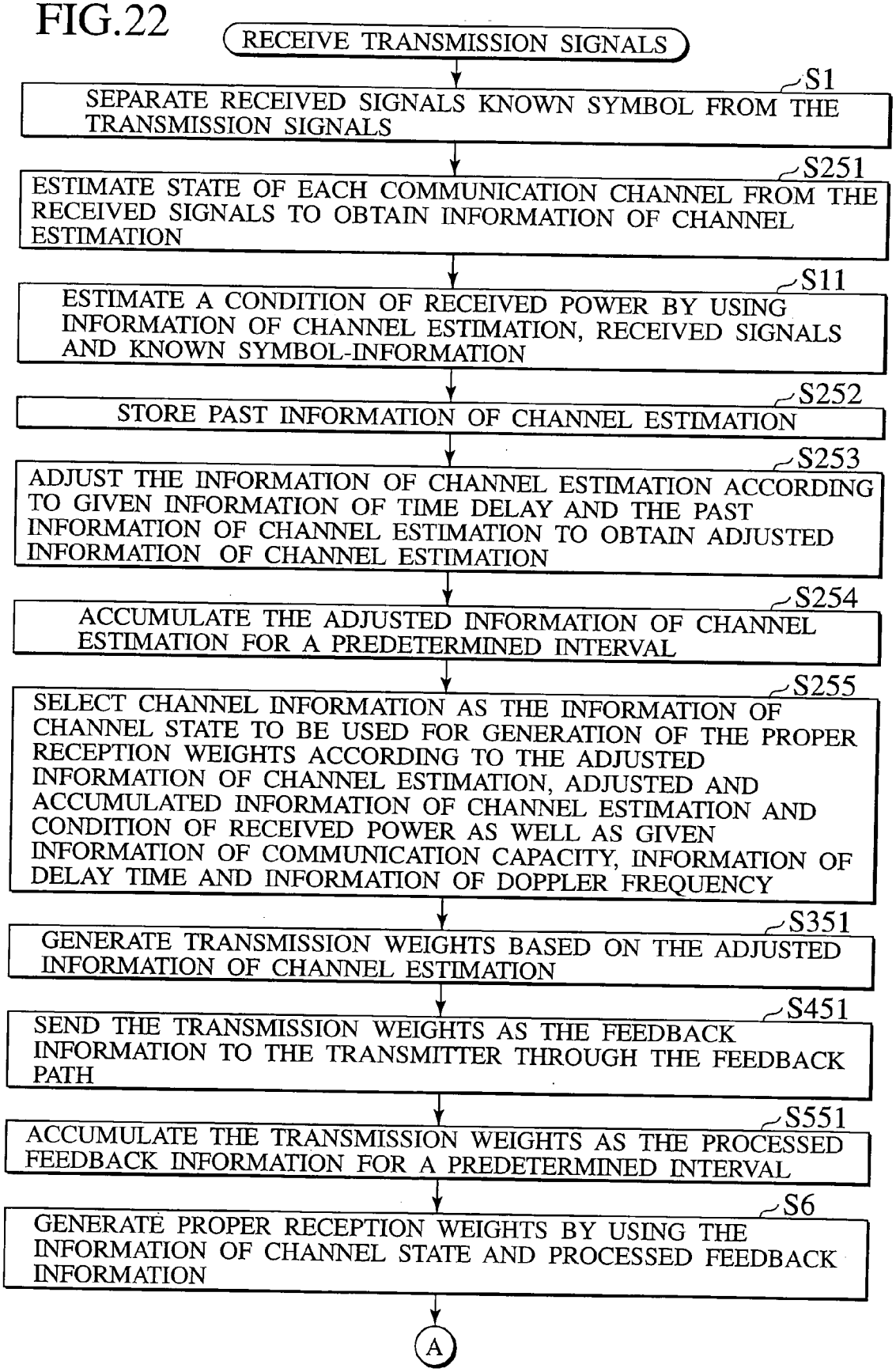
FIG. 22 is a flowchart showing an MIMO receiving method carried out by the MIMO receiver of the tenth embodiment.

FIG. 22 and FIG. 2B are a flowchart which illustrates this receiving method carried out in the MIMO receiver 200 of the tenth embodiment.

At step S1, the receiver 200 separates the received signals into the known symbol and transmission substreams.

At step S251, the receiver 200 estimates state of each communication channel from the received signals received by the #1 to #L antennas to obtain the information of channel estimation.

At step S11, the receiver 200 estimates condition of received power by using information of channel estimation, received signals received by #1 to #L antennas and information of the known symbol.

At steps S252 through S255, the receiver 200 stores past information of channel estimation which has been obtained on the step S251, adjusts the information of channel estimation according to given information of time delay and the past information of channel estimation stored on the step S252 to obtain adjusted information of channel estimation, accumulates the adjusted information of channel estimation for a predetermined interval and selects channel information as the information of channel state to be used for generation of K*L proper reception weights according to the adjusted information of channel estimation, adjusted and accumulated information of channel estimation and condition of received power as well as given information of communication capacity, information of delay time and information of Doppler frequency.

At step S351, the receiver 200 generates K*N transmission weights based on the adjusted information of channel estimation.

At step S451, the receiver 200 sends the transmission weights as the feedback information to the transmitter 100 through the feedback path 400.

At step S551, the receiver 200 accumulates the transmission weights as the processed feedback information for a predetermined interval.

At step S6, the receiver 200 generates K*L reception weights by using the information of channel state and processed feedback information.

Following steps S7 through S10 are identical with those of the first embodiment as illustrated in FIG. 2B.

According to the tenth embodiment, the system uses data of characteristics obtained in advance for estimating communication quality and determining channel information to be used. Consequently, it can improve the consistency between transmission weights and reception weights and restrain the degradation of communication characteristics. Additionally, it can reduce the number of reception weights to be used and simplify the configuration of the receiver. Furthermore, this tenth embodiment can more highly improve the consistency between the transmission weights and reception weights and more effectively restrain the degradation of transmission characteristics by using the channel information that of the feedback timing as well as the current channel information that of the weight generation timing.

Eleventh Embodiment

An MIMO communication system and an MIMO receiver used therein of the eleventh embodiment of this invention will be described hereinafter with reference to FIG. 23. The MIMO communication system of this embodiment includes a transmitter 100 with #1 to #N antennas 102 and a receiver 200 with #1 to #L antennas 201. The transmitter 100 and receiver 200 are to be linked by communication channels 300 and a feedback path 400.

Configuration of the transmitter 100 is identical with those of the fifth to seventh embodiments shown in FIG. 11 to FIG. 15, and it includes a transmission signal generator 101 for generating a transmission signal, a sender-side transmission weight generator 110 for generating K*N sender-side transmission weights by using adjusted information of channel estimation informed from the receiver 200 through the feedback path 400, a signal dividing unit 103 for dividing the transmission signal into #1 to #K signal streams according to the sender-side transmission weights, and #1 to #K transmission signal processors 104. Each of K transmission signal processor 104 includes a modulator 105 for modulating the #1 to #K signal streams, respectively, a stream processor 106 for dividing respective #1 to #K modulated signal streams into #1 to #N substreams and multiplying the #1 to #N substreams by the sender-side #1 to #N transmission weights, respectively, and a known symbol adder 107 for adding known symbol onto respective #1 to #N transmission substreams.

The receiver 200 includes #1 to #L receive antennas 201, a known symbol separator 202, a channel state estimation unit 204 for estimating state of each communication channel from received signals received by the #1 to #L antennas 201 and outputting information of channel estimation, a channel information storage 222 for storing past information of channel estimation which has been outputted from the channel state estimation unit 204, a channel information adjusting unit 221 for adjusting the information of channel estimation according to given information of time delay from a delay time information unit 218 and the past information of channel estimation stored in the channel information storage 222 and sending the adjusted information of channel estimation to the transmitter 100 through the feedback path 400 and a channel information accumulation unit 211 for accumulating the adjusted information of channel estimation from the channel information adjusting unit 221 for a predetermined interval.

The receiver 200 further includes a receiver-side transmission weight generator 205 for generating K*N receiver-side transmission weights based on the adjusted and accumulated information of channel estimation in the channel information accumulation unit 211, a transmission weight accumulation unit 206 for accumulating the receiver-side transmission weights from the receiver-side transmission weight generator 205 for a predetermined interval, a reception weight generator 212 for generating K*L reception weights by using the adjusted and accumulated information of channel estimation in the channel information accumulation unit 211 and accumulated receiver-side transmission weights in the transmission weight accumulation unit 206, #1 to #K equalization processors 203, and a signal combining unit 208 corresponding to the signal dividing unit of the transmitter.

Each equalization processor 203 includes a reception weight multiplier 209 for multiplying the received #1 to #L substreams of respective #1 to #K signal streams by the #1 to #L reception weights, respectively, and a demodulator 210 for composing the #1 to #L weighted substreams to obtain respective composed #1 to #K signal streams and demodulating the composed #1 to #K signal streams, respectively. The signal combining unit 208 is for combining the demodulated K signal streams from respective equalization processors 203 to reproduce an original transmission signal.

According to this MIMO communication system of the eleventh embodiment, in the transmitter 100, the sender-side transmission weight generator 110 generates K*N sender-side transmission weights by using the adjusted information of channel estimation fed-back from the receiver 200 before signal transmission. The transmission signal generator 101 generates a transmission signal and the transmission signal dividing unit 103 divides the transmission signal into #1 to #K signal streams according to the sender-side transmission weights generated by the sender-side transmission weight generator 110. In #1 to K respective transmission signal processors 104, the signal modulator 105 demodulates respective signal streams. Also, in the respective signal processors 104, the stream processor 106 divides respective modulated signal streams into #1 to #N transmission substreams and multiplies respective substreams by the #1 to #N transmission signal weights, respectively, and known symbol adder 107 adds a known symbol to respective #1 to #N substreams. #1 substreams outputted from respective #1 to #K signal processors 104 are composed and transmitted from #1 transmit antenna 102, #2 substreams from respective signal processors 104 are also composed by the same manner and transmitted from #2 antenna, and other substreams are also composed by the same manner and transmitted from respective transmit antennas to the communication channels 300.

In the receiver 200, the channel state estimation unit 204 estimates state of each communication channel from the received signals received by the #1 to #L antennas 201 and outputs the information of channel estimation. The channel information storage 222 stores past information of channel estimation which has been outputted from the channel state estimation unit 204. The channel information adjusting unit 221 adjusts the information of channel estimation according to given information of time delay from a delay time information unit 218 and the past information of channel estimation stored in the channel information storage 222 and sends the adjusted information of channel estimation to the transmitter 100 through the feedback path 400. The channel information accumulation unit 211 accumulates the adjusted information of channel estimation from the channel information adjusting unit 221 for a predetermined interval. The received power estimation unit 220 estimates the condition of received power by using the information of channel estimation, received signals received by #1 to #L antennas and known symbol from the known symbol information unit 225.

The receiver-side transmission weight generator 205 generates K*N receiver-side transmission weights based on the adjusted and accumulated information of channel estimation in the channel information accumulation unit 211. The transmission weight accumulation unit 206 accumulates the receiver-side transmission weights from the receiver-side transmission weight generator 205 for a predetermined interval. The reception weight generator 212 generates K*L reception weights by using the adjusted and accumulated information of channel estimation in the channel information accumulation unit 211 and accumulated receiver-side transmission weights in the transmission weight accumulation unit 206.

In each equalization processor 203, the reception weight multiplier 209 multiplies the received #1 to #L substreams of respective #1 to #K signal streams by the #1 to #L reception weights, and the demodulator 210 composes the #1 to #L weighted substreams to obtain each of composed #1 to #K signal streams and demodulates each of the composed #1 to #K signal streams. Finally, the signal combining unit 208 combines the demodulated K signal streams from respective equalization processors 203 to reproduce the original transmission signal.

Figure 24:
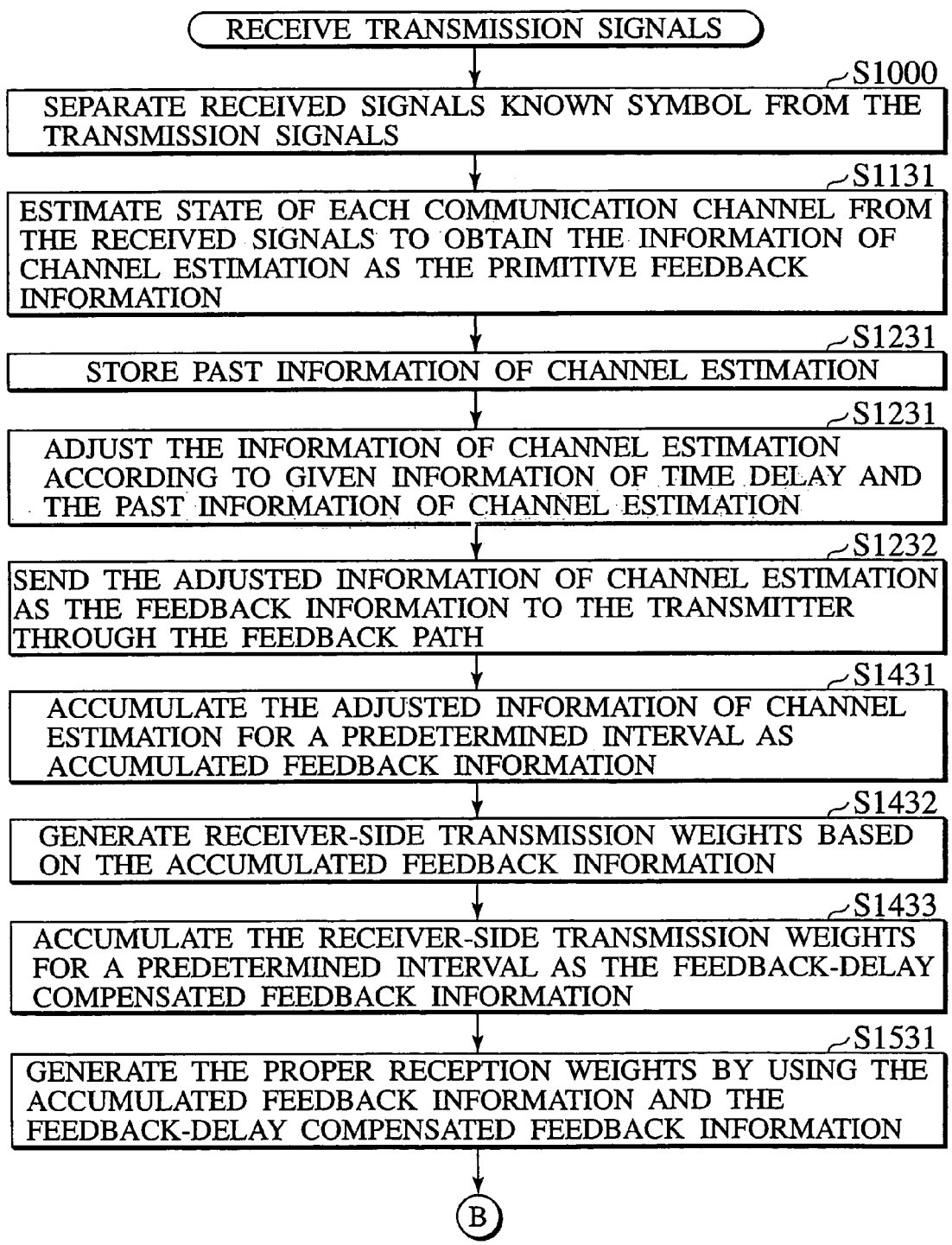
FIG. 24 is a flowchart showing an MIMO receiving method carried out by the MIMO receiver of the eleventh embodiment.

FIG. 24 and FIG. 12B are a flowchart which illustrates this receiving method carried out in the MIMO receiver 200 of the eleventh embodiment.

At step S1000, the receiver 200 separates the received signals into the known symbol and transmission substreams.

At step S1131, the receiver 200 estimates state of each communication channel from the received signals received by the #1 to #L antennas 201 and outputting information of channel estimation as the primitive feedback information.

At steps S1231 and S1232, the receiver 200 stores past information of channel estimation which has been outputted on the step S1131 and adjusts the information of channel estimation according to given information of time delay and the past information of channel estimation stored at the step S1231.

At step S1331, the receiver 200 sends the adjusted information of channel estimation as the feedback information to the transmitter 100 through the feedback path 400.

At steps S1431 through S1433, the receiver 200 accumulates the adjusted information of channel estimation for a predetermined interval as accumulated feedback information, generates K*N receiver-side transmission weights based on the accumulated feedback information and accumulates the receiver-side transmission weights for a predetermined interval as the feedback-delay compensated feedback information.

At step S1531, the receiver 200 generates K*L proper reception weights by using the accumulated feedback information and the feedback-delay compensated feedback information.

Following steps S1600 through S1900 are identical with those of the sixth embodiment as illustrated in FIG. 12B.

According to this MIMO communication system of the eleventh embodiment, it can reduce total quantity of transmission information through the feedback path by using the adjusted channel information as the feedback information fed-back to the transmitter 100 from the receiver 200. Furthermore, this eleventh embodiment can more highly improve the consistency between the transmission weights and reception weights and more effectively restrain the degradation of transmission characteristics by using the channel information that of the feedback timing as well as the current channel information that of the weight generation timing.

Twelfth Embodiment

Figure 25:
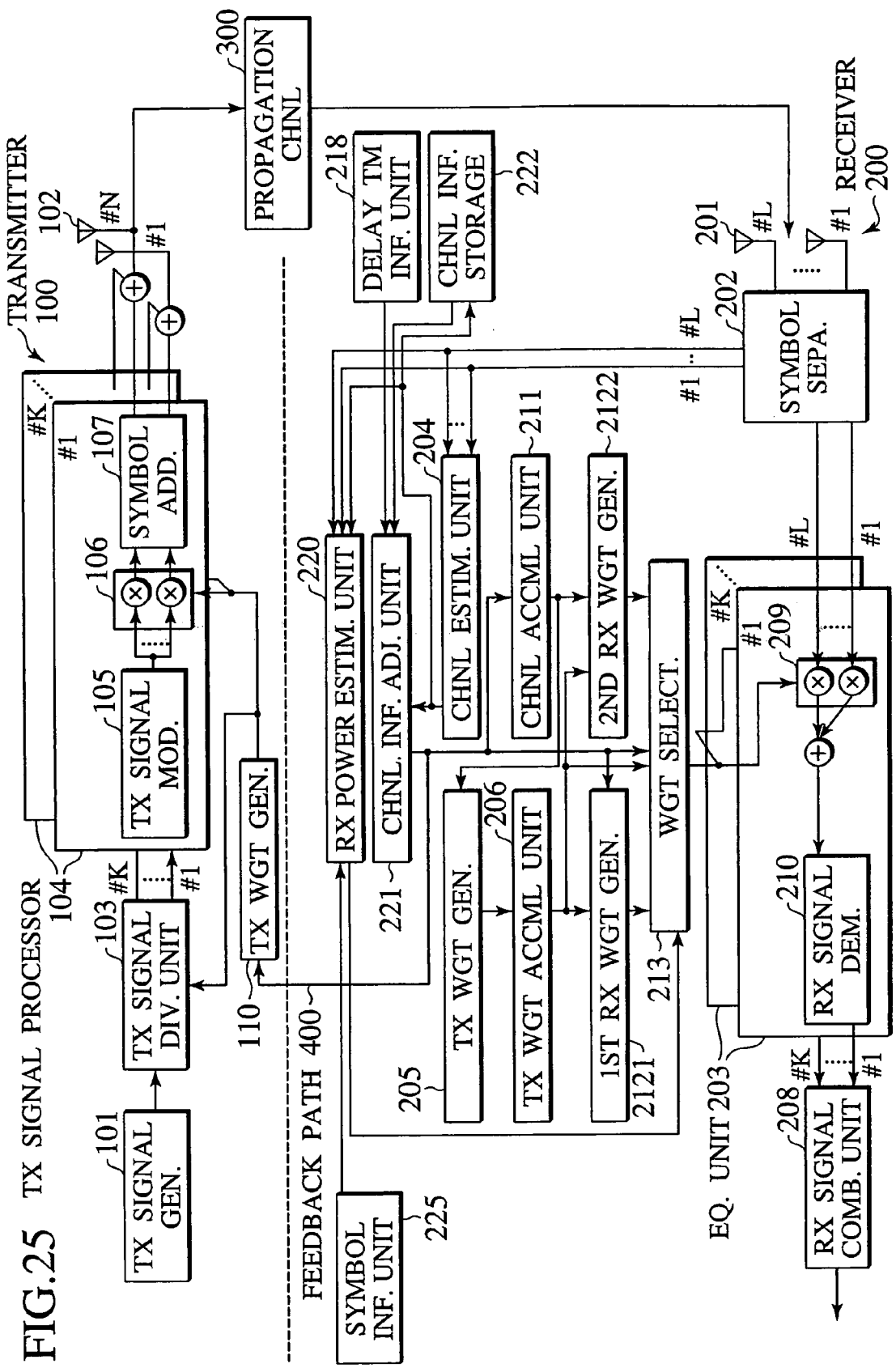
FIG. 25 is a schematic diagram showing an MIMO communication system of the twelfth embodiment of this invention.

An MIMO communication system and an MIMO receiver used therein of the twelfth embodiment of this invention will be described hereinafter with reference to FIG. 25. The MIMO communication system of this embodiment includes a transmitter 100 with #1 to #N antennas 102 and a receiver 200 with #1 to #L antennas 201. The transmitter 100 and receiver 200 are to be linked by communication channels 300 and a feedback path 400.

Figure 23:
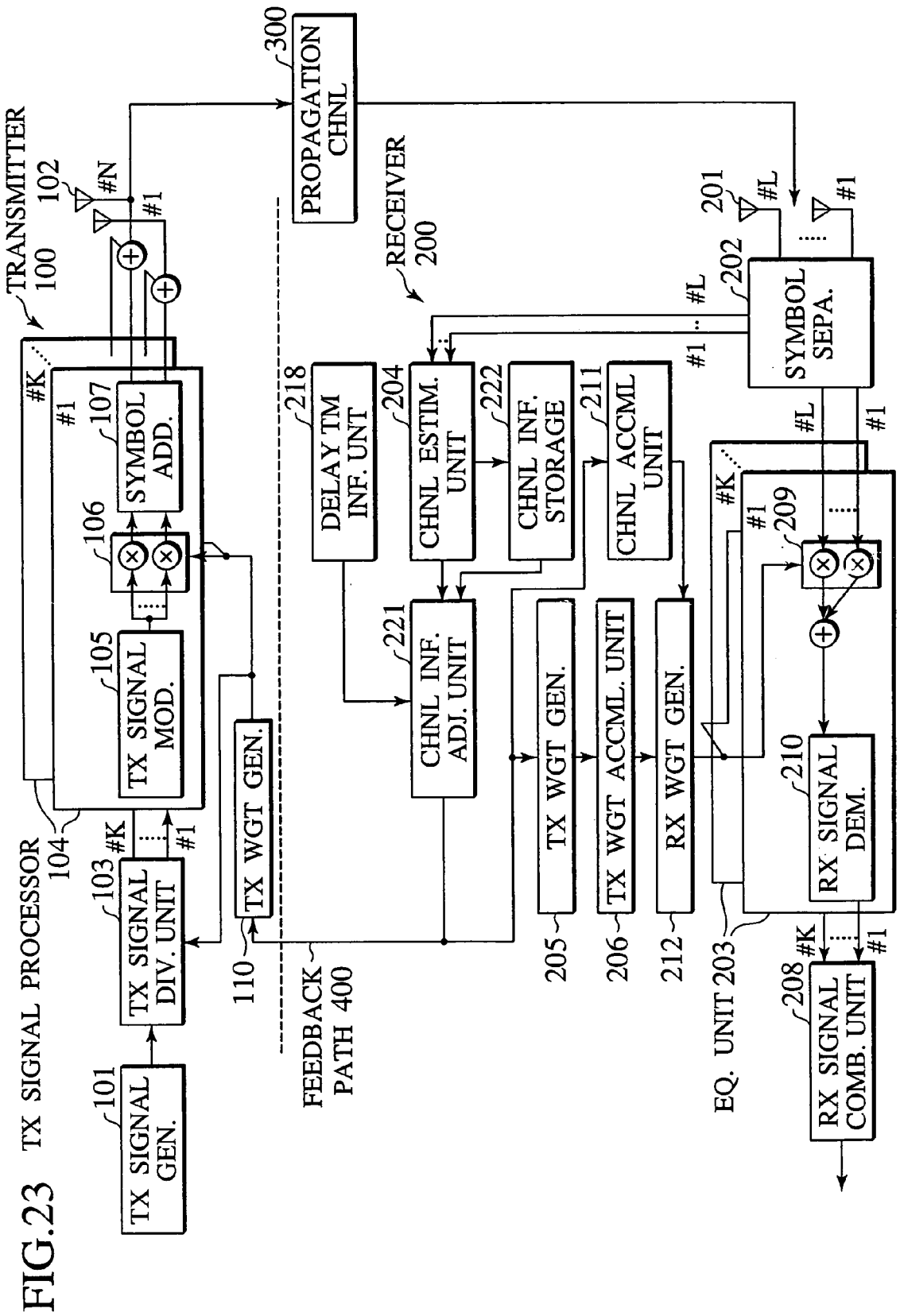
FIG. 23 is a schematic diagram showing an MIMO communication system of the eleventh embodiment of this invention.

Configuration of the transmitter 100 is identical with that of the eleventh embodiment shown in FIG. 23. Therefore, in FIG. 23, identical elements with those of the eleventh embodiment are indicated by identical numerals.

The receiver 200 includes #1 to #L receive antennas 201, a known symbol separator 202, #1 to #K equalization processors 203, a channel state estimation unit 204 for estimating state of each communication channel from received signals received by the #1 to #L antennas 201 to obtain information of channel estimation, a channel information storage 222 for storing past information of channel estimation which has been outputted from the channel state estimation unit 204 and a channel information adjusting unit 221 for adjusting the information of channel estimation according to given information of time delay from a delay time information unit 218 and the past information of channel estimation stored in the channel information storage 222 and sending the adjusted information of channel estimation to the transmitter 100 through the feedback path 400.

The receiver 200 further includes a received power estimation unit 220 for estimating a condition of received power by using the information of channel estimation, received signals received by #1 to #L antennas and known symbol, a channel information accumulation unit 211 for accumulating the adjusted information of channel estimation from the channel information adjusting unit 221 for a predetermined interval, a receiver-side transmission weight generator 205 for generating K*N receiver-side transmission weights based on the adjusted and accumulated information of channel estimation in the channel information accumulation unit, a transmission weight accumulation unit 206 for accumulating the receiver-side transmission weights from the receiver-side transmission weight generator 205 for a predetermined interval.

The receiver 200 further includes a first reception weight generator 2121 for generating K*L first reception weights by using the adjusted information of channel estimation from the channel state estimation unit 221 and accumulated receiver-side transmission weights in the transmission weight accumulation unit 206, a second reception weight generator 2122 for generating K*L second reception weights by using the adjusted and accumulated information of channel estimation in the channel information accumulation unit 211 and accumulated receiver-side transmission weights in the transmission weight accumulation unit 206, a weight selector 213 for estimating a transmission quality according to the first reception weights, second reception weights, accumulated receiver-side transmission weights, adjusted information of channel estimation and condition of received power and selecting reception weights to be used, #1 to #K equalization processors 203, and a signal combining unit 208 corresponding to the signal dividing unit 103 of the transmitter 100 for combining the demodulated K signal streams from respective equalization processors 203 to reproduce an original transmission signal.

Each equalization processor 203 is identical with those of other embodiments and includes a reception weight multiplier 209 for multiplying the received #1 to #L substreams of respective #1 to #K signal streams by selected #1 to #L reception weights from the weight selector and a demodulator 210 for composing the #1 to #L weighted substreams to obtain respective composed #1 to #K signal streams and demodulating the composed #1 to #K signal streams, respectively.

According to this MIMO communication system of the twelfth embodiment, in the transmitter 100, as in the MIMO communication system of the eleventh embodiment, the sender-side transmission weight generator 110 generates K*N sender-side transmission weights by using the adjusted information of channel estimation fed-back from the receiver 200 before signal transmission. The transmission signal generator 101 generates a transmission signal and the transmission signal dividing unit 103 divides the transmission signal into #1 to #K signal streams according to the sender-side transmission weights generated by the sender-side transmission weight generator 110. In #1 to K respective transmission signal processors 104, the signal modulator 105 demodulates respective signal streams. Also, in the respective signal processors 104, the stream processor 106 divides respective modulated signal streams into #1 to #N transmission substreams and multiplies respective substreams by the #1 to #N transmission signal weights, respectively, and known symbol adder 107 adds known symbol onto respective #1 to #N substreams. #1 substreams outputted from respective #1 to #K signal processors 104 are composed and transmitted from #1 transmit antenna 102, #2 substreams from respective signal processors 104 are also composed by the same manner and transmitted from #2 antenna, and other substreams are also composed by the same manner and transmitted from respective transmit antennas to the communication channels 300, respectively.

On the other hand, in the receiver 200, as in the receiver of the eleventh embodiment shown in FIG. 23, the channel state estimation unit 204 estimates state of each communication channel from the received signals received by the #1 to #L antennas 201 and outputs the information of channel estimation. The channel information storage 222 stores past information of channel estimation which has been outputted from the channel state estimation unit 204. The channel information adjusting unit 221 adjusts the information of channel estimation according to given information of time delay from a delay time information unit 218 and the past information of channel estimation stored in the channel information storage 222 and sends the adjusted information of channel estimation to the transmitter 100 through the feedback path 400. The channel information accumulation unit 211 accumulates the adjusted information of channel estimation from the channel information adjusting unit 221 for a predetermined interval.

The receiver-side transmission weight generator 205 generates K*N receiver-side transmission weights based on the adjusted and accumulated information of channel estimation in the channel information accumulation unit 211. The transmission weight accumulation unit 206 accumulates the receiver-side transmission weights from the receiver-side transmission weight generator 205 for a predetermined interval. The first reception weight generator 2121 generates K*L first reception weights by using the adjusted information of channel estimation from the channel state estimation unit 204 and accumulated receiver-side transmission weights in the transmission weight accumulation unit 206. The second reception weight generator 2122 generates K*L second reception weights by using the adjusted and accumulated information of channel estimation in the channel information accumulation unit 211 and accumulated receiver-side transmission weights in the transmission weight accumulation unit 206. The weight selector 213 estimates a transmission quality according to the first #1 to #L reception weights, second #1 to #L reception weights, accumulated receiver-side #1 to #N transmission weights, adjusted information of channel estimation from the channel information adjusting unit 221 and condition of received power and selects the first or second reception weights as the proper reception weights to be used.

In each equalization processor 203, the reception weight multiplier 209 multiplies the received #1 to #L substreams of respective #1 to #K signal streams by the selected #1 to #L reception weights by the weight selector 213. The demodulator 210 composes the #1 to #L weighted substreams to obtain each of composed #1 to #K signal streams and demodulates each of the composed #1 to #K signal streams. Finally, the signal combining unit 208 combines the demodulated K signal streams from respective equalization processors 203 to reproduce the original transmission signal.

Figure 26:
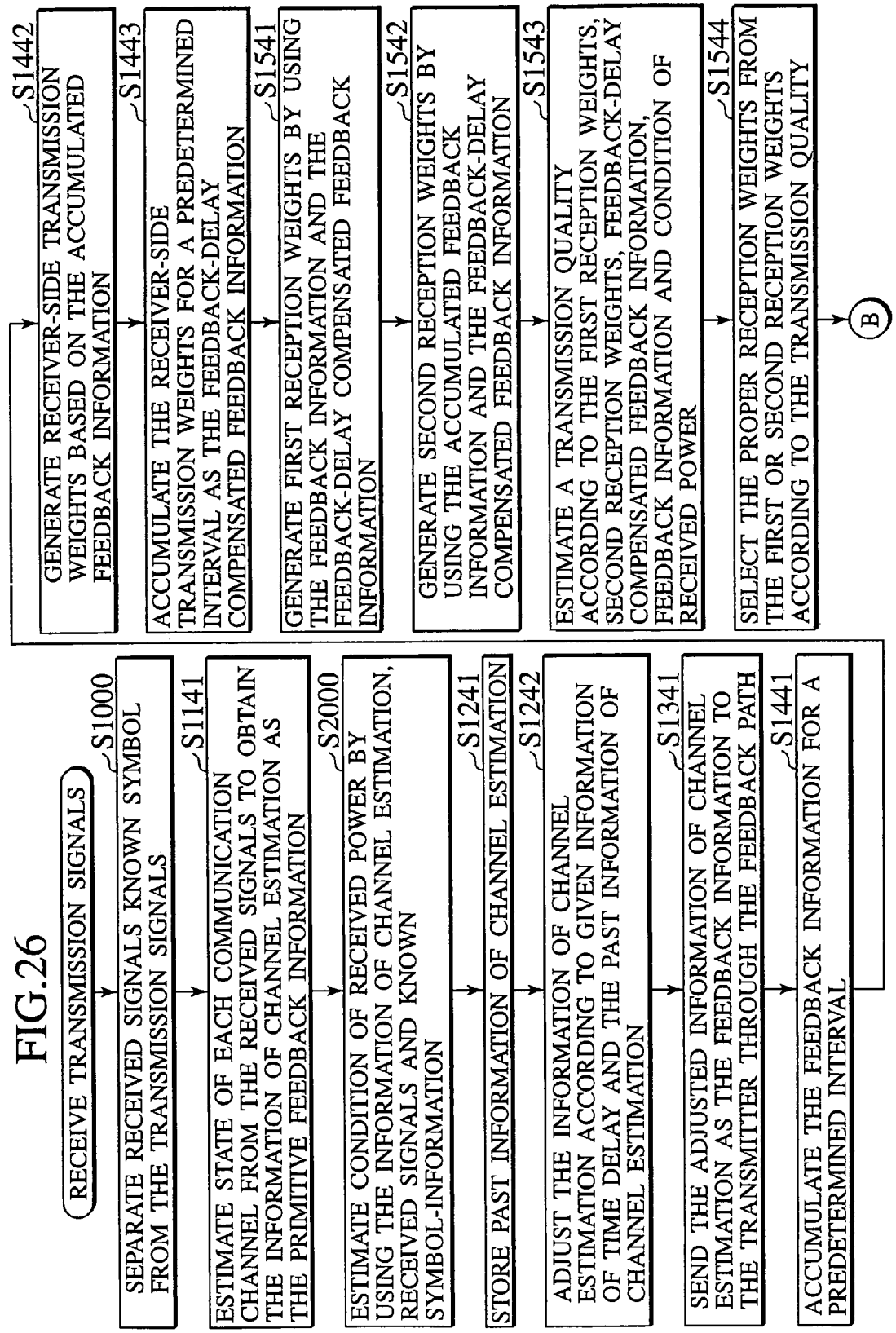
FIG. 26 is a flowchart showing an MIMO receiving method carried out by the MIMO receiver of the twelfth embodiment.

FIG. 26 and FIG. 12B are a flowchart which illustrates this receiving method carried out in the MIMO receiver 200 of the twelfth embodiment.

At step S1000, the receiver 200 separates the received signals into the known symbol and transmission substreams.

At step S1141, the receiver 200 estimates state of each communication channel from the received signals received by the #1 to #L antennas to obtain the information of channel estimation as the primitive feedback information.

At step S2000, the receiver 200 estimates condition of received power by using information of channel estimation, received signals received by the #1 to #L antennas and information of the known symbol.

At steps S1241 and S1242, the receiver 200 stores past information of channel estimation which has been obtained on the step S1141 and adjusts the information of channel estimation according to given information of time delay and the past information of channel estimation stored at the step S1241.

At step S1341, the receiver 200 sends the adjusted information of channel estimation as the feedback information to the transmitter 100 through the feedback path 400.

At steps S1441 through S1442, the receiver 200 accumulates the feedback information for a predetermined interval, generates K*N receiver-side transmission weights based on the accumulated feedback information and accumulates the receiver-side transmission weights for a predetermined interval as the feedback-delay compensated feedback information.

At steps S1541 through S1544, the receiver 200 generates K*L first reception weights by using the feedback information and feedback-delay compensated feedback information, generates K*L second reception weights by using the accumulated feedback information and feedback-delay compensated feedback information, estimates a transmission quality according to the first reception weights, second reception weights, feedback-delay compensated feedback information, feedback information and condition of received power and selects the proper reception weights from the first or second reception weights according to the transmission quality.

Following steps S1600 through S1900 are identical with those of the sixth embodiment as illustrated in FIG. 12B.

According to this MIMO communication system of the twelfth embodiment, it can reduce total quantity of transmission information through the feedback path by using the adjusted channel information as the feedback information fed-back to the transmitter 100 from the receiver 200. Furthermore, this twelfth embodiment can more highly improve the consistency between the transmission weights and reception weights and more effectively restrain the degradation of transmission characteristics by using the channel information that of the feedback timing as well as the current channel information that of the weight generation timing.

Thirteenth Embodiment

Figure 27:
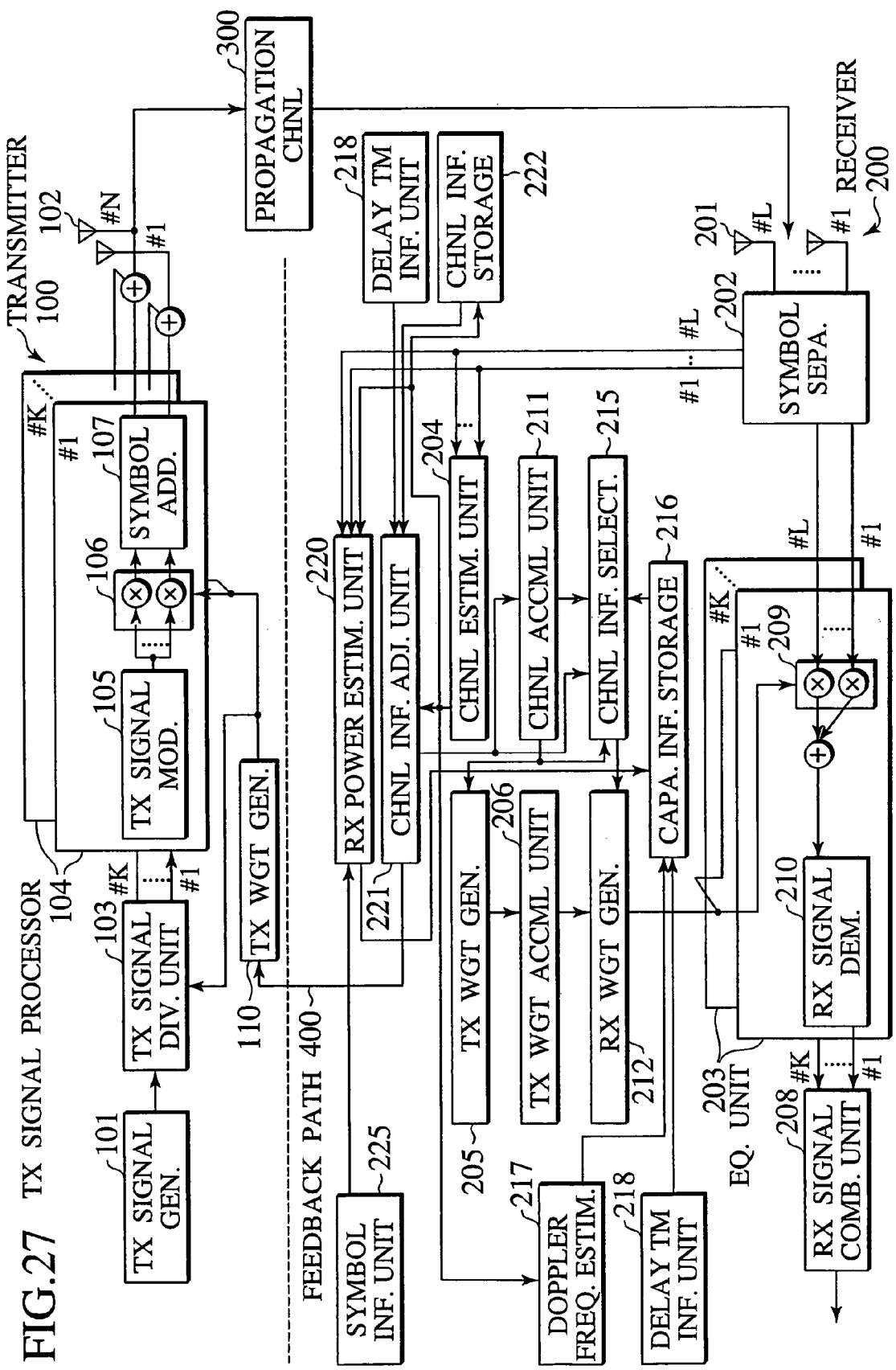
FIG. 27 is a schematic diagram showing an MIMO communication system of the thirteenth embodiment of this invention.

An MIMO communication system and an MIMO receiver used therein of the thirteenth embodiment of this invention will be described with reference to FIG. 27, hereinafter. Configuration of a transmitter 100 in this system is identical with those of the eleventh and twelfth embodiments shown in FIG. 23 and FIG. 25. In FIG. 27, identical elements in the transmitter 100 with those of the eleventh and twelfth embodiments are indicated by identical numerals.

As in the receiver 200 of that of the eleventh and twelfth embodiments, the receiver 200 of this embodiment includes #1 to #L receive antennas 201, a known symbol separator 202, a channel state estimation unit 204, a channel information storage 222, a channel information adjusting unit 221 for adjusting the information of channel estimation according to given information of time delay from a delay time information unit 218 and the past information of channel estimation stored in the channel information storage 222 and sending the adjusted information of channel estimation to the transmitter 100 through the feedback path 400, a channel information accumulation unit 211 for accumulating the adjusted information of channel estimation from the channel information adjusting unit 221 for a predetermined interval, a receiver-side transmission weight generator 205 for generating K*N receiver-side transmission weights based on the adjusted and accumulated information of channel estimation in the channel information accumulation unit 211, a transmission weight accumulation unit 206 for accumulating the receiver-side transmission weights from the receiver-side transmission weight generator, and a received power estimation unit 220 for estimating a condition of received power by using the information of channel estimation, received signals received by #1 to #L antennas 201 and information of the known symbol from a known symbol information unit 225. These elements are identical with those of the eleventh and twelfth embodiments.

The receiver 200 further includes a channel information selector 215 for selecting channel information to be used for generation of K*L reception weights according to the adjusted information of channel estimation, adjusted and accumulated information of channel estimation in the channel information accumulation unit 211 and condition of received power as well as given information of communication capacity, information of delay time and information of Doppler frequency, a reception weight generator 212 for generating K*L reception weights by using the selected channel information from the channel information selector 215 and accumulated receiver-side transmission weights in the transmission weight accumulation unit 206, #1 to #K equalization processors 203, and a signal combining unit 208 corresponding to the signal dividing unit 103 of the transmitter 100.

Each equalization processor 203 includes a reception weight multiplier 209 for multiplying the received #1 to #L substreams of respective #1 to #K signal streams by the #1 to #L reception weights, respectively, and a demodulator 210 for composing the #1 to #L weighted substreams to obtain respective composed #1 to #K signal streams and demodulating the composed #1 to #K signal streams, respectively. The signal combining unit 208 corresponds to the signal dividing unit 103 of the transmitter 100 and combines the demodulated K signal streams from #1 to #K respective equalization processors 203 to reproduce an original transmission signal.

A delay time information unit 218 and Doppler frequency estimation unit 217 are identical with those of the fourth, seventh and tenth embodiments. An acquisition method for acquiring the communication capacity characteristics to be stored in a communication capacity information storage 216 is also identical with that of the fourth embodiment. The channel information selector 215 uses these communication capacity characteristics to select the proper channel information corresponding to a set of weights which can give better characteristics for the current channel state and outputs the selected information to the reception weight generator 212.

According to this MIMO communication system of the thirteenth embodiment, in the transmitter 100 as in that of the eleventh and twelfth embodiments, the sender-side transmission weight generator 110 generates the sender-side transmission weights by using the adjusted information of channel estimation fed-back from the receiver 200. The transmission signal generator 101 generates a transmission signal and the transmission signal dividing unit 103 divides the transmission signal into #1 to #K signal streams according to the sender-side transmission weights generated by the sender-side transmission weight generator 110. In #1 to K respective transmission signal processors 104, the signal modulator 105 demodulates respective signal streams. Also, in the respective signal processors 104, the stream processor 106 divides respective modulated signal streams into #1 to #N transmission substreams and multiplies respective substreams by the #1 to #N transmission signal weights, respectively, and known symbol adder 107 adds a known symbol onto respective #1 to #N substreams. #1 substreams outputted from respective #1 to #K signal processors 104 are composed and transmitted from #1 transmit antenna 102, #2 substreams from respective signal processors 104 are also composed by the same manner and transmitted from #2 antenna, and other substreams are also composed by the same manner and transmitted from respective transmit antennas to the communication channels 300, respectively.

On the other hand, in the receiver 200, as in that of the eleventh and twelfth embodiments, the channel state estimation unit 204 estimates state of each communication channel from the received signals received by the #1 to #L antennas 201 and outputs the information of channel estimation. The received power estimation unit 220 estimates condition of received power by using the information of channel estimation, received signals received by the #1 to #L antennas 201 and known symbol from the known symbol information unit 225. The channel information storage 222 stores past information of channel estimation which has been outputted from the channel state estimation unit 204. The channel information adjusting unit 221 adjusts the information of channel estimation according to given information of time delay from a delay time information unit 218 and the past information of channel estimation stored in the channel information storage 222 and sends the adjusted information of channel estimation to the transmitter 100 through the feedback path 400. The channel information accumulation unit 211 accumulates the adjusted information of channel estimation from the channel information adjusting unit 221 for a predetermined interval. The receiver-side transmission weight generator 205 generates K*N receiver-side transmission weights based on the adjusted and accumulated information of channel estimation in the channel information accumulation unit 211. The transmission weight accumulation unit 206 accumulates the receiver-side transmission weights from the receiver-side transmission weight generator 205 for a predetermined interval.

Furthermore, in the receiver 200, the channel information selector 215 selects channel information to be used for generation of K*L reception weights according to the adjusted information of channel estimation, adjusted and accumulated information of channel estimation in the channel information accumulation unit 211 and condition of received power as well as the given information of communication capacity, information of delay time and information of Doppler frequency. The reception weight generator 212 generates K*L reception weights by using the selected channel information from the channel information selector 215 and accumulated transmission weights in the transmission weight accumulation unit 206.

In each equalization processor 203, the reception weight multiplier 209 multiplies received #1 to #L substreams of respective #1 to #K signal streams by the #1 to #L reception weights, respectively, and the demodulator 210 composes the #1 to #L weighted substreams to obtain respective composed #1 to #K signal streams and demodulates the composed #1 to #K signal streams, respectively. The signal combining unit 208 combines the demodulated K signal streams from respective equalization processors 203 to reproduce the original transmission signal.

Figure 28:
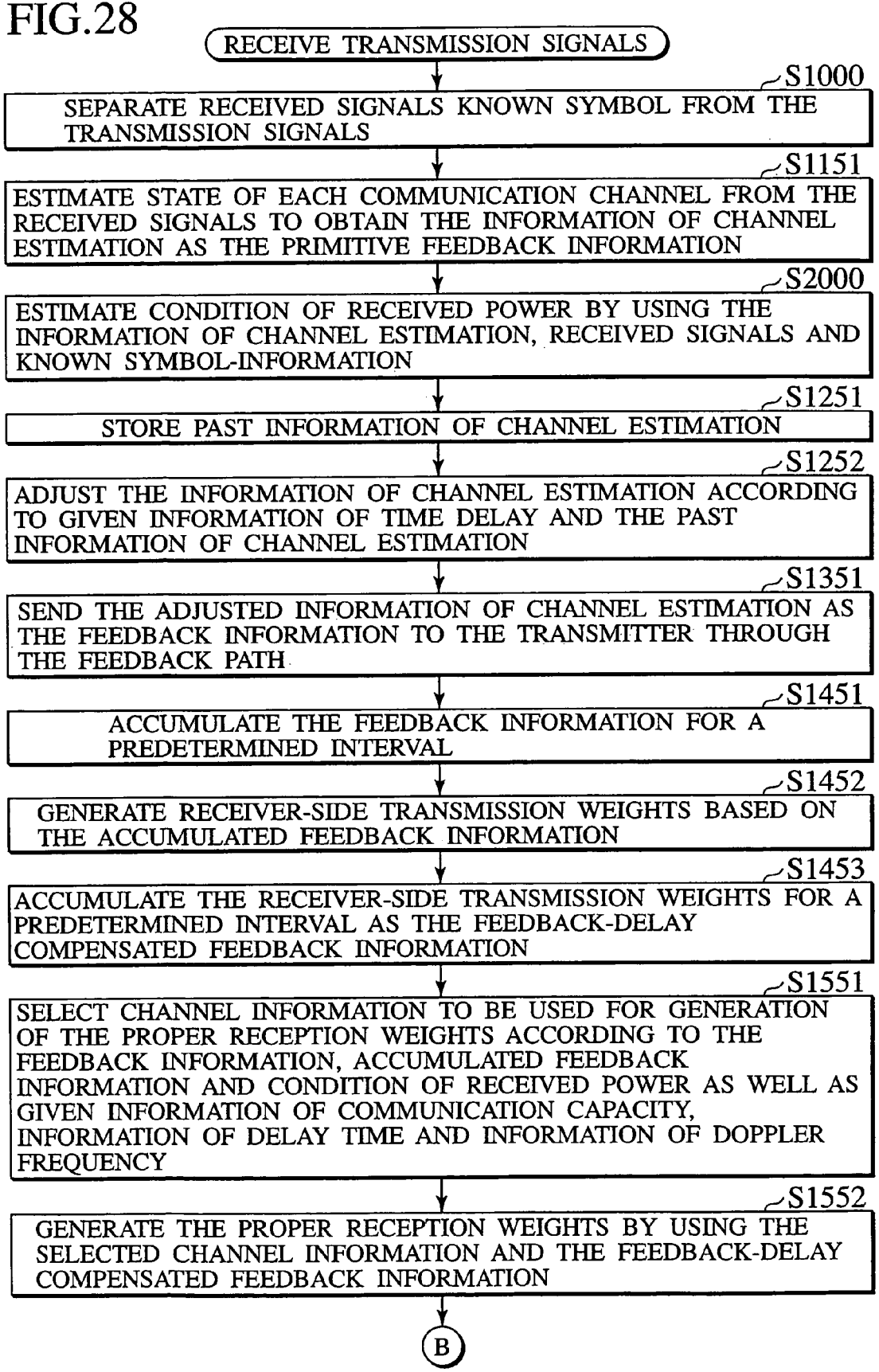
FIG. 28 is a flowchart showing an MIMO receiving method carried out by the MIMO receiver of the thirteenth embodiment.

FIG. 28 and FIG. 12B are a flowchart which illustrates this receiving method carried out in the MIMO receiver 200 of the thirteenth embodiment.

At step S1000, the receiver 200 separates the received signals into the known symbol and transmission substreams.

At step S1151, the receiver 200 estimates state of each communication channel from the received signals received by the #1 to #L antennas 201 to obtain information of channel estimation as the primitive feedback information.

At step S2000, the receiver 200 estimates condition of received power by using information of channel estimation, received signals received by the #1 to #L antennas and information of the known symbol.

At steps S1251 and S1252, the receiver 200 stores past information of channel estimation which has been outputted on the step S1151 and adjusts the information of channel estimation according to given information of time delay and the past information of channel estimation stored on the step S1251.

At step S1351, the receiver 200 sends the adjusted information of channel estimation as the feedback information to the transmitter 100 through the feedback path 400.

At steps S1451 through S1453, the receiver 200 accumulates the feedback information for a predetermined interval, generates K*N receiver-side transmission weights based on the accumulated feedback information and accumulates the receiver-side transmission weights for a predetermined interval as the feedback-delay compensated feedback information.

At steps S1551 and S1552, the receiver 200 selects channel information to be used for generation of the proper reception weights according to the feedback information, accumulated feedback information and condition of received power as well as given information of communication capacity, information of delay time and information of Doppler frequency and generates K*L proper reception weights by using the selected channel information and the feedback-delay compensated feedback information.

Following steps S1600 through S1900 are identical with those of the sixth embodiment as illustrated in FIG. 12B.

According to this MIMO communication system of the thirteenth embodiment, it can reduce total quantity of transmission information through the feedback path by using the adjusted channel information as the feedback information fed-back to the transmitter 100 from the receiver 200. Furthermore, this thirteenth embodiment can more highly improve the consistency between the transmission weights and reception weights and more effectively restrain the degradation of transmission characteristics by using the channel information that of the feedback timing as well as the current channel information that of the weight generation timing.

Fourteenth Embodiment

Figure 29:
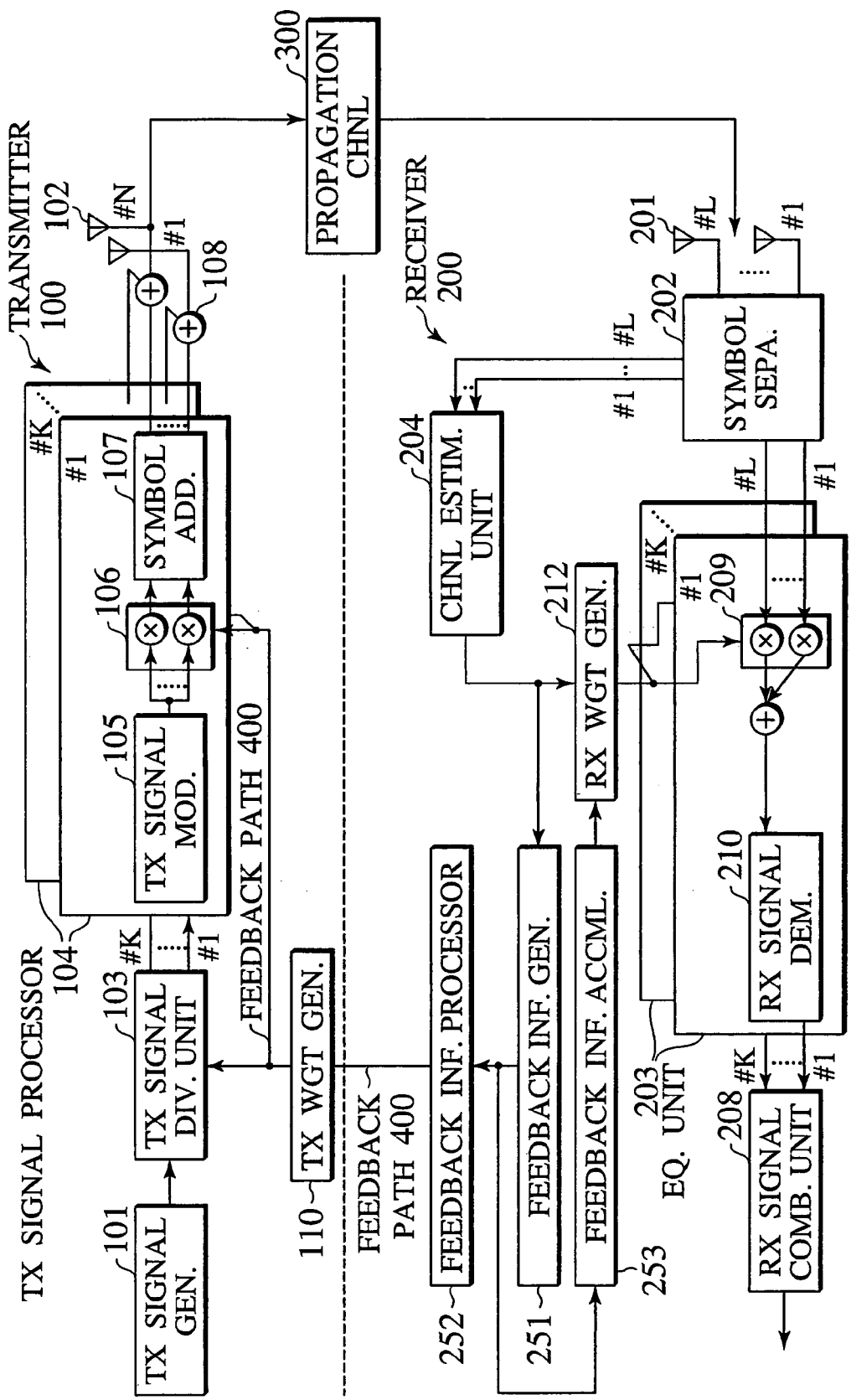
FIG. 29 is a schematic diagram showing an MIMO communication system of the fourteenth embodiment of this invention.

An MIMO communication system and an MIMO receiver used therein of the fourteenth embodiment of this invention will be described with reference to FIG. 29. This MIMO communication system basically includes a transmitter 100 with #1 to #N antennas, a receiver 200 with #1 to #L antennas and propagation channels 300 linking between the transmitter 100 and receiver 200.

The transmitter 100 includes a transmission signal generator 101 for generating a transmission signal, a signal dividing unit 103, #1 to #K transmission signal processors 104, #1 to #N adders 108 and a sender-side transmission weight generator 110 which generates K*N transmission weights by using processed feedback information informed from the receiver 200 through a feedback path 400. Each transmission signal processor 104 includes a signal modulator 105 for modulating each one of the #1 to #K signal streams, a stream processor 106 for dividing each of #1 to #K modulated signal streams into #1 to #N substreams and multiplying the #1 to #N substreams by the #1 to #N transmission weights and known symbol adder 107.

On the other hand, the receiver 200 includes a known symbol separator 202, a channel state estimation unit 204 for estimating state of each communication channel from received signals received by the #1 to #L antennas 201 to obtain information of channel estimation, a feedback information generator 251 for generating feedback information according to the information of channel estimation from the channel state estimation unit 204, a feedback information processing unit 252 for processing the feedback information according to a condition of the feedback path 400 and generating the processed feedback information to be sent to the transmitter 100 through the feedback path 400 and a feedback information accumulation unit 253 for accumulating the feedback information for a predetermined interval. The receiver 200 further includes a reception weight generator 212 for generating K*L reception weights by using the information of channel estimation from the channel state estimation unit and accumulated feedback information in the feedback information accumulation unit 253, #1 to #K equalization processors 203 and a signal combining unit 208.

Each equalization processor 203 includes a reception weight multiplier 209 for multiplying the received #1 to #L substreams of each one of #1 to #K signal streams by the #1 to #L reception weights, and a demodulator 210 for composing #1 to #L weighted substreams to obtain each one of the composed #1 to #K signal streams and demodulating each one of the composed #1 to #K signal streams. The signal combining unit 208 corresponds to the signal dividing unit 103 of the transmitter 100 and combines the demodulated K signal streams from #1 to #K equalization processors 203 to reproduce an original transmission signal.

The feedback information sent back to the transmitter 100 from the receiver 200 contains #1 to #L information, wherein L is equivalent to the number of the receive antennas 201. #1 to #L information contains information of N transmission weights, wherein N is equivalent to the number of the transmit antennas 102.

The sender-side transmission weight generator 110 of the transmitter 100 generates K*N sender-side transmission weights based on the feedback information from the receiver 200. For this generation, eigenvalue operation or singular value operation is employed. Practically, let A for a channel matrix, then K eigenvectors $e_k$ which can satisfy the following relationship (16) are obtained by eigenvalue decomposition of a channel correlation determinant $A^H A$, where K=min (N,L).

$$e_i^H (A^H A) e_i = \lambda_i \quad (i = 0, \ldots, K) \\ e_i^H (A^H A) e_j = 0 \quad (i \neq j)$$ (16)

In this expression (16), character H indicates complex transposition, and $\lambda_i$ indicates an eigenvalue to the i-th eigenvector.

A vector of transmission weights for the k-th stream is created as the following expression (17) by using the eigenvector $e_k$.

$$W_{Tk} = e_k$$ (17)

The transmission signal dividing unit 103 divides the transmission signal from the transmission signal generator 101 into streams of the same number with the number of groups which are not the group in which the transmission weights are all zeros. Each divided signal stream is modulated by the transmission signal modulator 105, multiplied by corresponding transmission weights and added a known symbol thereon. This known symbol is to be used in equalization process in the receiver 200. Respective signal streams are composed by respective adders 108 corresponding to respective antennas 102 and transmitted to the propagation channels 300. Let $S_k(t)$ for the k-th stream of K divided signal streams, $W_{Tk}$ for transmission weight vector (N×1 matrix) corresponding to the k-th stream, then multiplexed transmission signal vector X(t) can be expressed as an expression (18).

$$X(t) = \sum_{k=1}^{K} W_{Tk} S_k(t)$$ (18)

The transmitted signal is distorted through the propagation channels 300 and received by the receiver 200. The distortion of the transmission signal stream is determined according to the characteristics of the propagation channels 300 and positional relation between respective transmit antennas 102 and receive antennas 202. In here, the propagation channels 300 are assumed that each channel thereof is uniformly fading one that is free from influence of the delayed wave.

In the receiver 200, the known symbol separator 202 separates the received signal into the known symbol and transmission information symbol. The transmission information symbol is inputted to the equalization processors 203 of the same number with that of the transmission signal streams. The known symbol is inputted to the channel state estimation unit 204. The channel state estimation unit 204 estimates characteristics of each propagation channels by using the known symbol and outputs the channel state information.

The propagation channel characteristics can be expressed by a channel matrix A as the following expression (19), where L indicates the number of the receive antennas 201.

$$A = \begin{bmatrix} a_{11} & \cdots & a_{1N} \\ \vdots & a_{ij} & \vdots \\ a_{L1} & \cdots & a_{LN} \end{bmatrix}$$ (19)

Each received signal r(t) which is received by each antennas 201 is expressed as the following expression (20), where n(t) indicates a noise vector.

$$r(t) = AX(t) + n(t)$$ (20)

The feedback information generator 251 generates the feedback information by using the information of channel estimation from the channel state estimation unit 204. In a case that transmission weight information is used as the feedback information, an identical process is carried out in this feedback information generator 251, and therefore, the sender-side transmission weight generator 110 becomes unnecessary for the transmitter 100. On the other, in a case that communication channel information is used as the feedback information, the information of channel estimation is passed through this feedback information generator 251 without any treatment.

The generated feedback information is inputted to both feedback information processing unit 252 and feedback information accumulation unit 253. The feedback information processing unit 252 processes to the feedback information in order to conform to the bandwidth of the feedback path 400 and quantity of the feedback information and outputs the processed feedback information. This processed feedback information informed to the transmitter 100 through the feedback path 400. In the feedback information accumulation unit 253, the feedback information from the feedback information generator 251 is held for a while until the processed feedback information is informed to the transmitter 100 and the newly transmitted signal on which the feedback information is reflected is received by the receiver 200. In the case that the information of channel estimation is used as the feedback information and it is passed through the feedback information generator 251, this feedback information accumulation unit 253 operates as the transmission weight generator 110 of the transmitter 100 after a predetermined interval and outputs the transmission weights as the feedback information.

When the predetermined interval is over, the accumulated feedback information is outputted to the reception weight generator 212. The reception weight generator 212 generates the reception weights by using the information of channel estimation and accumulated feedback information. The reception weight vector $W_{Rk}$ is generated by an expression (21).

$$W_{Rk} = (Ae_k)^H \quad (21)$$

The generated reception weights are multiplied by the received signal. Outputted signal $y_k(t)$ after composition for the k-th stream is the following expression (22).

$$\begin{aligned} y_k(t) &= W_{Rk} A X(t) \\ &= W_{Tk}^H A^H A \sum_{m=1}^{K} W_{Tm} S_m(t) + W_{Tk}^H A^H n(t) \\ &= \lambda_k S_k(t) + W_{Tk}^H A^H n(t) \end{aligned} \quad (22)$$

Figure 30:
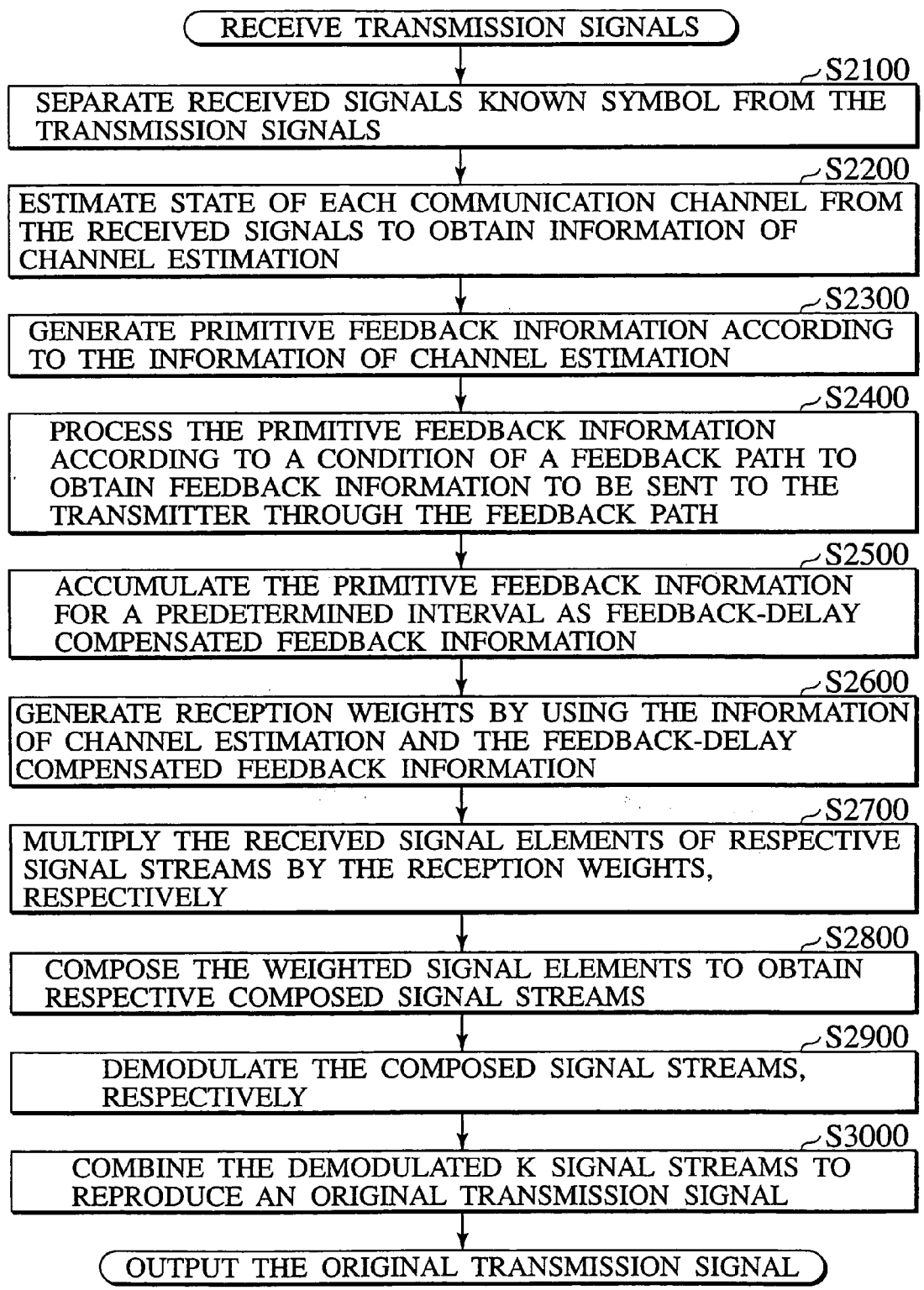
FIG. 30 is a flowchart showing an MIMO receiving method carried out by the MIMO receiver of the fourteenth embodiment.

FIG. 30 and FIG. 12B are a flowchart which illustrates this receiving method carried out in the MIMO receiver 200 of the fourteenth embodiment.

At step S1000, the receiver 200 separates the received signals into the known symbol and transmission substreams.

At step S2100, the receiver 200 estimates state of each communication channel from received signals received by #1 to #L antennas 201 to obtain information of channel estimation.

At step S2200, the receiver 200 generates primitive feedback information according to the information of channel estimation.

At step S2300, the receiver 200 processes the primitive feedback information according to the condition of the feedback path 400 to obtain feedback information to be sent to the transmitter 100 through the feedback path 400.

At step S2400, the receiver 200 accumulates the primitive feedback information for a predetermined interval as the feedback-delay compensated feedback information.

At step S2500, the receiver 200 generates K*L reception weights by using the information of channel estimation and feedback-delay compensated feedback information.

At step S2600, the receiver 200 multiplies the received #1 to #L substreams of respective #1 to #K signal streams by the #1 to #L reception weights, respectively.

At step S2700, the receiver 200 composes the #1 to #L weighted substreams to obtain respective composed #1 to #K signal streams.

At step S2800, the receiver 200 demodulates the composed #1 to #K signal streams, respectively.

Finally, at step S2900, the receiver 200 combines the demodulated K signal streams to reproduce the original transmission signal.

By this manner as set forth above, a targeted stream can be derived without any interference from other multiplexed streams. Accordingly, the MIMO communication system and MIMO receiver of the fourteenth embodiment can greatly improve the utilization efficiency of frequency compared to the conventional single stream transmission technique.

Fifteenth Embodiment

An MIMO communication system and an MIMO receiver used therein of the fifteenth embodiment of this invention will be described with reference to FIG. 31. As for the MIMO communication system of the fourteenth embodiment shown in FIG. 29, degradation of feedback information may occur due to the process to the feedback information according to the bandwidth of the feedback path and quantity thereof on sending it back to the transmitter from the receiver may occur.

In the fourteenth embodiment, let the information of transmission weight before the process and that of after the process as $W_{Tk}$, $\tilde{W}_{Tk}$, respectively, the reception weights $W_{Rk}$ are obtained by the following expression.

$$W_{Rk} = (A \tilde{W}_{Tk})^H$$

In this case, the composed signal $y_k(t)$ becomes as the following expression (23).

$$\begin{aligned} y_k(t) &= W_{Rk} A X(t) \\ &= W_{Tk}^H A^H A \sum_{m=1}^{K} \tilde{W}_{Tm} S_m(t) + W_{Tk}^H A^H n(t) \end{aligned} \quad (23)$$

In this case, since there occurs errors between $W_{Tk}$, $\tilde{W}_{Tk}$, the information of transmission weight before and after the process, the consistency between the transmission weights and reception weights may be disturbed. If this disturbance of consistency occurs, the interference with other streams cannot be fully cancelled. As this result, it is predictable that the degradation of the communication characteristics occurs.

This MIMO communication system of the fifteenth embodiment can solve this predictable drawback of the fourteenth embodiment. In FIG. 31, identical elements are indicated by identical numerals with those of the fourteenth embodiment shown in FIG. 29.

The feature of this embodiment is that a feedback information accumulation unit 253 accumulates processed feedback information from a feedback information adjusting unit 252 instead of the primitive feedback information from a feedback information generator 251 as in the fourteenth embodiment, and a reception weight generator 212 uses this processed feedback information once accumulated in the feedback information accumulation unit 253. Other elements are all identical with those of the fourteenth embodiment shown in FIG. 29, and identical numerals are used to the identical elements thereof.

The table shown in FIG. 33 shows kinds of weight information used in the fourteenth embodiment and fifteenth embodiment. In the fourteenth embodiment, the eigenvalue calculation is carried out based on the channel estimation values as expressed by the expression (17). Then, the transmission weights and reception weights are calculated to conform to the current propagation channels, and used for the transmission. On the other hand, the feedback information sent back through the feedback path 400 is processed to conform to the information ratio of the feedback path. Consequently, it is predictable that the consistency between the processed transmission weights and non-processed reception weights is disturbed, and degradation of transmission capacity may occur.

By contrast, in this fifteenth embodiment, the consistency between transmission weights and reception weights can be maintained since the reception weights generated by using the processed feedback information are used.

Figure 32:
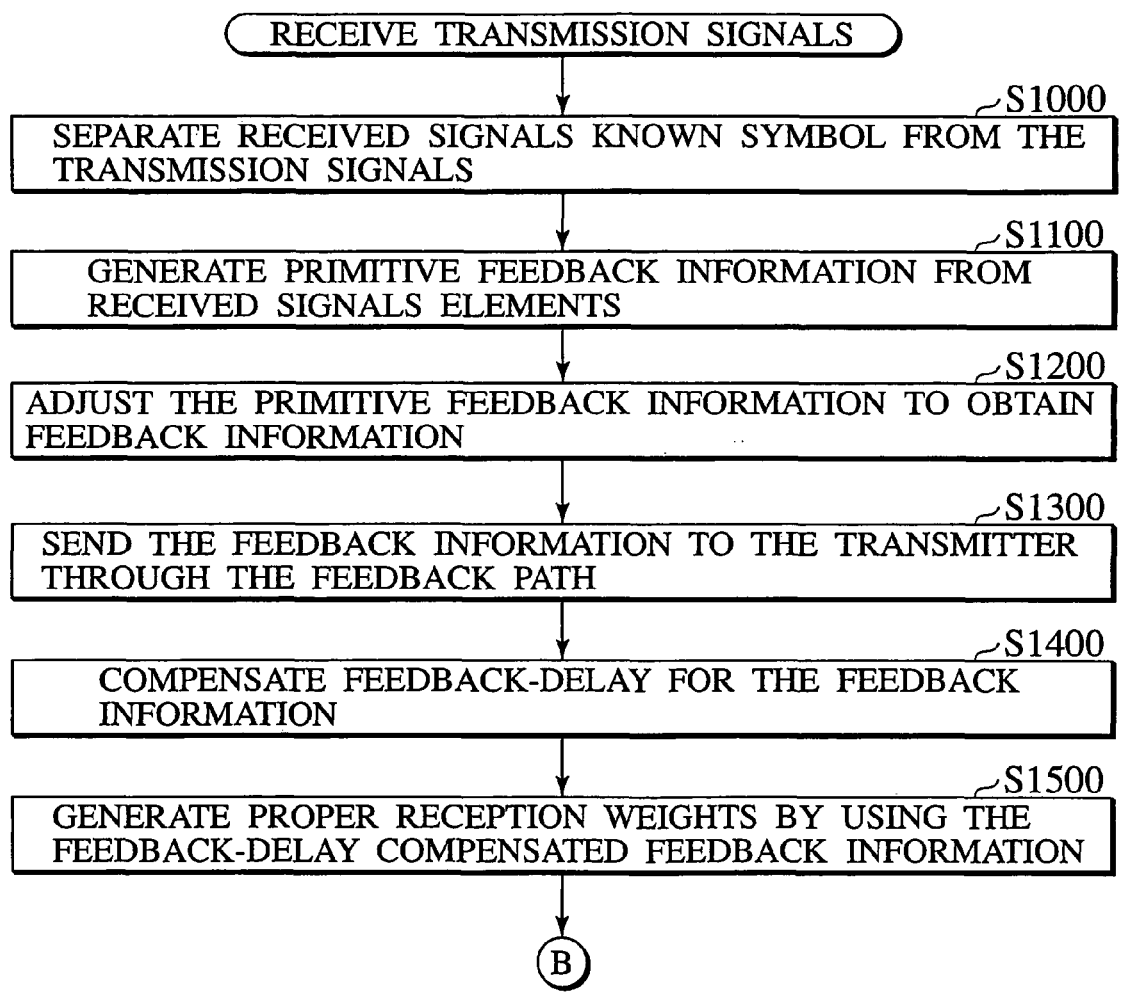
FIG. 32 is a flowchart showing an MIMO receiving method carried out by the MIMO receiver of the fifteenth embodiment.

FIG. 32 and FIG. 12B are a flowchart which illustrates this receiving method carried out in the MIMO receiver 200 of the fifteenth embodiment.

At step S1000, the receiver 200 separates the received signals into the known symbol and transmission substreams.

At step S1100, the receiver 200 generates primitive feedback information from received #1 to #L substreams received by the #1 to #L antennas 201.

At step S1200, the receiver 200 adjusts the primitive feedback information to obtain feedback information.

At step S1300, the receiver 200 sends the feedback information to the transmitter 100 through the feedback path 400.

At step S1400, the receiver 200 compensates feedback-delay for the feedback information.

At step S1500, the receiver 200 generates K*L proper reception weights by using the feedback-delay compensated feedback information.

At step S1600, the receiver 200 multiplies the received #1 to #L substreams of respective #1 to #K signal streams by the proper #1 to #L reception weights, respectively.

At step S1700, the receiver 200 composes the #1 to #L weighted substreams to obtain respective composed #1 to #K signal streams.

At step S1800, the receiver 200 demodulates the composed #1 to #K signal streams, respectively.

At step S1900, the receiver 200 combines the demodulated K signal streams to reproduce the original transmission signal.

By this method, the inconsistency due to feedback delay between the transmission weights and reception weights can be reduced. The reason will be described hereinafter.

Let $W_{Tk}$ for the transmission weights generated by using pre-processed feedback information, and $\tilde{W}_{Tk}$ for the processed transmission weights generated by using the processed feedback information, then the reception weights of this embodiment are generated as the following expression $$W_{Rk} = (A\tilde{W}_{Tk})^H$$

instead of that of the fourteenth embodiment as the following expression.

$$W_{Rk} = (AW_{Tk})^H$$

In this time, the composed signal $y_k(t)$ becomes as an expression (24).

$$y_k(t) = W_{Rk}AX(t) \qquad (24)$$

$$= \tilde{W}_{Tk}^H A^H A \sum_{m=1}^{K} \tilde{W}_{Tm} S_m(t) + W_{Tk}^H A^H n(t)$$

According to the fifteenth embodiment, it is possible to decrease the influence due to errors which occur on the process to the feedback information and, as a result, restrain the degradation of transmission characteristics.

Sixteenth Embodiment

An MIMO communication system and an MIMO receiver used therein of the sixteenth embodiment of this invention will be described with reference to FIG. 34. This embodiment objects to reduce errors of quantization as the errors occurred due to feedback. In the fourteenth embodiment, non-quantized transmission weights are used for generation of the reception weights. In this sixteenth embodiment, by contrast, quantized transmission weights quantized in a transmission weight quantization unit are used for generation of the reception weights.

Figure 34:
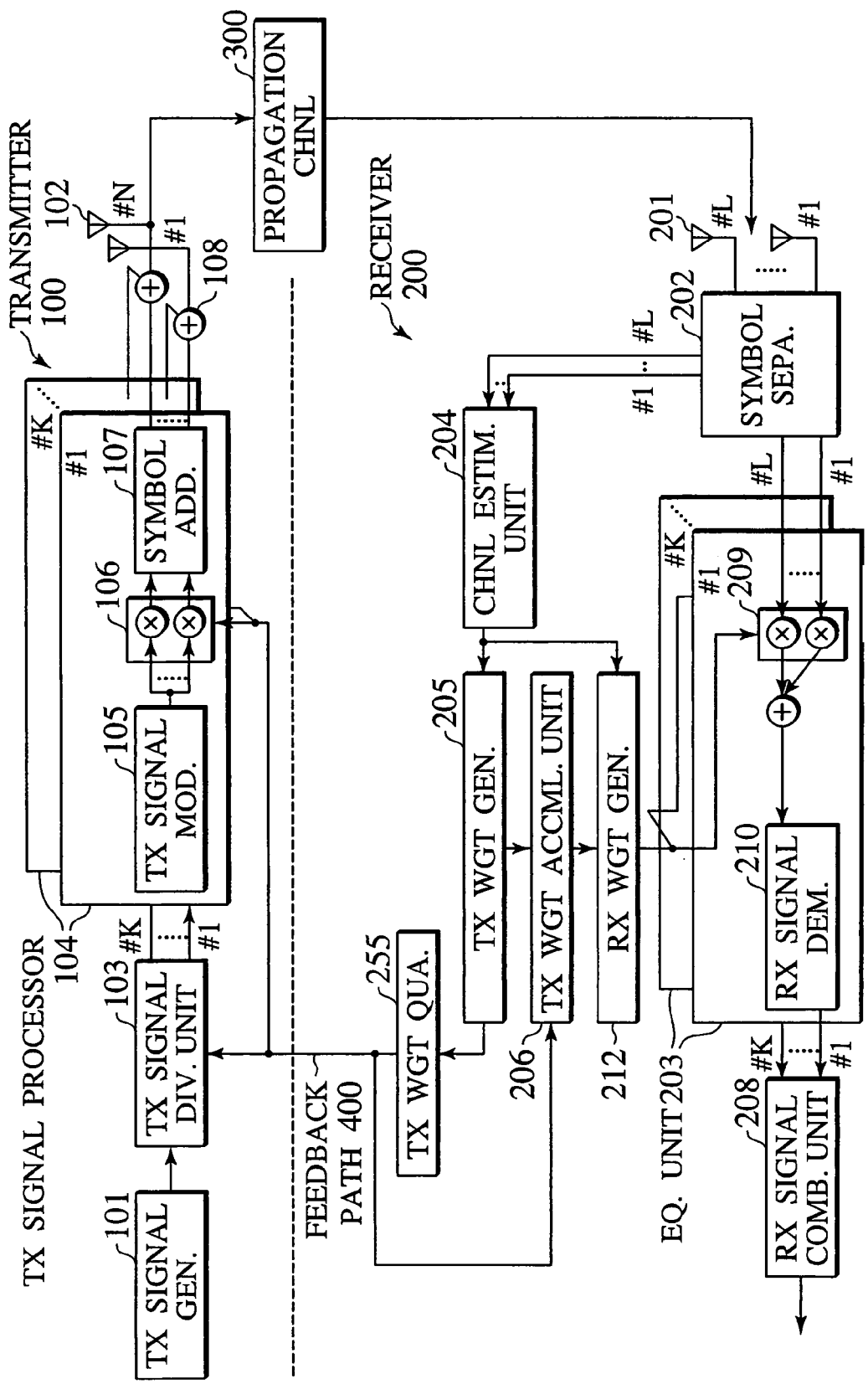
FIG. 34 is a schematic diagram showing an MIMO communication system of the sixteenth embodiment of this invention.

As shown in FIG. 34, the MIMO communication system of the sixteenth embodiment comprises a transmitter 100 with a plurality of transmit antennas 102, a receiver 200 with a plurality of receive antennas 201, and propagation channels 300 linking the transmitter 100 and receiver 200.

Configuration of the transmitter 100 is almost identical with that of the fourteenth embodiment, but it does not include the sender-side transmission weight generator. The transmitter 100 uses the quantized transmission weights fed-back from the receiver 200 instead of the generated transmission weights in the transmitter itself. In FIG. 34, the identical elements with those of the fourteenth embodiment are indicated by identical numerals as in FIG. 29.

The receiver 200 includes a known symbol separator 202, #1 to #K equalization processors 203, a channel state estimation unit 204 for estimating state of each communication channel from received signals received by the #1 to #L antennas 201 to obtain information of channel estimation, a transmission weight generator 205 for generating K*N transmission weights according to the information of channel estimation, a transmission weight quantization unit 255 for quantizing the transmission weights and sending the quantized transmission weights to the transmitter 100 through the feedback path 400. The receiver 200 further includes a transmission weight accumulation unit 206 for accumulating the quantized transmission weights for a predetermined interval, a reception weight generator 212 for generating K*L reception weights by using the information of channel estimation from the channel state estimation unit 204 and accumulated quantized transmission weights in the transmission weight accumulation unit 206, and a signal combining unit 208.

Each equalization processor 203 corresponds to the signal dividing unit 103 of the transmitter 100, and includes a reception weight multiplier 209 for multiplying the received #1 to #L substreams of respective #1 to #K signal streams by the #1 to #L reception weights and a demodulator 210 for composing the #1 to #L weighted substreams to obtain each of composed #1 to #K signal streams and demodulating each of the composed #1 to #K signal streams. The signal combining unit 208 combines the demodulated K signal streams from respective equalization processors 203 to reproduce an original transmission signal.

In the fourteenth embodiment, the eigenvalue calculation is carried out based on the channel estimation values as expressed by the expression (17). Then, the transmission weights and reception weights are calculated to conform to the current propagation channels, and used for the transmission. On the other hand, the feedback information sent back through the feedback path is processed to conform to the information ratio of the feedback path. Consequently, it is predictable that the consistency between the processed transmission weights and non-processed reception weights is disturbed, and degradation of transmission capacity may occur.

By contrast, in this sixteenth embodiment, in order to maintain the consistency between transmission weights and reception weights, the reception weights are generated by using the quantized transmission weights as the processed feedback information.

Figure 35:
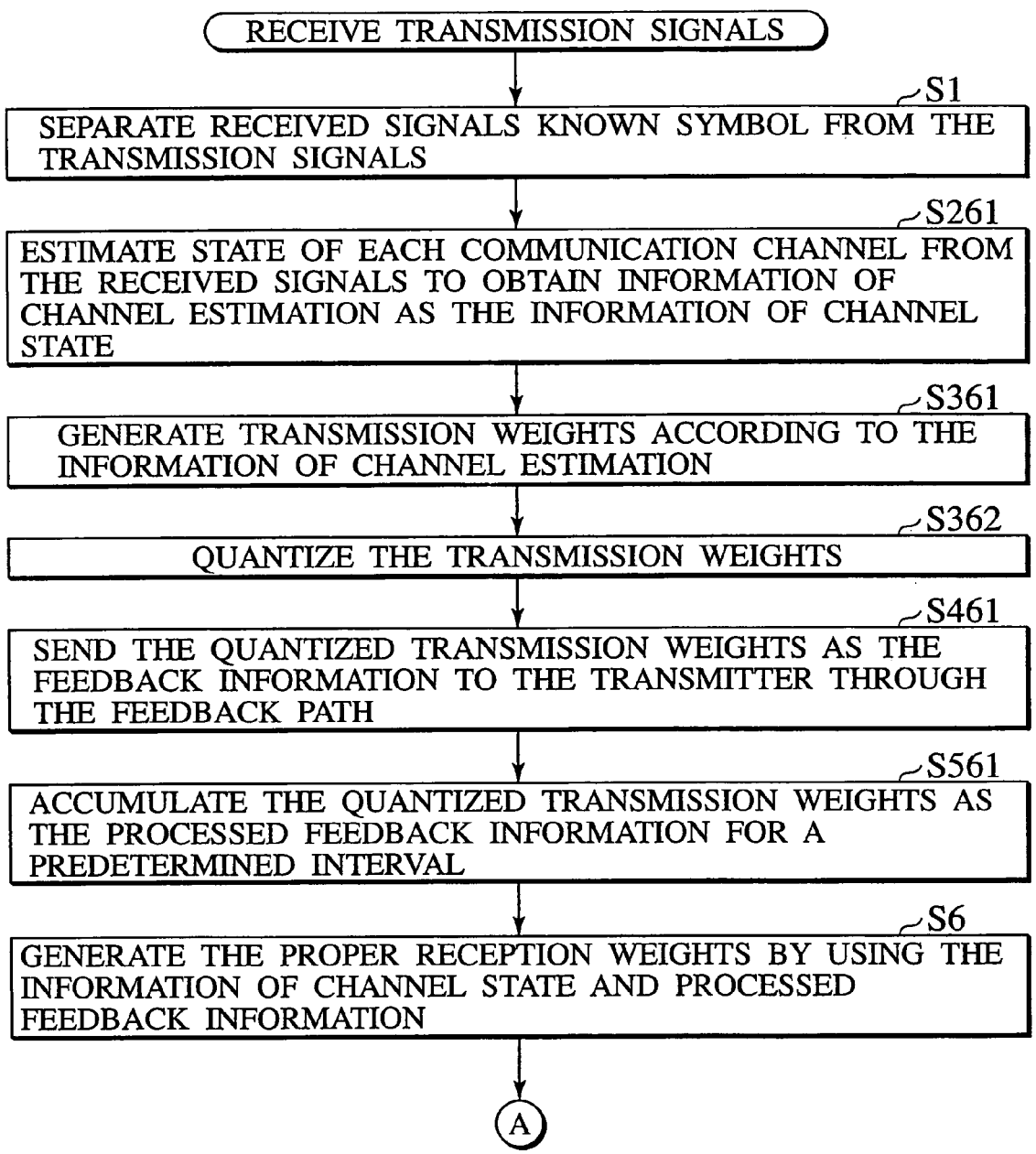
FIG. 35 is a flowchart showing an MIMO receiving method carried out by the MIMO receiver of the sixteenth embodiment.

FIG. 35 and FIG. 2B are a flowchart which illustrates this receiving method carried out in the MIMO receiver 200 of the sixteenth embodiment. This method will be described hereinafter.

At step S1, the receiver 200 separates the received signals into the known symbol and transmission substreams.

At step S261, the receiver 200 estimates state of each communication channel from the received signals received by the #1 to #L antennas 201 to obtain information of channel estimation as the information of channel state.

At steps S361 and S362, the receiver 200 generates K*N transmission weights according to the information of channel estimation and quantizes the transmission weights.

At step S461, the receiver 200 sends the quantized transmission weights as the feedback information to the transmitter 100 through the feedback path 400.

At the step S561, the receiver 200 accumulates the quantized transmission weights as the processed feedback information for a predetermined interval.

At step S6, the receiver 200 generates K*L reception weights by using the information of channel state and processed feedback information.

Following steps S7 through S10 are identical with those of the first embodiment as illustrated in FIG. 2B.

By this method, the inconsistency due to feedback delay between the transmission weights and reception weights can be reduced. The reason will be described hereinafter.

Let $W_{Tk}$, $\tilde{W}_{Tk}$ for pre-quantized transmission weights and quantized transmission weights, respectively, then the reception weights of this embodiment are generated as the following expression $$W_{Rk} = (A\tilde{W}_{Tk})^H$$

instead of that of the fourteenth embodiment as the following expression.

$$W_{Rk} = (AW_{Tk})^H$$

In this time, the composed signal $y_k(t)$ becomes as an expression (25).

$$y_k(t) = W_{Rk}AX(t) \quad (25)$$

$$= \tilde{W}_{Tk}^H A^H A \sum_{m=1}^{K} \tilde{W}_{Tm} S_m(t) + \tilde{W}_{Tk}^H A^H n(t)$$

According to the sixteenth embodiment, it is possible to decrease the influence when quantization errors due to the feedback process occur and, as a result, restrain the degradation of transmission characteristics.

Seventeenth Embodiment

An MIMO communication system and an MIMO receiver used therein of the seventeenth embodiment of this invention will be described with reference to FIG. 36. In the sixteenth embodiment, the quantized transmission weights quantized in the receiver 200 are fed-back to the transmitter 100 through the feedback path 400. By contrast, in this seventeenth embodiment, quantized communication channel information is fed-back from a receiver 200 to a transmitter 100 through a feedback path 400, and transmission weights are generated by the transmitter side.

Figure 36:
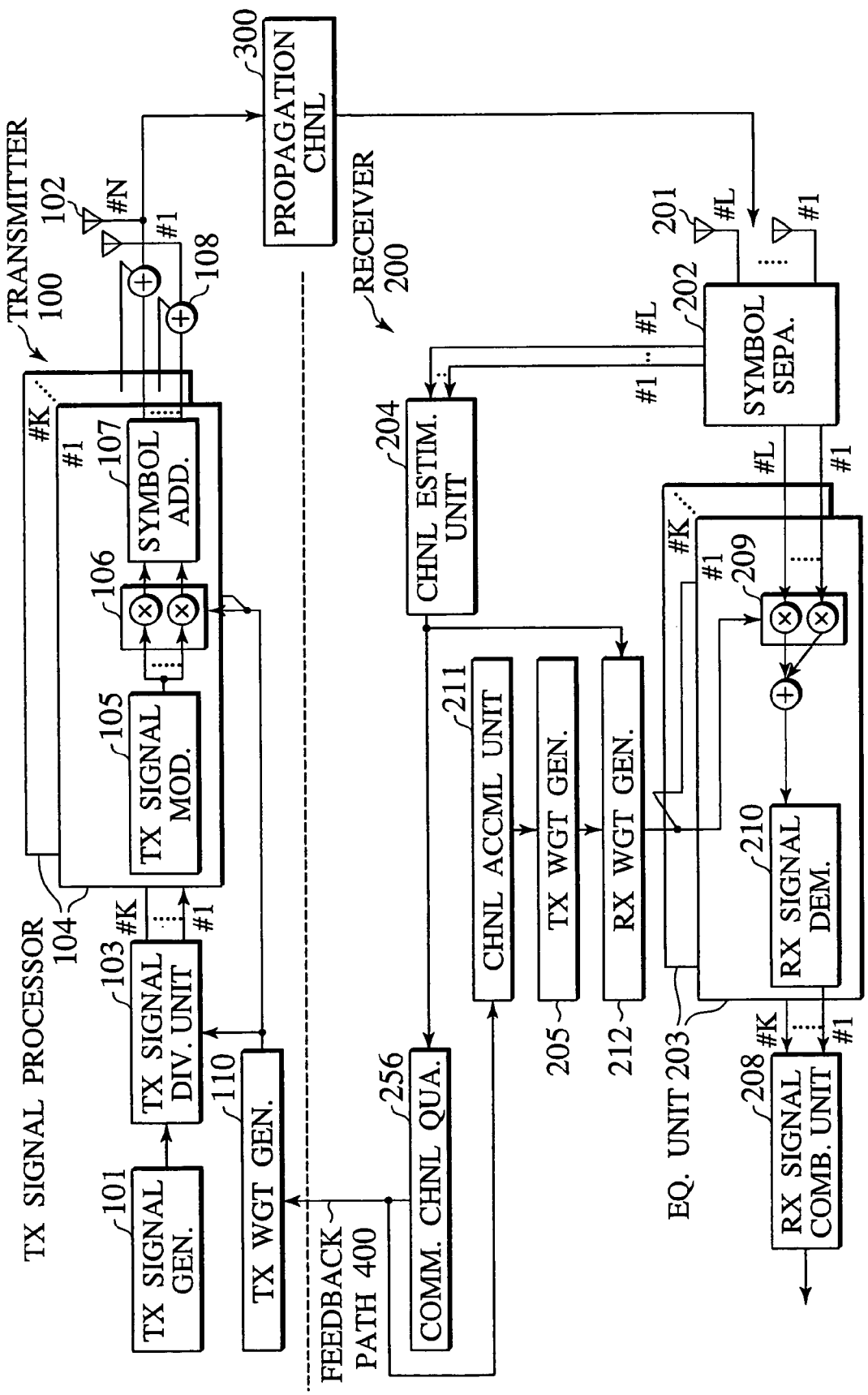
FIG. 36 is a schematic diagram showing an MIMO communication system of the seventeenth embodiment of this invention.

As shown in FIG. 36, the MIMO communication system of the seventeenth embodiment comprises a transmitter 100 with a plurality of transmit antennas 102, a receiver 200 with a plurality of receive antennas 201, and propagation channels 300 linking the transmitter 100 and receiver 200. In FIG. 36, the identical elements with those of the fourteenth embodiment are indicated by identical numerals as in FIG. 29.

The transmitter 100 includes a transmission signal generator 101 for generating a transmission signal, a sender-side transmission weight generator 110 for generating K*N sender-side transmission weights by using quantized channel information informed from the receiver 200 through the feedback path 400, a signal dividing unit 103 for dividing the transmission signal into #1 to #K signal streams according to the sender-side transmission weights, #1 to #K transmission signal processors 104 and #1 to #N adders 108 corresponding to each of #1 to #N transmit antennas 102. Each of #1 to #K transmission signal processors 104 includes a signal modulator 105 for modulating each of the #1 to #K signal streams, a stream processor 106 for dividing each of the #1 to #K modulated signal streams into #1 to #N substreams and multiplying the #1 to #N substreams by the sender-side #1 to #N transmission weights, respectively, and a known symbol adder 107 for adding known symbol onto each transmission substream.

The receiver 200 includes a known symbol separator 202, #1 to #K equalization processors 203, a channel state estimation unit 204 for estimating state of each communication channel from received signals received by the #1 to #L antennas 201 to obtain information of channel estimation, a channel quantization unit 256 for quantizing the information of channel estimation and sending the quantized channel information to the transmitter 100 through the feedback path 400 and a channel information accumulation unit 211 for accumulating the quantized channel information for a predetermined interval.

The receiver 200 further includes a receiver-side transmission weight generator 205 for generating K*N receiver-side transmission weights according to the accumulated quantized channel information, a reception weight generator 212 for generating K*L reception weights by using the information of channel estimation from the channel state estimation unit 204 and the receiver-side transmission weights from the transmission weight generator 205, #1 to #K equalization processors 203 and a signal combining unit 208 corresponding to the signal dividing unit 103 of the transmitter 100.

Each of the #1 to #K equalization processors 203 includes a reception weight multiplier 209 for multiplying the received #1 to #L substreams of each of the #1 to #K signal streams by the #1 to #L reception weights, respectively, and a demodulator 210 for composing #1 to #L respective weighted substreams to obtain each of composed #1 to #K signal streams and demodulating each of the composed #1 to #K signal streams. The signal combining unit 208 combines the demodulated K signal streams from respective equalization processors 203 to reproduce an original transmission signal.

Figure 37:
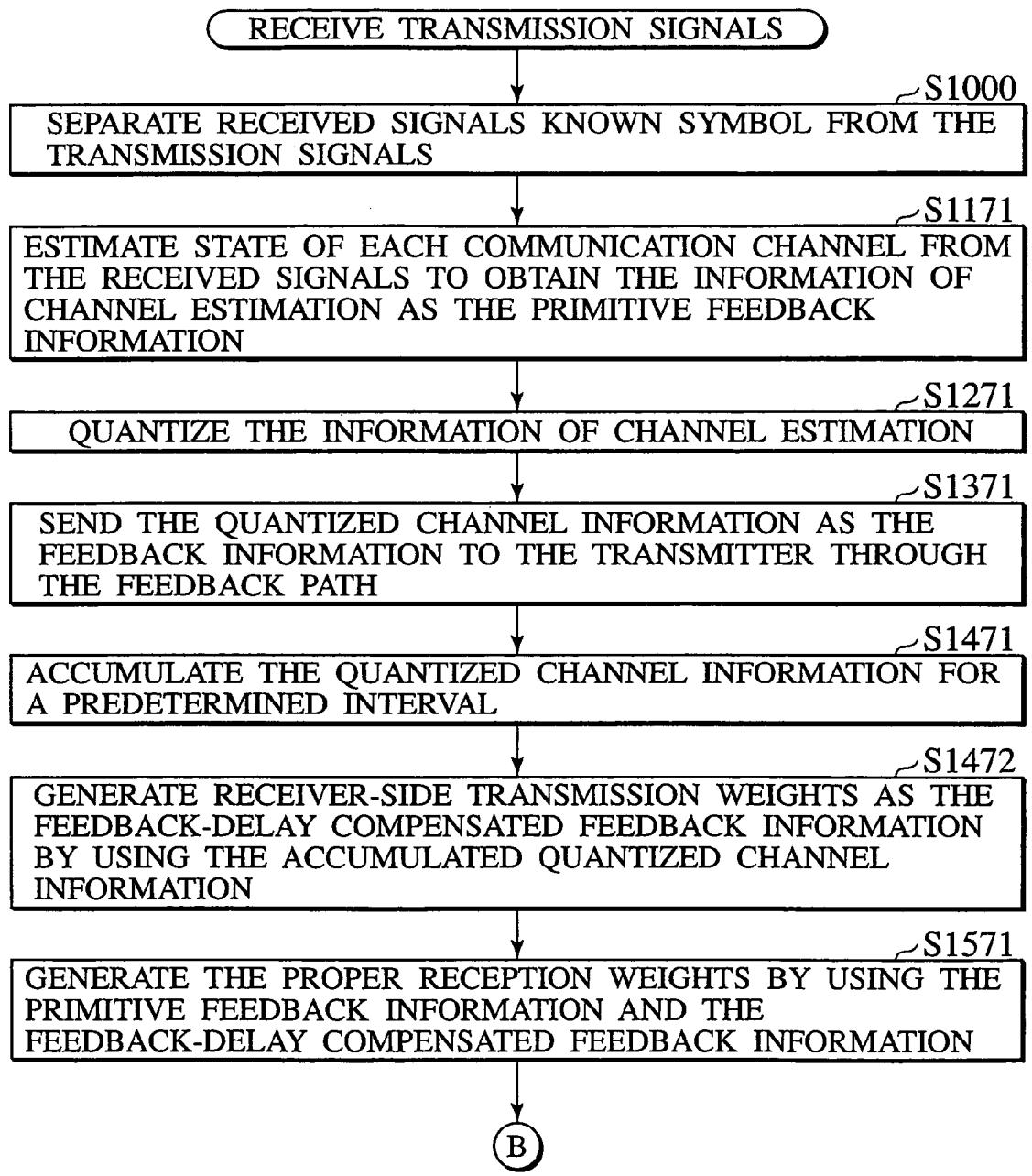
FIG. 37 is a flowchart showing an MIMO receiving method carried out by the MIMO receiver of the seventeenth embodiment.

FIG. 37 and FIG. 12B are a flowchart which illustrates this receiving method carried out in the MIMO receiver 200 of the seventeenth embodiment. This method will be described hereinafter.

At step S1000, the receiver 200 separates the received signals into the known symbol and transmission substreams.

At step S1171, the receiver 200 estimates state of each communication channel from the received signals received by the #1 to #L antennas 201 to obtain information of channel estimation as the primitive feedback information.

At step S1271, the receiver 200 quantizes the information of channel estimation.

At step S1371, the receiver 200 sends the quantized channel information as the feedback information to the transmitter 100 through the feedback path 400.

At steps S1471 and S1472, the receiver 200 accumulates the quantized channel information for a predetermined interval and generates K*N receiver-side transmission weights as the feedback-delay compensated feedback information by using the accumulated quantized channel information.

At step S1571, the receiver 200 generates K*L proper reception weights by using the primitive feedback information and feedback-delay compensated feedback information.

Following steps S1600 through S1900 are identical with those of the sixth embodiment as illustrated in FIG. 12B.

In a case that the transmission weights are generated based on the quantized channel information according to information ratio of the feedback path 400, it is predictable that the consistency between the quantized transmission weights and non-quantized reception weights is disturbed and degradation of transmission capacity may occur. According to this embodiment, in order to avoid this state and to maintain the consistency between the transmission weights and reception weights, the reception weight generator 212 generates the reception weights by using the quantized channel information.

Consequently, this MIMO communication system of the seventeenth embodiment can restrain inconsistency between the transmission weights and reception weights due to feedback delay of the transmission weights. The reason will be described hereinafter.

Let A,Ã for pre-quantized channel information and quantized channel information, respectively, and $\tilde{e}_k$ for an eigenvector which is obtained by singular value decomposition or eigenvalue decomposition of $\tilde{A}^H \tilde{A}$. Then the transmission weights can be expressed as an expression (26).

$$W_{Tk} = \tilde{e}_k \quad (26)$$

Corresponding to this expression of the transmission weights, the reception weights of this embodiment are generated as the following expression $$W_{Rk} = (A\tilde{W}_{Tk})^H$$

instead of that of the fourteenth embodiment as the following expression.

$$W_{Rk} = (AW_{Tk})^H$$

In this time, the composed signal $y_k(t)$ becomes as an expression (27).

$$y_k(t) = W_{Rk} A X(t) \quad (27)$$

$$= W_{Tk}^H \tilde{A}^H A \sum_{m=1}^{K} \hat{W}_{Tm} S_m(t) + \tilde{W}_{Tk}^H A^H n(t)$$

According to the seventeenth embodiment, it is possible to decrease the influence when quantization errors due to the feedback process occur and, as a result, restrain the degradation of transmission characteristics.

Eighteenth Embodiment

An MIMO communication system and an MIMO receiver used therein of the eighteenth embodiment of this invention will be described with reference to FIG. 38. A feature of this embodiment is to treat, as the feedback error, an adjustment error which occurs when weight adjustment is carried out in order to compensate the feedback delay.

In the fourteenth embodiment, the eigenvalue calculation is carried out based on the channel estimation values as expressed by the expression (17). Then, the transmission weights and reception weights are calculated to conform to the current propagation channels and used for the transmission. However, the feedback information sent back through the feedback path is received after a delay caused according to the information ratio of the feedback path. Consequently, it is predictable that the consistency between the transmission weights and reception weights is disturbed, and degradation of transmission capacity may occur.

It is possible to employ a transmission weight adjusting unit in order to restrain inconsistency between transmission weights and communication channels due to the feedback delay. In such a case, it is possible to employ an adjustment that uses a linear extrapolation based on information of past transmission weights stored in a transmission weight storage and delay time. The information of the delay time can be obtained by measuring time taken for weigh generations and adjustment operations in both transmitter and receiver and time taken from the timing of reception of the transmission weights to the timing when they are used in the real communication. However, due to the accuracy of the delay time and error of weigh adjustment, the inconsistency between the weights and communication channels may occur.

For the purpose of maintaining the consistency between transmission weights and reception weights, this MIMO communication system features to adjust the transmission weights and use the adjusted transmission weights for generating the reception weights.

Figure 38:
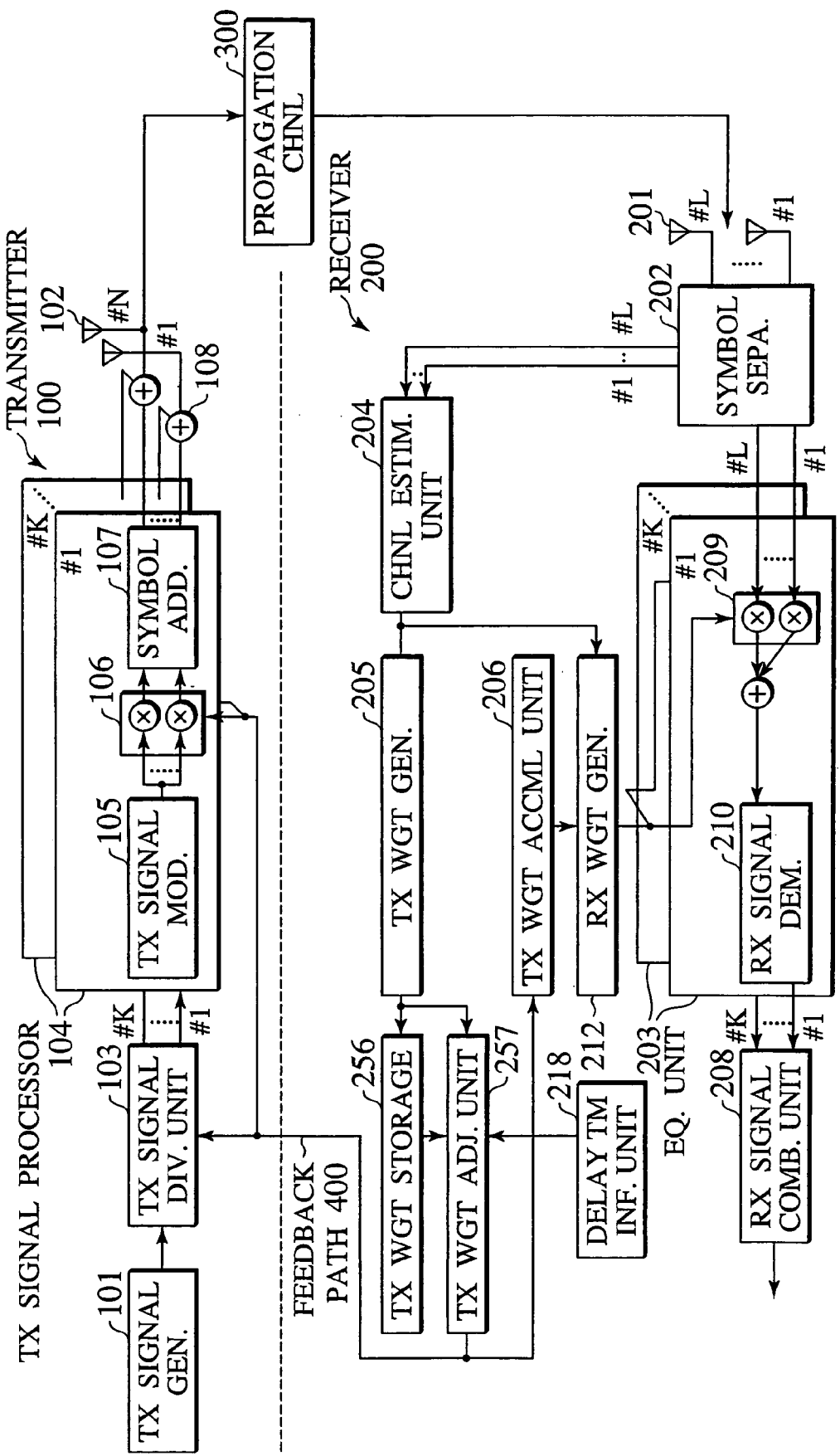
FIG. 38 is a schematic diagram showing an MIMO communication system of the eighteenth embodiment of this invention.

As shown in FIG. 38, the MIMO communication system of the eighteenth embodiment comprises a transmitter 100 with a plurality of transmit antennas 102, a receiver 200 with a plurality of receive antennas 201, and propagation channels 300 linking the transmitter 100 and receiver 200. The configuration of the transmitter 100 is identical with that of the sixteenth embodiment shown in FIG. 34, and therefore, description of the configuration of the transmitter 100 is omitted. In FIG. 38, the identical elements with those of the sixteenth embodiment are indicated by identical numerals as in FIG. 34.

The receiver 200 includes a known symbol separator 202, #1 to #K equalization processors 203, a channel state estimation unit 204 for estimating state of each communication channel from received signals received by the #1 to #L antennas 201 to obtain information of channel estimation, a transmission weight generator 205 for generating K*N transmission weights according to the information of channel estimation, a transmission weight storage 256 for storing past transmission weights which have been generated by the transmission weight generator 205, a transmission weight adjusting unit 257 for adjusting the transmission weights from the transmission weight generator 205 according to the past transmission weights stored in the transmission weight storage 256 and given information of time delay from a time delay information unit 218 and sending the adjusted transmission weights to the transmitter 100 through the feedback path 400 and a transmission weight accumulation unit 206 for accumulating the adjusted transmission weights for a predetermined interval.

The receiver 200 further includes a reception weight generator 212 for generating K*L reception weights by using the information of channel estimation from the channel state estimation unit 204 and adjusted and accumulated transmission weights in the transmission weight accumulation unit 206, #1 to #K equalization processors 203 and a signal combining unit 208 corresponding to the signal dividing unit 103 of the transmitter 100.

Each equalization processor 203 includes a reception weight multiplier 209 for multiplying the received #1 to #L substreams of each of the #1 to #K signal streams by the #1 to #L reception weights, respectively, and a demodulator 210 for composing the #1 to #L weighted substreams to obtain each of composed #1 to #K signal streams and demodulating each of the composed #1 to #K signal streams. The signal combining unit 208 combines the demodulated K signal streams from K equalization processors 203 to reproduce an original transmission signal.

Figure 39:
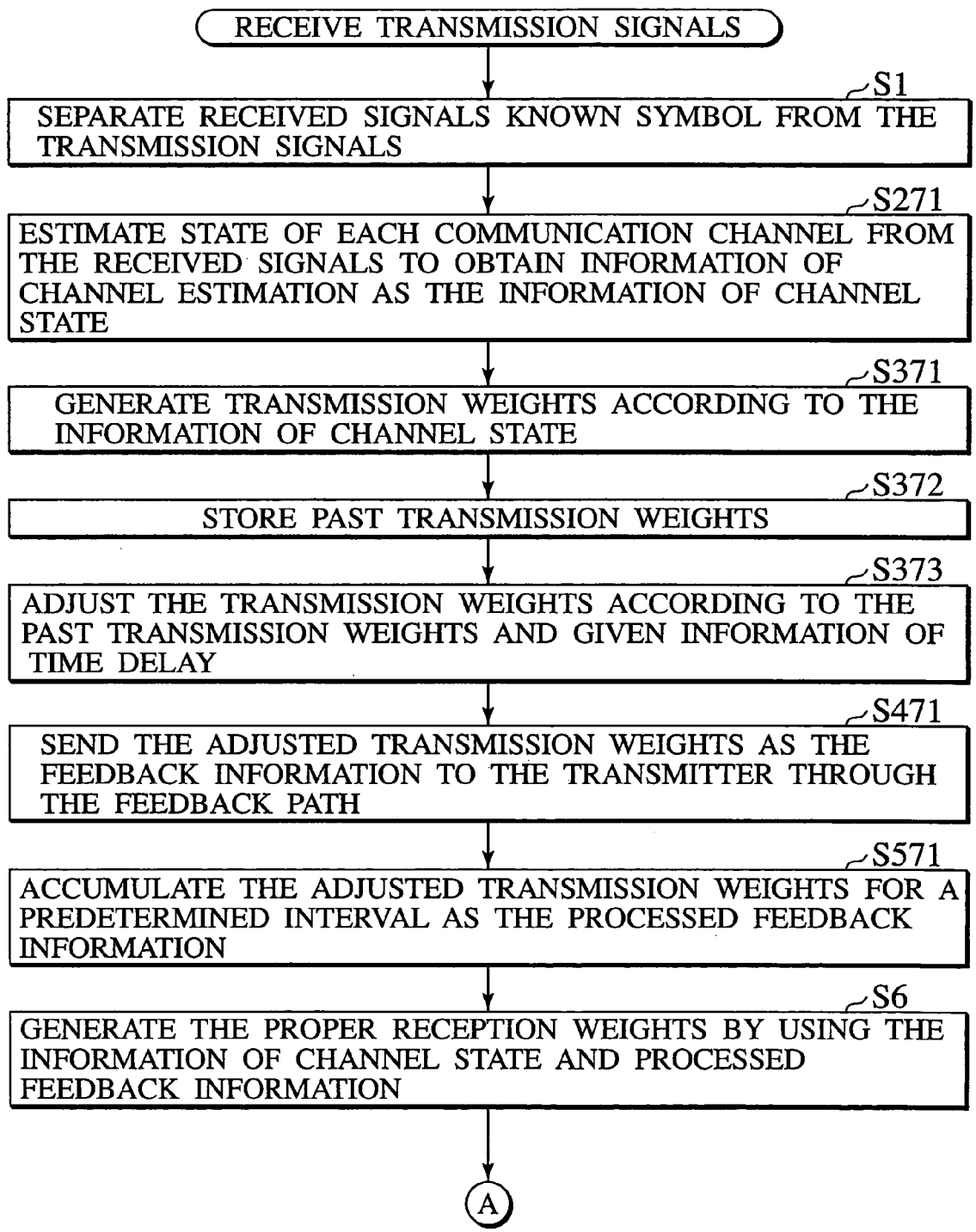
FIG. 39 is a flowchart showing an MIMO receiving method carried out by the MIMO receiver of the eighteenth embodiment.

FIG. 39 and FIG. 2B are a flowchart which illustrates this receiving method carried out in the MIMO receiver 200 of the eighteenth embodiment. This method will be described hereinafter.

At step S1, the receiver 200 separates the received signals into the known symbol and transmission substreams.

At step S271, the receiver 200 estimates state of each communication channel from the received signals received by the #1 to #L antennas 201 to obtain information of channel estimation as the information of channel state.

At steps S371 through S373, the receiver 200 generates K*N transmission weights according to the information of channel state, stores past transmission weights which have been generated on the step S271 and adjusts the transmission weights according to the past transmission weights stored on the step S272 and given information of time delay.

At step S373, the receiver 200 sends the adjusted transmission weights as the feedback information to the transmitter through the feedback path.

At the step S571, the receiver 200 accumulates the adjusted transmission weights for a predetermined interval as the processed feedback information.

At step S6, the receiver 200 generates K*L reception weights by using the information of channel state and processed feedback information.

Following steps S7 through S10 are identical with those of the first embodiment as illustrated in FIG. 2B.

According to this MIMO communication, in order to maintain the consistency between transmission weights and reception weights, the reception weights are generated by using the adjusted transmission weights as the processed feedback information. By this method, the inconsistency between the transmission weights and reception weights due to delay on the adjustment process can be reduced. The reason will be described hereinafter.

Let $W_{Tk}$, $\hat{W}_{Tk}$ for pre-adjusted transmission weights and adjusted transmission weights, respectively, then the reception weights of this embodiment are generated as the following expression $$W_{Rk} = (A\hat{W}_{Tk})^H$$

instead of that of the fourteenth embodiment as the following expression.

$$W_{Rk} = (AW_{Tk})^H$$

In this time, the composed signal $y_k(t)$ becomes as an expression (28).

$$y_k(t) = W_{Rk} A X(t) \qquad (28)$$

$$= \hat{W}_{Tk}^H A^H A \sum_{m=1}^{K} \hat{W}_{Tm} S_m(t) + \hat{W}_{Tk}^H A^H n(t)$$

According to the eighteenth embodiment, it is possible to maintain the consistency between the transmission weights and reception weights furthermore because it even takes influence due to adjustment errors into account. Consequently, it becomes possible to decrease the influence when feedback errors occur and restrain the degradation of transmission characteristics.

Nineteenth Embodiment

Figure 40:
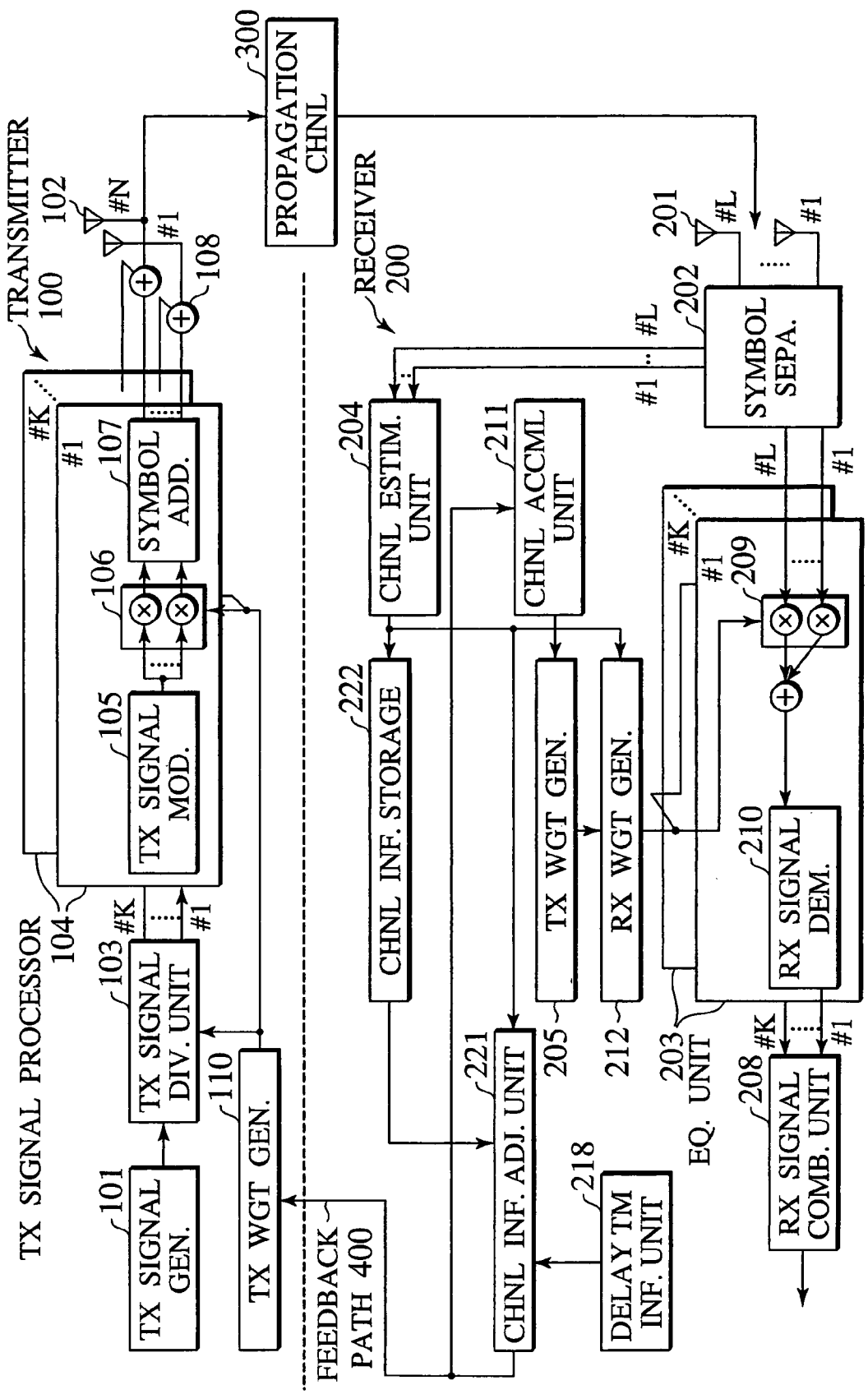
FIG. 40 is a schematic diagram showing an MIMO communication system of the nineteenth embodiment of this invention.

An MIMO communication system and an MIMO receiver used therein of the nineteenth embodiment of this invention will be described with reference to FIG. 40. In the eighteenth embodiment, the receiver generates the transmission weights and sends them back to the transmitter through the feedback path. To the contrary, a feature of this nineteenth embodiment is that a receiver sends adjusted channel information to a transmitter through a feedback path and the transmitter generates transmission weights on its side by using the fed-back channel information.

The MIMO communication system of this nineteenth embodiment comprises a transmitter 100 with #1 to #N antennas 102, a receiver 200 with #1 to #L antennas 201 and propagation channels 300 linking therebetween.

Figure 31:
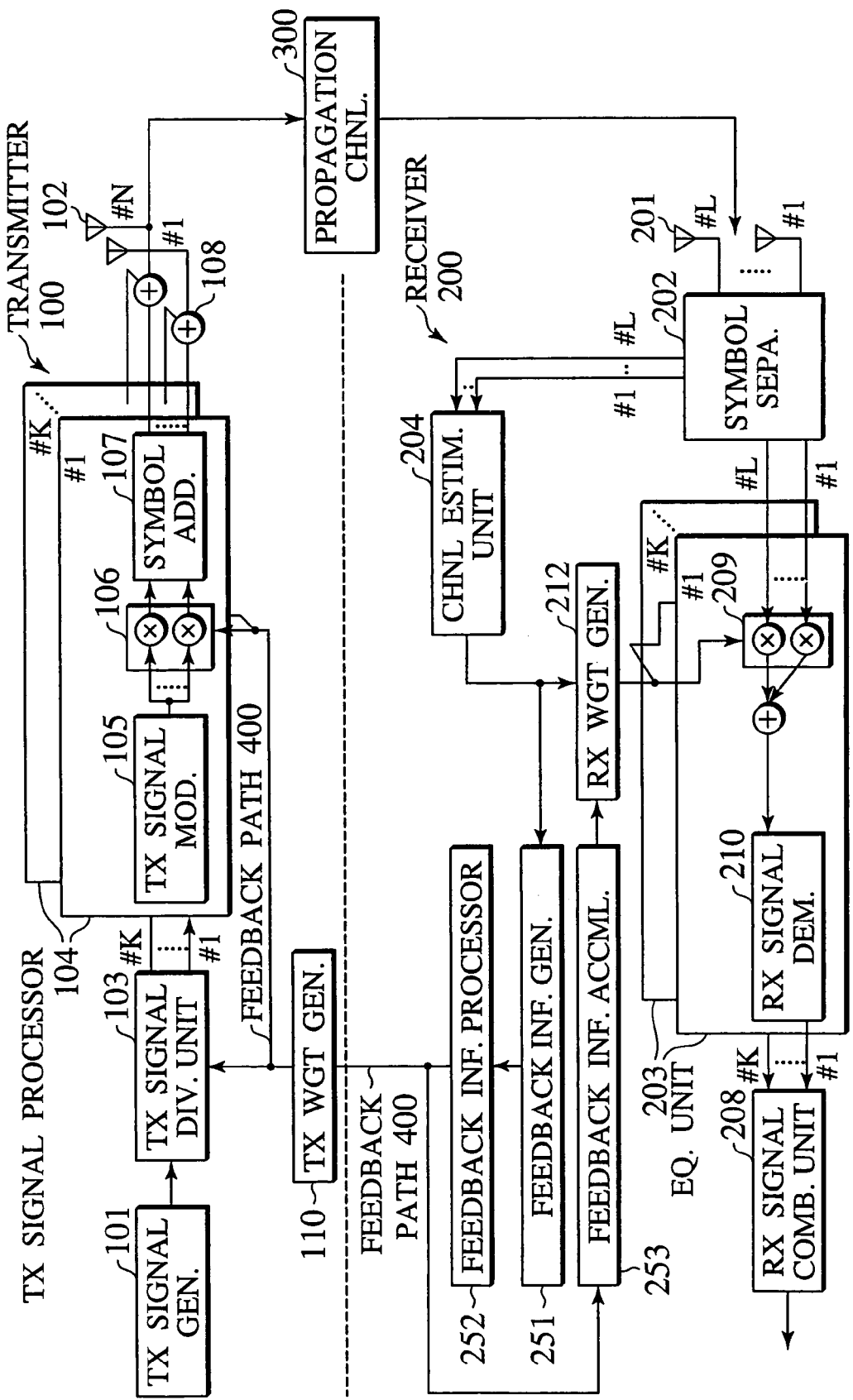
FIG. 31 is a schematic diagram showing an MIMO communication system of the fifteenth embodiment of this invention.

Configuration of the transmitter 100 is substantially identical with those configurations shown in FIG. 31 and FIG. 36, but this transmitter 100 includes a sender-side transmission weight generator 110 that generates transmission weights according to fed-back adjusted channel information from the receiver 200.

The receiver 200 of this embodiment includes a known symbol separator 202, a channel state estimation unit for estimating state of each communication channel from received signals received by the #1 to #L antennas 201 to obtain information of channel estimation, a channel information storage 222 for storing past information of channel estimation which has been generated by the channel state estimation unit 204, a channel information adjusting unit 221 for adjusting the information of channel estimation according to the past information of channel estimation stored in the channel information storage 222 and given information of time delay from a delay time information unit 218 and sending the adjusted channel information to the transmitter 100 through the feedback path 400, and a channel information accumulation unit 211 for accumulating the adjusted channel information from the channel information adjusting unit 221 for a predetermined interval. The receiver 200 further includes a receiver-side transmission weight generator 205 for generating K*N receiver-side transmission weights according to the accumulating adjusted channel information in the channel information accumulation unit 211, a reception weight generator 212 for generating K*L reception weights by using the information of channel estimation from the channel state estimation unit 204 and receiver-side transmission weights in the receiver-side transmission weight generator 205, #1 to #K equalization processors 203 and a signal combining unit 208 corresponding to the signal dividing unit 103 of the transmitter 100. Each equalization processor 203 includes a reception weight multiplier 209 for multiplying the received #1 to #L substreams of each of #1 to #K signal streams by the #1 to #L reception weights, respectively, and a demodulator 210 for composing the #1 to #L weighted substreams to obtain respective composed #1 to #K signal streams and demodulating each of the composed #1 to #K signal streams. The signal combining unit 208 combines the demodulated K signal streams from respective equalization processors 203 to reproduce an original transmission signal.

Figure 41:
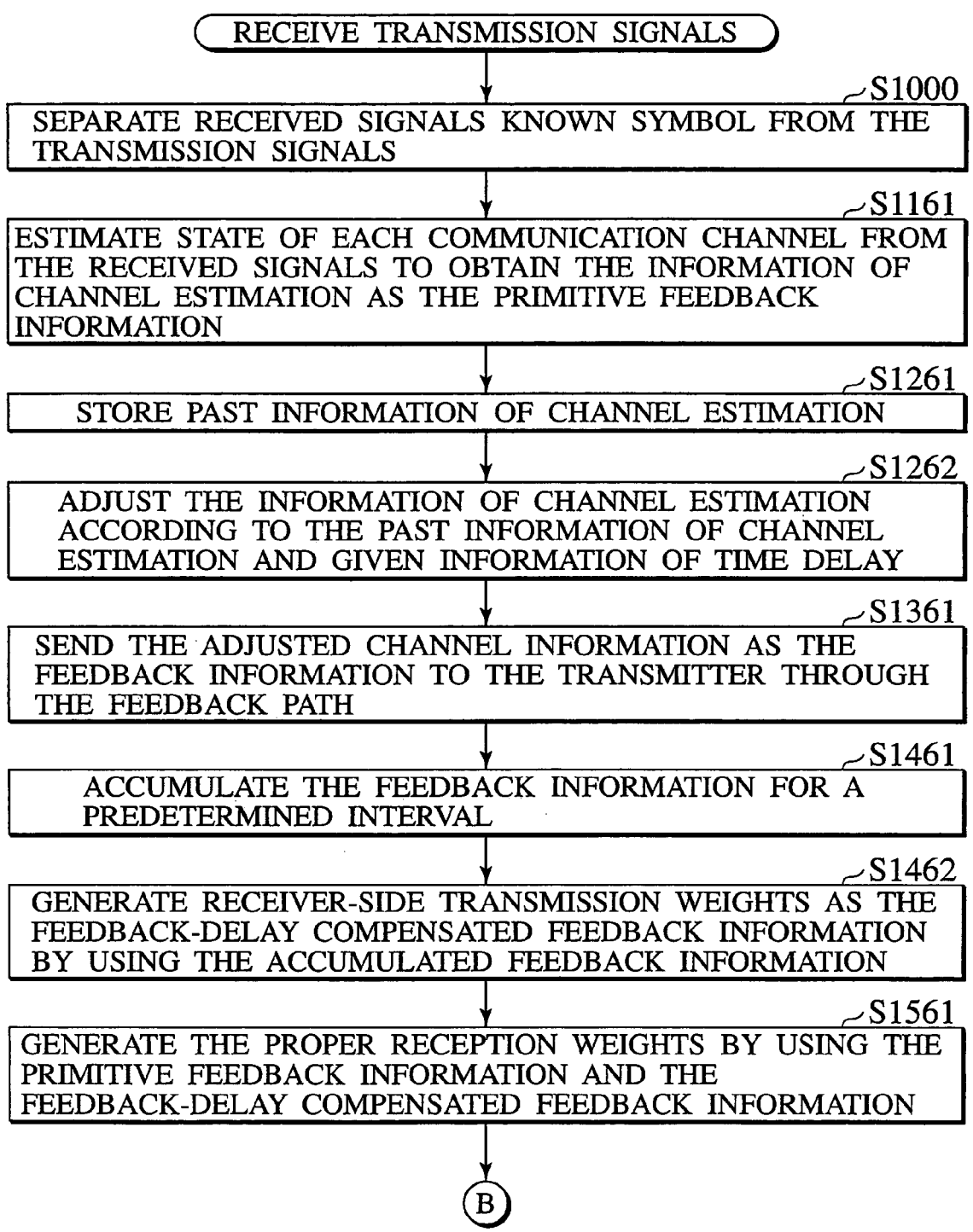
FIG. 41 is a flowchart showing an MIMO receiving method carried out by the MIMO receiver of the nineteenth embodiment.

FIG. 41 and FIG. 12B are a flowchart which illustrates this receiving method carried out in the MIMO receiver 200 of the nineteenth embodiment. This method will be described hereinafter.

At step S1000, the receiver 200 separates the received signals into the known symbol and transmission substreams.

At step S1161, the receiver 200 estimates state of each communication channel from the received signals received by the #1 to #L antennas 201 to obtain information of channel estimation as the primitive feedback information.

At steps S1261 and S1262, the receiver 200 stores past information of channel estimation which has been generated on the step S1161 and adjusts the information of channel estimation according to the past information of channel estimation stored on the step S1261 and given information of time delay.

At step S1361, the receiver 200 sends the adjusted channel information as the feedback information to the transmitter 100 through the feedback path 400.

At steps S1461 and S1462, the receiver 200 accumulates the feedback information for a predetermined interval and generates K*N receiver-side transmission weights as the feedback-delay compensated feedback information by using the accumulated feedback information.

At step S1561, the receiver 200 generates K*L proper reception weights by using the primitive feedback information and the feedback-delay compensated feedback information.

Following steps S1600 through S1900 are identical with those of the sixth embodiment as illustrated in FIG. 12B.

In a case that the transmitter 100 generates the transmission weights by using the fed-back channel information, which is influenced by the feedback delay corresponding to information ratio of the feedback path 400, consistency between these transmission weights and reception weights which are generated without any influence from the feedback delay is disturbed and degradation of transmission capacity may occur.

In order to cope with this state and maintain the consistency between the transmission weights and reception weights, the MIMO receiver 200 also generates the transmission weights and reception weights by using the adjusted channel information. By this treatment, it becomes possible to restrain the inconsistency between the transmission weights and reception weights due to the feedback delay. The reason will be described hereinafter.

Let A, Â for pre-adjusted communication channel information and adjusted communication channel information, respectively, then the transmission weights $W_{Tk}$ can be expressed by an expression (29).

$$W_{Tk} = \hat{e}_k \quad (29)$$

In this expression (29), $\hat{e}_k$ is an eigenvector obtained by singular value decomposition or an eigenvalue decomposition of the following expression.

$$\hat{A}^H \hat{A}$$

In the fourteenth embodiment, the reception weights are obtained by the following expression.

$$W_{Rk} = (A W_{Tk})^H$$

In this case, the composed signal $y_k(t)$ obtained as an expression (30).

$$y_k(t) = W_{Rk} A X(t) \quad (30)$$

$$= W_{Tk}^H A^H A \sum_{m=1}^{K} W_{Tm} S_m(t) + W_{Tk}^H A^H n(t)$$

To the contrary, in this embodiment, the reception weights are obtained as the following expression.

$$W_{Rk} = (\hat{A} W_{Tk})^H$$

Then, the composed signal $y_k(t)$ can be obtained as an expression (31).

$$y_k(t) = W_{Rk} A X(t) \quad (31)$$

$$= W_{Tk}^H \hat{A}^H A \sum_{m=1}^{K} W_{Tm} S_m(t) + W_{Tk}^H \hat{A}^H n(t)$$

In this expression, the transmission weights $W_{Tk}$ is an eigenvector of $$\hat{A}^H \hat{A}$$

Therefore, the influence to the composed signal $y_k(t)$ due to the inconsistency of this embodiment becomes smaller than that of the fourteenth embodiment.

According to this nineteenth embodiment, it becomes possible to reduce the influence due to the feedback delay and restrain the degradation of the transmission characteristics.

In every embodiments of this invention set forth hereinbefore, a single common known symbol is used for each substream, but it is possible to use a plurality of different known symbols for each substream or for each transmit channel.

EXAMPLES

Example 1

Computer simulations of the MIMO communication systems according to the first and second embodiment were carried out in order to evaluate their operation/effects. Both transmit and receive antennas were set to four, respectively. Modulation method was set to be dynamically changeable among BPSK, QPSK, 16 QAM and 64 QAM according to the quality of the propagation channels. Channel encoding was not employed. Each transmission signal stream was set to transmit by uniform power. The propagation channels were assumed as uniform fading channels, wherein influence of the feedback delay between the transmit- and receive-antennas is negligible. The correlation characteristics between transmit branch and receive branch were set as a table shown in FIG. 42 according to Case II of the reference document as the following. Further, average power to noise ratio was set to 40 dB, and reception weights were set to update for each symbol according to the fading.

[Reference]

"Joint 3GPP 3GPP2 Spatial Channel Modeling AHG Status Report", RAN1 #27, Jul. 2-5, 2002.

Figure 43:
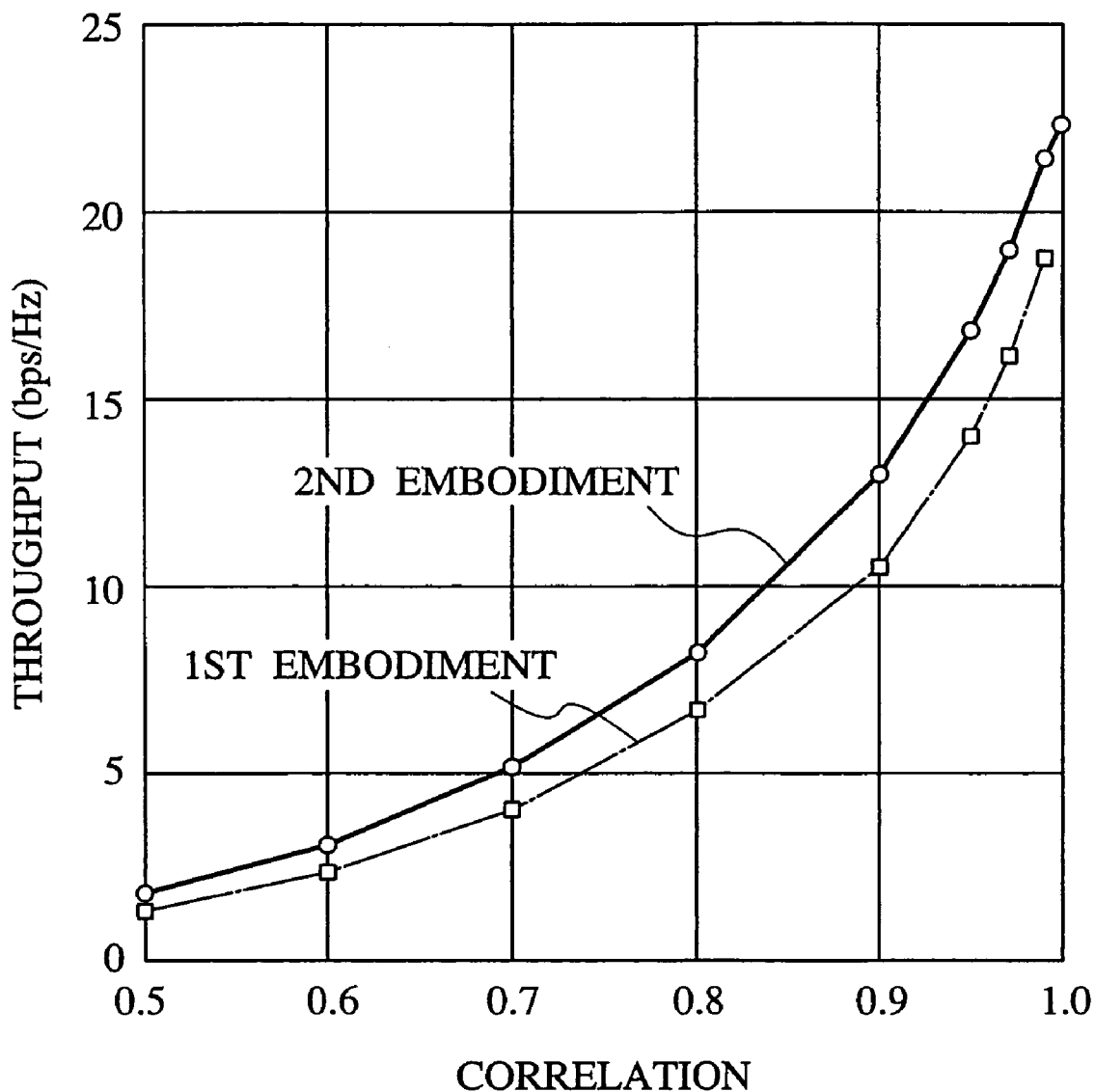
FIG. 43 is a graph showing relationship between channel similarity and throughput of the communication systems of the first and second embodiments of this invention, respectively.

Evaluated results of the first and second embodiments are shown in FIG. 43, wherein the horizontal axis indicates correlation of the propagation path on its pre- and after-feedback states, and the vertical axis indicates average throughput. Though the throughput gradually decreases as the correlation value decreases in both embodiments, the characteristics of the second embodiment can be maintained higher position compared to that of the first embodiment.

Example 2

Computer simulations of the MIMO communication systems according to the fourteenth and sixteenth embodiment were carried out in order to evaluate their operation/effects. Both transmit and receive antennas were set to four, respectively. Modulation method was set to be dynamically changeable among BPSK, QPSK, 16 QAM and 64 QAM according to the quality of the propagation channels. Channel encoding was not employed. Each transmission signal stream was set to transmit by uniform power. The propagation channels were assumed as single-wave Rayleigh fading channels. The correlation characteristics between transmit branch and receive branch were set as those of example 1 according to Case II of the reference document. Further, average power to noise ratio was set to 20 dB.

Figure 44:
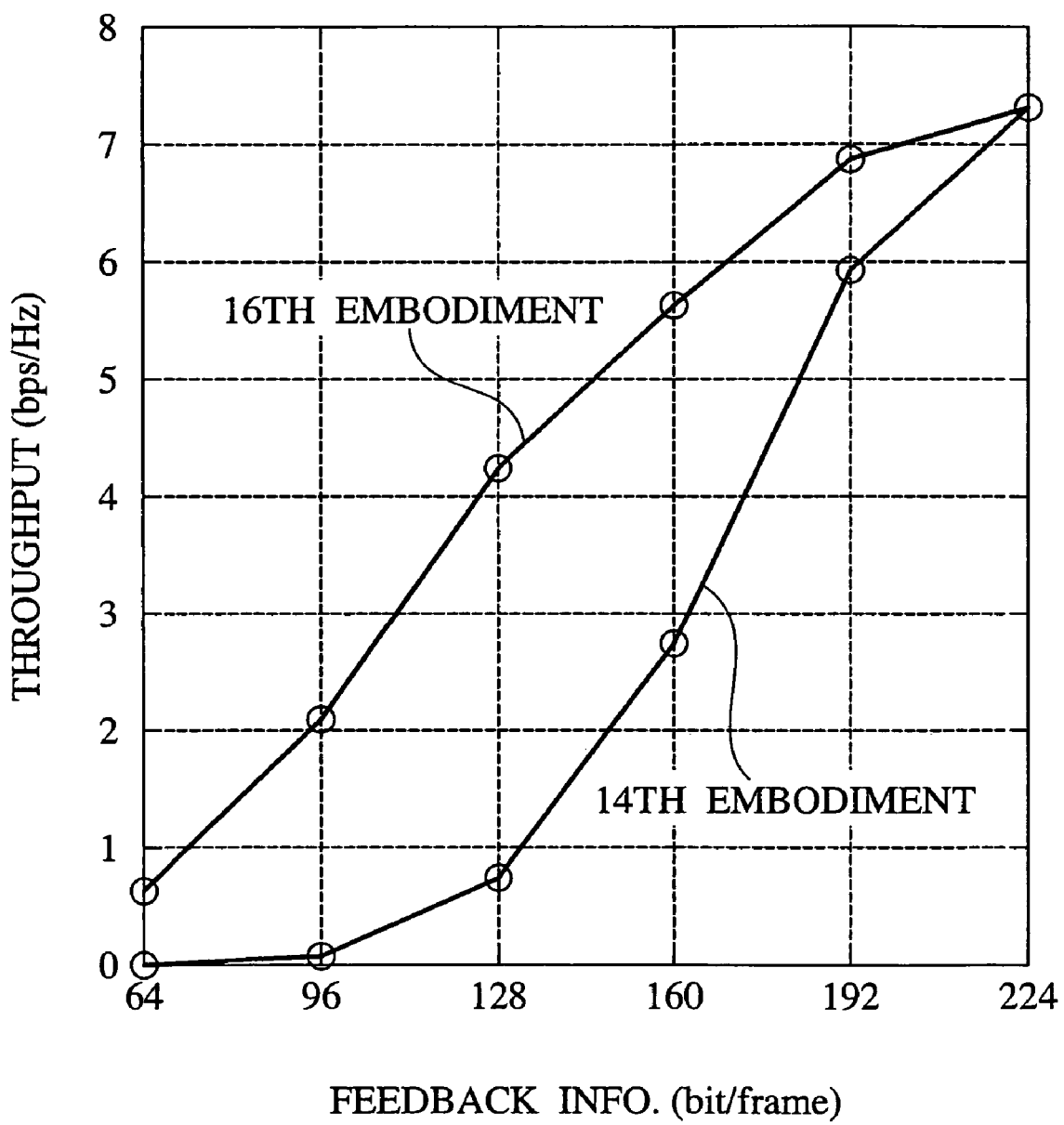
FIG. 44 is a graph showing communication characteristics of the MIMO communication systems of the fourteenth embodiment and sixteenth embodiment of this invention.

Evaluated results of the fourteenth and sixteenth embodiments are shown in FIG. 44, wherein the horizontal axis indicates total quantized bit number and the vertical axis indicates average throughput. Though the throughput gradually decreases as the value of the horizontal axis decreases in both embodiments, the characteristics of the sixteenth embodiment can be maintained higher position compared to that of the fourteenth embodiment.

As set forth hereinbefore, according to this invention, a novel MIMO communication system, MIMO receiver and MIMO method can be provided. It also can provide an MIMO communication technology which can improve consistency between transmission weights and reception weights by using channel information of the feedback timing as well as the current channel information when generating the weights.

What is claimed is:

1. A receiver having L (L is an integer equal to or greater than 2) antennas for an MIMO communication system comprising:
   a channel state estimating means for estimating a state of each communication channel from received signals received by the L antennas to output information of channel state;
   a feedback signal generating means for generating feedback information according to the information of channel state;
   a feedback-delay compensating means for processing the feedback information in order to compensate feedback-delay of a feedback path;
   a proper reception weight generating means for generating proper reception weights by using the information of channel state and processed feedback information from the feedback-delay compensating means;
   a reception weight multiplier for multiplying the received L substreams of respective K signal streams (K is an integer equal to or less than smaller one of N or L), N being a number of antennas at a transmitter that transmits signals to the receiver and N is an integer equal to or greater than 2 by the proper L reception weights, respectively;
   a demodulator for composing the L weighted substreams to obtain respective composed K signal streams and demodulating the composed K signal streams, respectively;
   a signal combining unit for combining the demodulated K signal streams from the demodulator to reproduce an original transmission signal; and
   a received power estimation unit for estimating a condition of received power by using the information of channel estimation from the channel state estimating means, received signals received by L antennas and information of a known symbol,
   wherein the channel state estimating means
   outputs information of channel estimation
   the feedback signal generating means comprises:
      a transmission weight generator for generating K*N transmission weights based on the information of channel estimation from the channel state estimating means and sending the transmission weights as the feedback information to a transmitter through the feedback path;
   the feedback-delay compensating means comprises:
      a transmission weight accumulation unit for accumulating the transmission weights for a predetermined interval and outputting the accumulated transmission weights as the processed feedback information; and
   the proper reception weight generating means comprises:
      a first reception weight generator for generating K*L first reception weights by using the information of channel estimation from the channel state estimating means and processed feedback information from the transmission weight accumulation unit;
      a second reception weight generator for generating K*L second reception weights by using the information of channel state from a channel information accumulation unit and processed feedback information from the transmission weight accumulation unit; and
      a weight selector for estimating a transmission quality according to the first reception weights, second reception weights, processed feedback information, information of channel state and the condition of received power from the received power estimation unit, and selecting the proper reception weights.

2. A receiver having L (L is an integer equal to or greater than 2) antennas for an MIMO communication system comprising:
   a channel state estimating means for estimating a state of each communication channel from received signals received by the L antennas to output information of channel state;
   a feedback signal generating means for generating feedback information according to the information of channel state;
   a feedback-delay compensating means for processing the feedback information in order to compensate feedback-delay of a feedback path;
   a proper reception weight generating means for generating proper reception weights by using the information of channel state and processed feedback information from the feedback-delay compensating means;
   a reception weight multiplier for multiplying the received L substreams of respective K signal streams (K is an integer equal to or less than smaller one of N or L), N being a number of antennas at a transmitter that transmits signals to the receiver and N is an integer equal to or greater than 2 by the proper L reception weights, respectively;

a demodulator for composing the L weighted substreams to obtain respective composed K signal streams and demodulating the composed K signal streams, respectively;

a signal combining unit for combining the demodulated K signal streams from the demodulator to reproduce an original transmission signal; and a received power estimation unit for estimating a condition of received power by using the information of channel estimation from the channel state estimating means, received signals received by L antennas and information of a known symbol, wherein the channel state estimating means includes a channel information selector for selecting channel information to be used as the information of channel state for generating K*L proper reception weights according to the information of channel estimation from the channel state estimating means, accumulated information of channel estimation in a channel information accumulation unit and condition of received power as well as given information of communication capacity, information of delay time of the communication channel and information of Doppler frequency;

the feedback signal generating means comprises:

a transmission weight generator for generating K*N transmission weights based on the information of channel estimation from the channel state estimating means and sending the transmission weights as the feedback information to a transmitter through the feedback path;

the feedback-delay compensating means comprises:

a transmission weight accumulation unit for accumulating the transmission weights for a predetermined interval and outputting the accumulated transmission weights as the processed feedback information; and the proper reception weight generating means comprises:

a reception weight generator for generating K*L reception weights by using the selected channel information from the channel information selector and processed feedback information from the transmission weight accumulation unit.

3. A receiver having L (L is an integer equal to or greater than 2) antennas for an MIMO communication system comprising:

a channel state estimating means for estimating a state of each communication channel from received signals received by the L antennas to output information of channel state;

a feedback signal generating means for generating feedback information according to the information of channel state;

a feedback-delay compensating means for processing the feedback information in order to compensate feedback-delay of a feedback path;

a proper reception weight generating means for generating proper reception weights by using the information of channel state and processed feedback information from the feedback-delay compensating means;

a reception weight multiplier for multiplying the received L substreams of respective K signal streams (K is an integer equal to or less than smaller one of N or L), N being a number of antennas at a transmitter that transmits signals to the receiver and N is an integer equal to or greater than 2 by the proper L reception weights, respectively;

a demodulator for composing the L weighted substreams to obtain respective composed K signal streams and demodulating the composed K signal streams, respectively;

a signal combining unit for combining the demodulated K signal streams from the demodulator to reproduce an original transmission signal; and a received power estimation unit for estimating a condition of received power by using the information of channel estimation from the channel state estimating means, received signals received by L antennas and information of a known symbol, wherein the channel state estimating means outputs information of channel estimation, and includes:

a channel information storage for storing past information of channel estimation which has been outputted from the channel state estimating means; and a channel information adjusting unit for adjusting the information of channel estimation according to given information of time delay and the past information of channel estimation stored in the channel information storage and outputting adjusted information of channel estimation;

the feedback information generating means comprises:

a transmission weight generator for generating K*N transmission weights based on the adjusted information of channel estimation from the channel information adjusting unit and sending the transmission weights as the feedback information to a transmitter through the feedback path;

the feedback-delay compensating means comprises:

a transmission weight accumulation unit for accumulating the transmission weights as the processed feedback information for a predetermined interval; and the proper reception weight generating means comprises:

a first reception weight generator for generating K*L first reception weights by using the adjusted information of channel estimation from the channel information adjusting unit and processed feedback information from the transmission weight accumulation unit;

a second reception weight generator for generating K*L second reception weights by using the information of channel state from a channel information accumulation unit and processed feedback information from the transmission weight accumulation unit; and a weight selector for estimating a transmission quality according to the first reception weights, second reception weights, processed feedback information, adjusted information of channel estimation and the condition of received power, and selecting reception weights to be used as the proper reception weights from the first or the second reception weights.

4. A receiver having L (L is an integer equal to or greater than 2) antennas for an MIMO communication system comprising:

a channel state estimating means for estimating a state of each communication channel from received signals received by the L antennas to output information of channel state;

a feedback signal generating means for generating feedback information according to the information of channel state;

a feedback-delay compensating means for processing the feedback information in order to compensate feedback-delay of a feedback path;

a proper reception weight generating means for generating proper reception weights by using the information of channel state and processed feedback information from the feedback-delay compensating means;

a reception weight multiplier for multiplying the received L substreams of respective K signal streams (K is an integer equal to or less than smaller one of N or L), N being a number of antennas at a transmitter that transmits signals to the receiver and N is an integer equal to or greater than 2 by the proper L reception weights, respectively;

a demodulator for composing the L weighted substreams to obtain respective composed K signal streams and demodulating the composed K signal streams, respectively;

a signal combining unit for combining the demodulated K signal streams from the demodulator to reproduce an original transmission signal; and a received power estimation unit for estimating a condition of received power by using the information of channel estimation from the channel state estimating means, received signals received by L antennas and information of a known symbol, wherein the channel state estimating means includes:

a channel information storage for storing past information of channel estimation which has been outputted from the channel state estimating means;

a channel information adjusting unit for adjusting the information of channel estimation according to given information of time delay and the past information of channel estimation stored in the channel information storage and outputting adjusted information of channel estimation; and a channel information selector for selecting channel information as the information of channel state to be used for generation of the proper reception weights according to the adjusted information of channel estimation, adjusted and accumulated information of channel estimation in a channel information accumulation unit and the condition of received power as well as given information of communication capacity, information of delay time of the communication channel and information of Doppler frequency;

the feedback information generating means comprises:

a transmission weight generator for generating K*N transmission weights based on the adjusted information of channel estimation from the channel information adjusting unit and sending the transmission weights as the feedback information to a transmitter through the feedback path;

the feedback-delay compensating means comprises:

a transmission weight accumulation unit for accumulating the transmission weights as the processed feedback information for a predetermined interval; and the proper reception weight generating means comprises:

a reception weight generator for generating K*L reception weights by using the information of channel state from the channel information selector and processed feedback information from the transmission weight accumulation unit.

5. A receiver with L (L is an integer equal to or greater than 2) antennas in an MIMO communication system comprising:

a feedback information generating means for generating primitive feedback information from received L substreams received by the L antennas of the receiver, and including a channel state estimation unit for estimating a state of each communication channel from the received signals received by the L antennas to obtain information of channel estimation as the primitive feedback information;

a feedback-delay processing means for adjusting the primitive feedback information to obtain feedback information and sending the feedback information to a transmitter through a feedback path;

a feedback-delay compensating means for compensating a feedback-delay for the feedback information from the feedback-delay processing means, and including a channel information accumulation unit for accumulating the primitive feedback information from the channel state estimation unit;

a proper reception weight generating means for generating K*L proper reception weights by using the feedback-delay compensated feedback information from the feedback-delay compensating means;

a reception weight multiplier for multiplying the received L substreams of respective K signal streams by the proper L reception weights, respectively;

a demodulator for composing the L weighted substreams to obtain respective composed K signal streams and demodulating the composed K signal streams, respectively;

a signal combining unit for combining the demodulated K signal streams from the demodulator to reproduce an original transmission signal; and a received power estimation unit for estimating a condition of received power by using the information of channel estimation from the channel state estimation unit, received signals received by L antennas and information of a known symbol, wherein the channel state estimation unit also works as the feedback-delay processing means for sending the primitive feedback information as the feedback information to the transmitter through the feedback path and to the feedback-delay compensating means;

the feedback-delay compensating means comprises:

a receiver-side transmission weight generator for generating K*N receiver-side transmission weights (N being a number of antennas at a transmitter that transmits signals to the receiver and N is an integer equal to or greater than 2) as the feedback-delay compensated feedback information based on the accumulated primitive feedback information from the channel information accumulation unit; and the proper reception weight generating means comprises:

a first reception weight generator for generating K*L first reception weights by using the information of channel estimation from the channel state estimation unit and the feedback-delay compensated feedback information from the transmission weight generator;

a second reception weight generator for generating K*L second reception weights by using the accumulated primitive feedback information from the channel information accumulation unit and the receiver-side transmission weights from the transmission weight generator; and a weight selector for estimating a transmission quality according to the first reception weights, second reception weights, receiver-side transmission weights, information of channel estimation and the condition of received power, and selecting the proper reception weights from the first or second reception weights.

6. A receiver with L (L is an integer equal to or greater than 2) antennas in an MIMO communication system comprising:

a feedback information generating means for generating primitive feedback information from received L substreams received by the L antennas of the receiver, and including a channel state estimation unit for estimating a state of each communication channel from the received signals received by the L antennas to obtain information of channel estimation as the primitive feedback information;

a feedback-delay processing means for adjusting the primitive feedback information to obtain feedback information and sending the feedback information to a transmitter through a feedback path;

a feedback-delay compensating means for compensating a feedback-delay for the feedback information from the feedback-delay processing means, and including a channel information accumulation unit for accumulating the primitive feedback information from the channel state estimation unit;

a proper reception weight generating means for generating K*L proper reception weights by using the feedback-delay compensated feedback information from the feedback-delay compensating means;

a reception weight multiplier for multiplying the received L substreams of respective K signal streams by the proper L reception weights, respectively;

a demodulator for composing the L weighted substreams to obtain respective composed K signal streams and demodulating the composed K signal streams, respectively;

a signal combining unit for combining the demodulated K signal streams from the demodulator to reproduce an original transmission signal; and a received power estimation unit for estimating a condition of received power by using the information of channel estimation from the channel state estimation unit, received signals received by L antennas and information of a known symbol, wherein the channel state estimation unit also works as the feedback-delay processing means for sending the primitive feedback information as the feedback information to the transmitter through the feedback path and to the feedback-delay compensating means;

the feedback-delay compensating means comprises:
a receiver-side transmission weight generator for generating K*N receiver-side transmission weights (N being a number of antennas at a transmitter that transmits signals to the receiver and N is an integer equal to or greater than 2) as the feedback-delay compensated feedback information based on the accumulated primitive feedback information from the channel information accumulation unit; and the proper reception weight generating means comprises:
a channel information selector for selecting channel information to be used for generation of K*L proper reception weights according to the information of channel estimation, accumulated information of channel estimation in the channel information accumulation unit and the condition of received power as well as given information of communication capacity, information of delay time and information of Doppler frequency; and a reception weight generator for generating K*L proper reception weights by using the selected channel information from the channel information selector and the feedback-delay compensated feedback information from the receiver-side transmission weight accumulation unit.

7. A receiver with L (L is an integer equal to or greater than 2) antennas in an MIMO communication system comprising:
a feedback information generating means for generating primitive feedback information from received L substreams received by the L antennas of the receiver, and including a channel state estimation unit for estimating a state of each communication channel from the received signals received by the L antennas to obtain information of channel estimation as the primitive feedback information;

a feedback-delay processing means for adjusting the primitive feedback information to obtain feedback information and sending the feedback information to a transmitter through a feedback path;

a feedback-delay compensating means for compensating a feedback-delay for the feedback information from the feedback-delay processing means, and including a channel information accumulation unit for accumulating the primitive feedback information from the channel state estimation unit;

a proper reception weight generating means for generating K*L proper reception weights by using the feedback-delay compensated feedback information from the feedback-delay compensating means;

a reception weight multiplier for multiplying the received L substreams of respective K signal streams by the proper L reception weights, respectively;

a demodulator for composing the L weighted substreams to obtain respective composed K signal streams and demodulating the composed K signal streams, respectively;

a signal combining unit for combining the demodulated K signal streams from the demodulator to reproduce an original transmission signal; and a received power estimation unit for estimating a condition of received power by using the information of channel estimation from the channel state estimation unit, received signals received by L antennas and information of a known symbol, wherein the feedback information processing means comprises:
a channel information storage for storing past information of channel estimation which has been outputted from the channel state estimation unit; and
a channel information adjusting unit for adjusting the information of channel estimation according to given information of time delay and the past information of channel estimation stored in the channel information storage and sending the adjusted information of channel estimation as the feedback information to the transmitter through the feedback path;
wherein the channel information accumulation unit accumulates the adjusted information of channel estimation from the channel information adjusting unit for a predetermined interval;

the feedback-delay compensating means comprises:
a receiver-side transmission weight generator for generating K*N receiver-side transmission weights (N being a number of antennas at a transmitter that transmits signals to the receiver and N is an integer equal to or greater than 2) based on the adjusted and accumulated information of channel estimation in the channel information accumulation unit; and
a transmission weight accumulation unit for accumulating the receiver-side transmission weights from the receiver-side transmission weight generator for a predetermined interval as the feedback-delay compensated feedback information; and the proper reception weight generating means comprises:
- a first reception weight generator for generating K*L first reception weights by using the adjusted information of channel estimation from the channel state estimation unit and the feedback-delay compensated feedback information from the transmission weight accumulation unit;
- a second reception weight generator for generating K*L second reception weights by using the adjusted and accumulated information of channel estimation in the channel information accumulation unit and the feedback-delay compensated feedback information from the transmission weight accumulation unit; and
- a weight selector for estimating a transmission quality according to the first reception weights, second reception weights, feedback-delay compensated feedback information, adjusted information of channel estimation from the channel information adjusting unit and the condition of received power, and selecting the proper reception weights from the first or the second reception weights.

8. A receiver with L (L is an integer equal to or greater than 2) antennas in an MIMO communication system comprising:
- a feedback information generating means for generating primitive feedback information from received L substreams received by the L antennas of the receiver, and including a channel state estimation unit for estimating a state of each communication channel from the received signals received by the L antennas to obtain information of channel estimation as the primitive feedback information;
- a feedback-delay processing means for adjusting the primitive feedback information to obtain feedback information and sending the feedback information to a transmitter through a feedback path;
- a feedback-delay compensating means for compensating a feedback-delay for the feedback information from the feedback-delay processing means, and including a channel information accumulation unit for accumulating the primitive feedback information from the channel state estimation unit;
- a proper reception weight generating means for generating K*L proper reception weights by using the feedback-delay, compensated feedback information from the feedback-delay compensating means;
- a reception weight multiplier for multiplying the received L substreams of respective K signal streams by the proper L reception weights, respectively;
- a demodulator for composing the L weighted substreams to obtain respective composed K signal streams and demodulating the composed K signal streams, respectively;
- a signal combining unit for combining the demodulated K signal streams from the demodulator to reproduce an original transmission signal; and
- a received power estimation unit for estimating a condition of received power by using the information of channel estimation from the channel state estimation unit, received signals received by L antennas and information of a known symbol, wherein the feedback information processing means comprises:
- a channel information storage for storing past information of channel estimation which has been outputted from the channel state estimation unit;
- a channel information adjusting unit for adjusting the information of channel estimation according to given information of time delay of the communication channel and the past information of channel estimation stored in the channel information storage and sending the adjusted information of channel estimation as the feedback information to the transmitter through the feedback path;

wherein the channel information accumulation unit accumulates the adjusted information of channel estimation from the channel information adjusting unit for a predetermined interval;

the feedback-delay compensating means comprises:
- a receiver-side transmission weight generator for generating K*N receiver-side transmission weights (N being a number of antennas at a transmitter that transmits signals to the receiver and N is an integer equal to or greater than 2) based on the adjusted and accumulated information of channel estimation in the channel information accumulation unit; and
- a transmission weight accumulation unit for accumulating the receiver-side transmission weights from the receiver-side transmission weight generator for a predetermined interval as the feedback-delay compensated feedback information; and the proper reception weight generating means comprises:
- a channel information selector for selecting channel information to be used for generation of K*L proper reception weights according to the adjusted information of channel estimation, adjusted and accumulated information of channel estimation in the channel information accumulation unit and the condition of received power as well as given information of communication capacity, information of delay time of the communication channel and information of Doppler frequency; and
- a reception weight generator for generating K*L proper reception weights by using the selected channel information from the channel information selector and the feedback-delay compensated feedback information from the receiver-side transmission weight accumulation unit.

9. A method of receiving and reproducing MIMO transmission signals comprising:
- estimating a state of each communication channel from received signals received by L antennas of an MIMO receiver to obtain and output information of channel state;
- generating feedback information according to the information of channel state;
- sending the feedback information to a transmitter through a feedback path;
- processing the feedback information in order to compensate feedback-delay of a feedback path;
- generating K*L proper reception weights by using the information of channel state and processed feedback information;
- multiplying the received L substreams of respective K signal streams by the proper L reception weights, respectively;
- composing the L weighted substreams to obtain respective composed K signal streams;
- demodulating the composed K signal streams, respectively;
- combining the demodulated K signal streams to reproduce an original transmission signal;

estimating a condition of received power by using information of channel estimation, received signals received by L antennas and information of a known symbol, wherein the generating the feedback information includes generating K*N transmission weights (N being a number of antennas at a transmitter that transmits signals to the receiver and N is an integer equal to or greater than 2) as the feedback information based on the information of channel estimation;

the processing the feedback information includes accumulating the transmission weights as the processed feedback information for a predetermined interval; and the generating K*L proper reception weights includes:
   generating K*L first reception weights by using the information of channel estimation and processed feedback information;
   generating K*L second reception weights by using the information of channel state and processed feedback information;
   estimating a transmission quality according to the first reception weights, second reception weights, processed feedback information, information of channel state and the condition of received power; and
   selecting the proper reception weights from the first or the second reception weights.

10. A method of receiving and reproducing MIMO transmission signals comprising:
   estimating a state of each communication channel from received signals received by L antennas of an MIMO receiver to obtain and output information of channel state;
   generating feedback information according to the information of channel state;
   sending the feedback information to a transmitter through a feedback path;
   processing the feedback information in order to compensate feedback-delay of a feedback path;
   generating K*L proper reception weights by using the information of channel state and processed feedback information;
   multiplying the received L substreams of respective K signal streams by the proper L reception weights, respectively;
   composing the L weighted substreams to obtain respective composed K signal streams;
   demodulating the composed K signal streams, respectively;
   combining the demodulated K signal streams to reproduce an original transmission signal;
   estimating a condition of received power by using information of channel estimation, received signals received by L antennas and information of a known symbol,
   wherein the estimating a state of each communication channel includes selecting channel information to be used as the information of channel state for generation of the proper L reception weights according to the information of channel estimation, accumulated information of channel estimation and the condition of received power as well as given information of communication capacity, information of delay time of the communication channel and information of Doppler frequency;
   the generating the feedback information includes generating K*N transmission weights (N being a number of antennas at a transmitter that transmits signals to the receiver and N is an integer equal to or greater than 2) based on the information of channel estimation;
   the sending the feedback information includes sending the transmission weights as the feedback information to the transmitter through the feedback path; and
   the processing the feedback information includes accumulating the transmission weights for a predetermined interval to obtain accumulated transmission weights as the processed feedback information.

11. A method of receiving and reproducing MIMO transmission signals comprising:
   estimating a state of each communication channel from received signals received by L antennas of an MIMO receiver to obtain and output information of channel state;
   generating feedback information according to the information of channel state;
   sending the feedback information to a transmitter through a feedback path;
   processing the feedback information in order to compensate feedback-delay of a feedback path;
   generating K*L proper reception weights by using the information of channel state and processed feedback information;
   multiplying the received L substreams of respective K signal streams by the proper L reception weights, respectively;
   composing the L weighted substreams to obtain respective composed K signal streams;
   demodulating the composed K signal streams, respectively;
   combining the demodulated K signal streams to reproduce an original transmission signal;
   estimating a condition of received power by using information of channel estimation, received signals received by L antennas and information of a known symbol,
   wherein the estimating a state of each communication channel includes:
      storing past information of channel estimation which has been obtained;
      adjusting the information of channel estimation according to given information of time delay and the stored past information of channel estimation; and
      accumulating the adjusted information of channel estimation as the information of channel state for a predetermined interval;
   the generating the feedback information includes generating K*N transmission weights (N being a number of antennas at a transmitter that transmits signals to the receiver and N is an integer equal to or greater than 2) based on the adjusted information of channel estimation;
   the sending the feedback information includes sending the transmission weights as the feedback information to the transmitter through the feedback path;
   the processing the feedback information includes accumulating the transmission weights as the processed feedback information for a predetermined interval; and
   the generating K*L proper reception weights includes:
      generating K*L first reception weights by using the adjusted information of channel estimation and processed feedback information;
      generating K*L second reception weights by using the information of channel state and processed feedback information;
      estimating a transmission quality according to the first reception weights, second reception weights, processed feedback information, adjusted information of channel estimation and the condition of received power; and selecting reception weights to be used as the proper reception weights from the first or the second reception weights.

12. A method of receiving and reproducing MIMO transmission signals comprising:
estimating a state of each communication channel from received signals received by L antennas of an MIMO receiver to obtain and output information of channel state;
generating feedback information according to the information of channel state;
sending the feedback information to a transmitter through a feedback path;
processing the feedback information in order to compensate feedback-delay of a feedback path;
generating K*L proper reception weights by using the information of channel state and processed feedback information;
multiplying the received L substreams of respective K signal streams by the proper L reception weights, respectively;
composing the L weighted substreams to obtain respective composed K signal streams;
demodulating the composed K signal streams, respectively;
combining the demodulated K signal streams to reproduce an original transmission signal;
estimating a condition of received power by using information of channel estimation, received signals received by L antennas and information of a known symbol,
wherein the estimating a state of each communication channel includes:
storing past information of channel estimation which has been obtained;
adjusting the information of channel estimation according to given information of time delay and the stored past information of channel estimation to obtain adjusted information of channel estimation;
accumulating the adjusted information of channel estimation for a predetermined interval; and
selecting channel information as the information of channel state to be used for generation of the proper L reception weights according to the adjusted information of channel estimation, adjusted and accumulated information of channel estimation and the condition of received power as well as given information of communication capacity, information of delay time of the communication channel and information of Doppler frequency;
the generating the feedback information includes generating K*N transmission weights (N being a number of antennas at a transmitter that transmits signals to the receiver and N is an integer equal to or greater than 2) based on the adjusted information of channel estimation;
the sending the feedback information includes sending the transmission weights as the feedback information to the transmitter through the feedback path; and
the processing the feedback information includes accumulating the transmission weights as the processed feedback information for a predetermined interval.

13. A method of receiving and reproducing MIMO transmission signals comprising:
generating primitive feedback information from received L substreams received by L antennas of a receiver;
adjusting the primitive feedback information to obtain feedback information;
sending the feedback information to a transmitter through a feedback path;
compensating feedback-delay for the feedback information;
generating K*L proper reception weights by using the feedback-delay compensated feedback information;
multiplying the received L substreams of respective K signal streams by the proper L reception weights, respectively;
composing the L weighted substreams to obtain respective composed K signal streams;
demodulating the composed # K signal streams, respectively;
combining the demodulated K signal streams to reproduce an original transmission signal; and
estimating a condition of received power by using information of channel estimation, received signals received by L antennas and information of a known symbol,
wherein the generating primitive feedback information includes estimating a state of each communication channel from the received signals received by the L antennas to obtain the information of channel estimation as the primitive feedback information;
the adjusting the primitive feedback information includes making the primitive feedback information itself as the feedback information;
the compensating feedback-delay includes generating K*N receiver-side transmission weights (N being a number of antennas at a transmitter that transmits signals to the receiver and N is an integer equal to or greater than 2) as the feedback-delay compensated feedback information based on the accumulated feedback information; and
the generating K*L proper reception weights includes:
generating K*L first reception weights by using the information of channel estimation and feedback-delay compensated feedback information;
generating K*L second reception weights by using the accumulated feedback information and receiver-side transmission weights;
estimating a transmission quality according to the first reception weights, second reception weights, receiver-side transmission weights, information of channel estimation and the condition of received power; and
selecting the proper reception weights from the first or second reception weights according to the transmission quality.

14. A method of receiving and reproducing MIMO transmission signals comprising:
generating primitive feedback information from received L substreams received by L antennas of a receiver;
adjusting the primitive feedback information to obtain feedback information;
sending the feedback information to a transmitter through a feedback path;
compensating feedback-delay for the feedback information;
generating K*L proper reception weights by using the feedback-delay compensated feedback information;
multiplying the received L substreams of respective K signal streams by the proper L reception weights, respectively;
composing the L weighted substreams to obtain respective composed K signal streams;
demodulating the composed # K signal streams, respectively;

combining the demodulated K signal streams to reproduce an original transmission signal; and estimating a condition of received power by using information of channel estimation, received signals received by L antennas and information of a known symbol, wherein the generating the primitive feedback information includes estimating a state of each communication channel from the received signals received by the L antennas to obtain the information of channel estimation as the primitive feedback information;

wherein the adjusting the primitive feedback information includes making the primitive feedback information itself as the feedback information;

the compensating feedback-delay includes:
 accumulating the feedback information for a predetermined interval; and
 generating K*N receiver-side transmission weights (N being a number of antennas at a transmitter that transmits signals to the receiver and N is an integer equal to or greater than 2) as the feedback-delay compensated feedback information based on the accumulated feedback information; and the generating K*L proper reception weights includes:
 selecting channel information to be used for generation of K*L proper reception weights according to the primitive feedback information, accumulated feedback information and the condition of received power as well as given information of communication capacity, information of delay time and information of Doppler frequency; and
 generating K*L proper reception weights by using the selected channel information and the feedback-delay compensated feedback information.

15. A method of receiving and reproducing MIMO transmission signals comprising:

generating primitive feedback information from received L substreams received by L antennas of a receiver;

adjusting the primitive feedback information to obtain feedback information;

sending the feedback information to a transmitter through a feedback path;

compensating feedback-delay for the feedback information;

generating K*L proper reception weights by using the feedback-delay compensated feedback information;

multiplying the received L substreams of respective K signal streams by the proper L reception weights, respectively;

composing the L weighted substreams to obtain respective composed K signal streams;

demodulating the composed # K signal streams, respectively;

combining the demodulated K signal streams to reproduce an original transmission signal; and estimating a condition of received power by using information of channel estimation, received signals received by L antennas and information of a known symbol, wherein the generating primitive feedback information includes estimating a state of each communication channel from the received signals received by the L antennas to obtain the information of channel estimation as the primitive feedback information;

the adjusting the primitive feedback information includes:
storing past information of channel estimation which has been obtained by; and adjusting the information of channel estimation according to given information of time delay and the past information of channel estimation;

the sending the feedback information includes sending the adjusted information of channel estimation as the feedback information to the transmitter through the feedback path;

the compensating feedback-delay includes:

accumulating the feedback information for a predetermined interval;

generating K*N receiver-side transmission weights (N being a number of antennas at a transmitter that transmits signals to the receiver and N is an integer equal to or greater than 2) based on the accumulated feedback information; and accumulating the receiver-side transmission weights for a predetermined interval as the feedback-delay compensated feedback information; and the generating K*L proper reception weights includes:
 generating K*L first reception weights by using the feedback information and feedback-delay compensated feedback information;
 generating K*L second reception weights by using the accumulated feedback information and the feedback-delay compensated feedback information; and
 estimating a transmission quality according to the first reception weights, second reception weights, feedback-delay compensated feedback information, feedback information and the condition of received power; and
 selecting the proper reception weights from the first or second reception weights according to the transmission quality.

16. A method of receiving and reproducing MIMO transmission signals comprising:

generating primitive feedback information from received L substreams received by L antennas of a receiver;

adjusting the primitive feedback information to obtain feedback information;

sending the feedback information to a transmitter through a feedback path;

compensating feedback-delay for the feedback information;

generating K*L proper reception weights by using the feedback-delay compensated feedback information;

multiplying the received L substreams of respective K signal streams by the proper L reception weights, respectively;

composing the L weighted substreams to obtain respective composed K signal streams;

demodulating the composed # K signal streams, respectively;

combining the demodulated K signal streams to reproduce an original transmission signal; and estimating a condition of received power by using information of channel estimation, received signals received by L antennas and information of a known symbol, wherein the generating primitive feedback information includes estimating a state of each communication channel from the received signals received by the L antennas to obtain information of channel estimation as the primitive feedback information;

the adjusting the primitive feedback information includes:
storing past information of channel estimation which has been outputted;

adjusting the information of channel estimation according to given information of time delay and the stored past information of channel estimation;

the sending the feedback information includes sending the adjusted information of channel estimation as the feedback information to the transmitter through the feedback path;

the compensating feedback-delay includes:
  accumulating the feedback information for a predetermined interval;
  generating K*N receiver-side transmission weights (N being a number of antennas at a transmitter that transmits signals to the receiver and N is an integer equal to or greater than 2) based on the accumulated feedback information; and
  accumulating the receiver-side transmission weights for a predetermined interval as the feedback-delay compensated feedback information; and the generating K*L proper reception weights includes:
  selecting channel information to be used for generation of K*L proper reception weights according to the feedback information, accumulated feedback information and the condition of received power as well as given information of communication capacity, information of delay time and information of Doppler frequency; and
  generating K*L proper reception weights by using the selected channel information and the feedback-delay compensated feedback information.

\* \* \* \* \*